US009576256B2

(12) United States Patent
Gilbert et al.

(10) Patent No.: US 9,576,256 B2
(45) Date of Patent: *Feb. 21, 2017

(54) KIOSK FOR ENERGY INDUSTRY LOGISTICS

(71) Applicant: PHI, Inc., Lafayette, LA (US)

(72) Inventors: Brandon Jay Gilbert, Youngsville, LA (US); Steven Wyatt Pharis, Lafayette, LA (US); James Quinn, Lafayette, LA (US); David Alan Treadway, Lafayette, LA (US)

(73) Assignee: PHI, Inc., Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,171

(22) Filed: Sep. 4, 2015

(65) Prior Publication Data

US 2016/0140458 A1 May 19, 2016

Related U.S. Application Data

(63) Continuation of application No. 13/752,034, filed on Jan. 28, 2013, now Pat. No. 9,165,265.

(60) Provisional application No. 61/591,704, filed on Jan. 27, 2012.

(51) Int. Cl.
G07B 15/02 (2011.01)
G06Q 10/02 (2012.01)
G07B 15/00 (2011.01)
G07F 7/08 (2006.01)
G06Q 50/14 (2012.01)

(52) U.S. Cl.
CPC .............. *G06Q 10/02* (2013.01); *G06Q 50/14* (2013.01); *G07B 15/00* (2013.01); *G07F 7/08* (2013.01)

(58) Field of Classification Search
USPC .................... 235/384, 383, 462.01; 705/5
See application file for complete search history.

(56) References Cited

U.S. PATENT DOCUMENTS

| 9,165,265 | B2 | 10/2015 | Gilbert | |
|---|---|---|---|---|
| 2009/0322510 | A1* | 12/2009 | Berger | H04W 60/00 340/539.1 |
| 2011/0102140 | A1* | 5/2011 | McGeachie | G06F 21/32 340/5.81 |

* cited by examiner

*Primary Examiner* — Ahshik Kim
(74) *Attorney, Agent, or Firm* — Garvey, Smith, Nehrbass & North, L.L.C.; Seth M. Nehrbass; Mark N. Melasky

(57) ABSTRACT

An automated kiosk and related apparatus provide check-in and boarding services to energy sector passengers, such as helicopter passengers. Preferably, the kiosk and related apparatus can take and store a picture of the passenger, calculate and/or measure the weight of the passenger and the passenger's luggage, print luggage tags and boarding printouts, check third parties' databases (such as a no-fly list (NFL)) for approval for the passenger's flight and can transmit data to another location (server, third party employer, pilot).

58 Claims, 74 Drawing Sheets

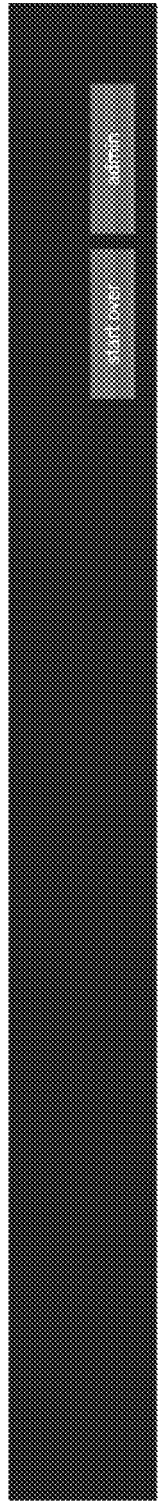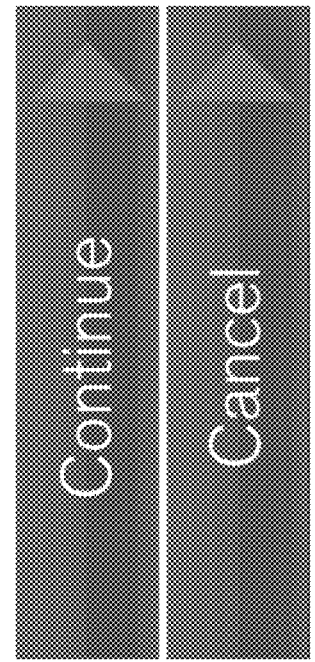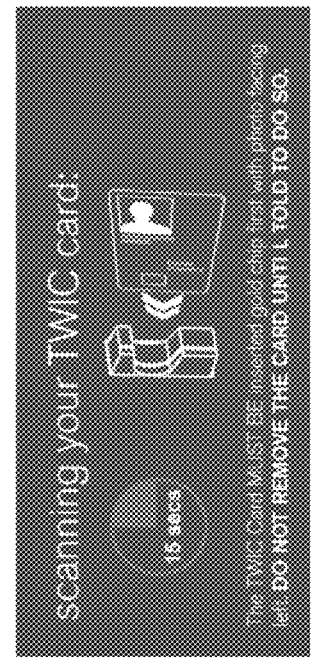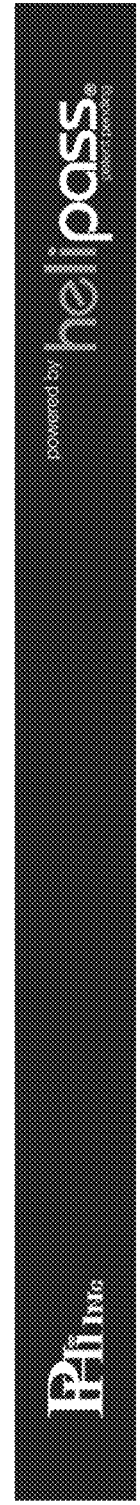
FIG. 20

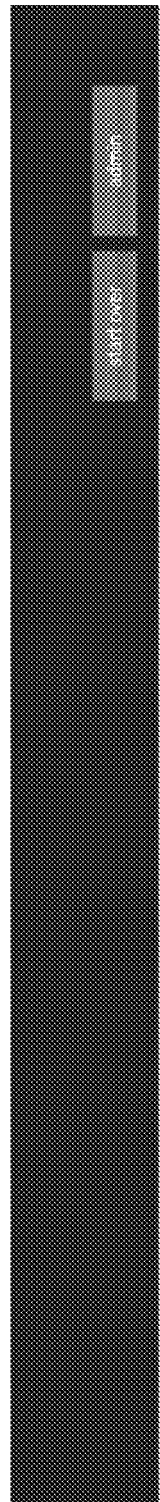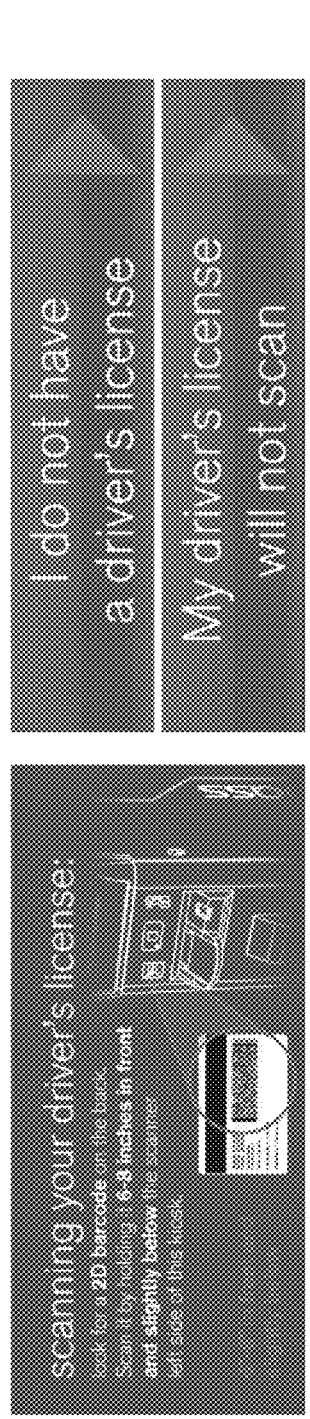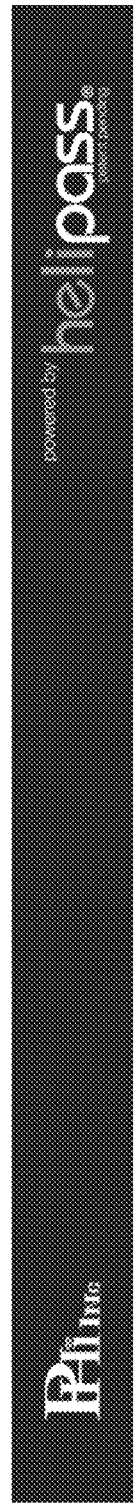
FIG. 22

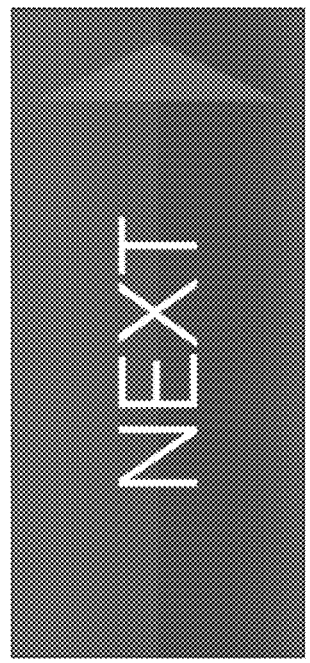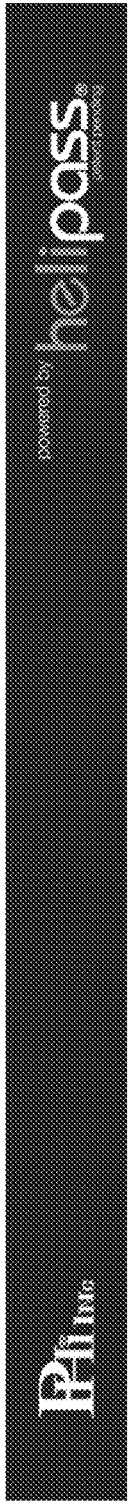
FIG. 23

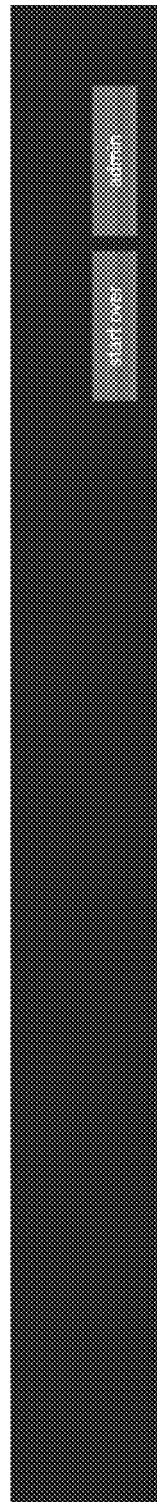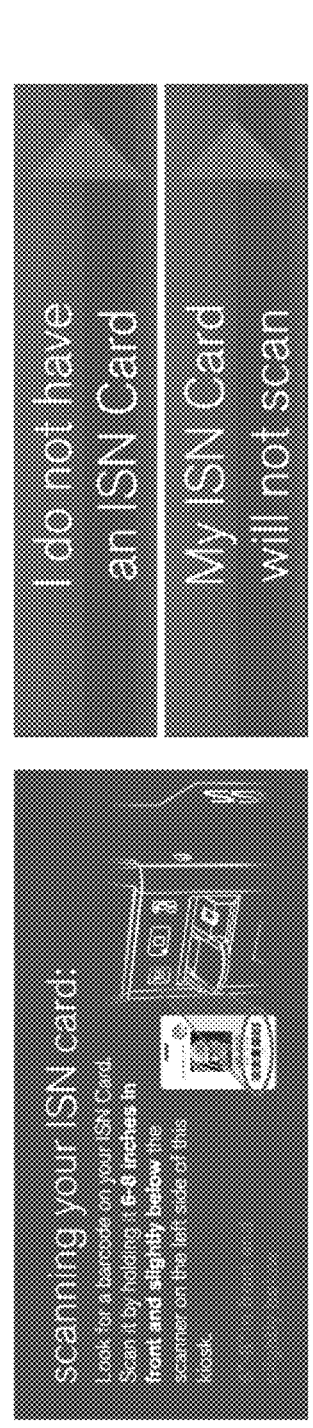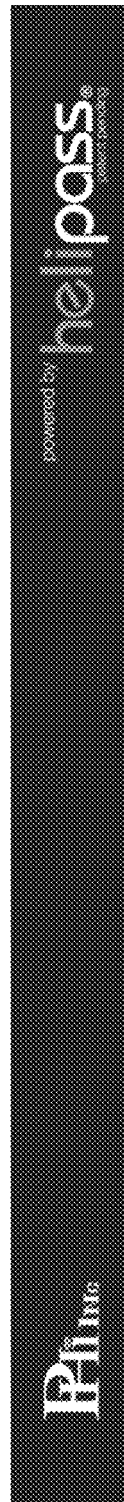
FIG. 26

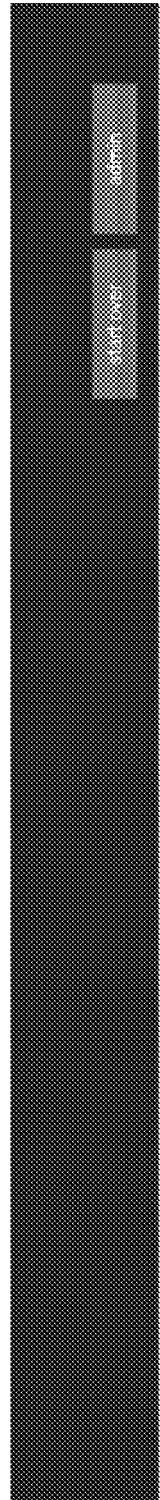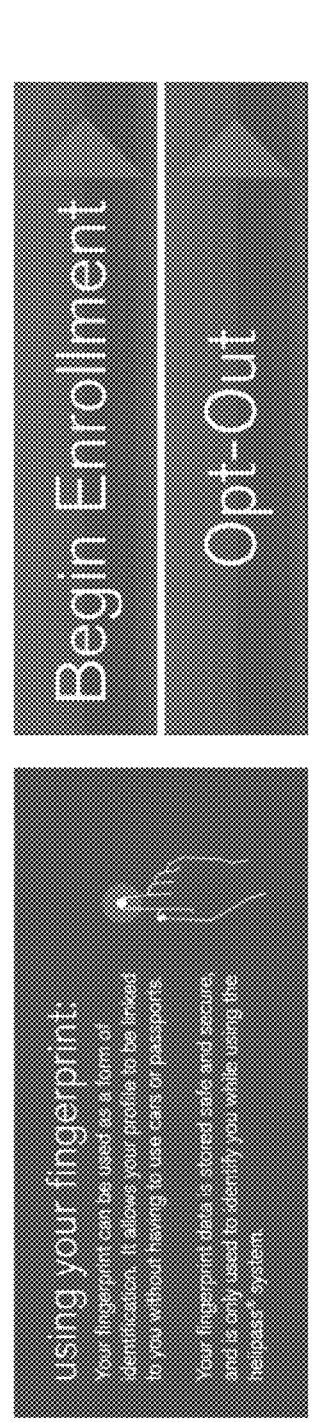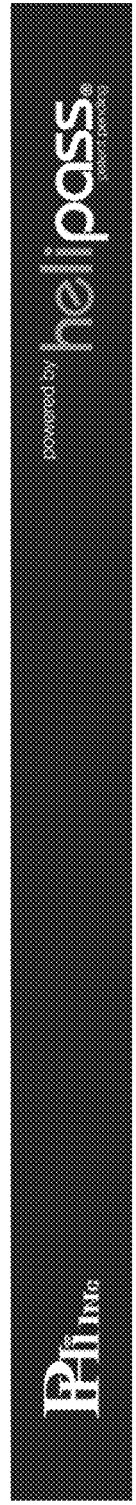
FIG. 28

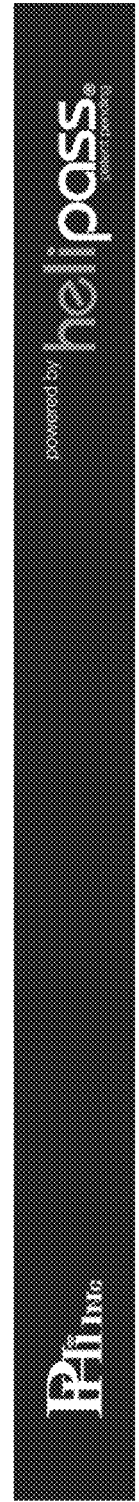
FIG. 29

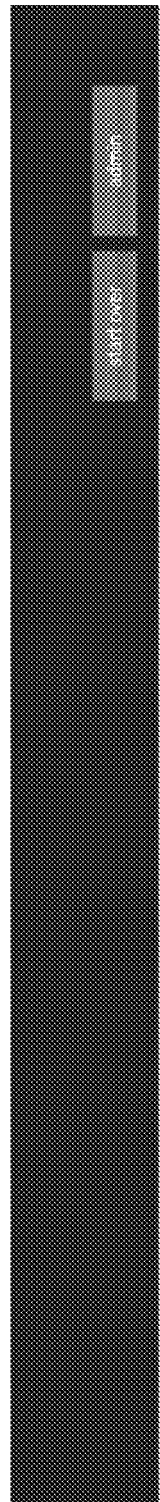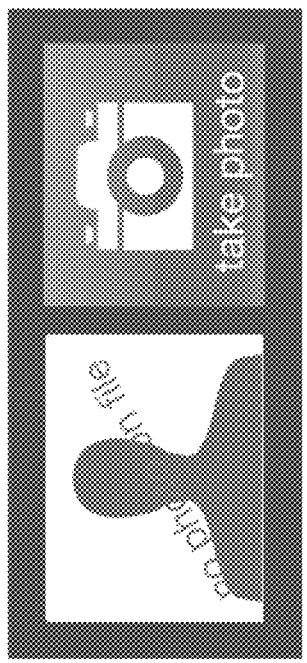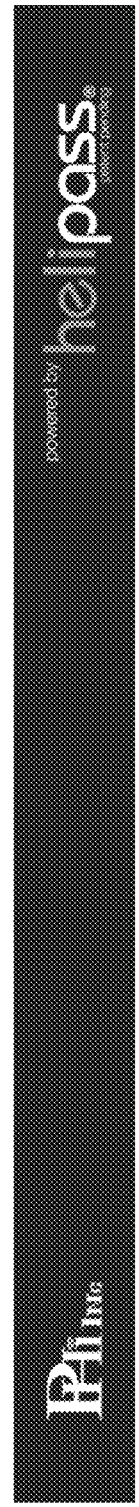
FIG. 30

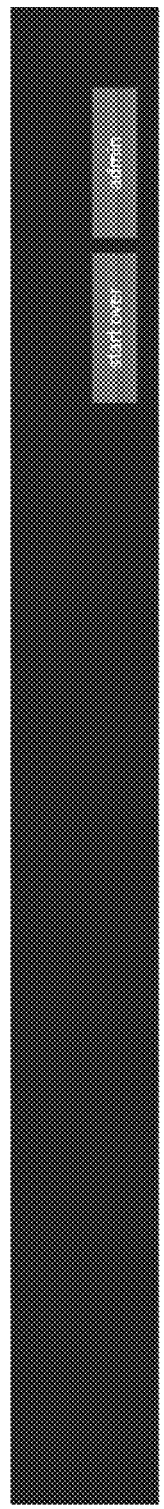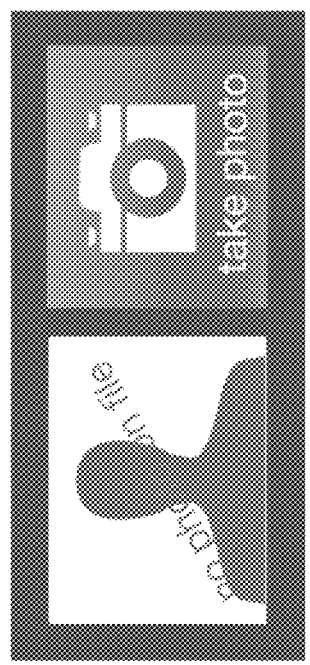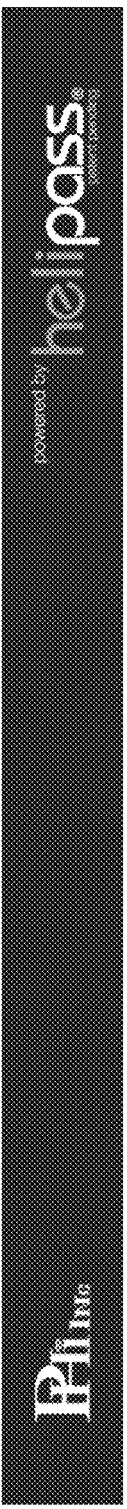
FIG. 31

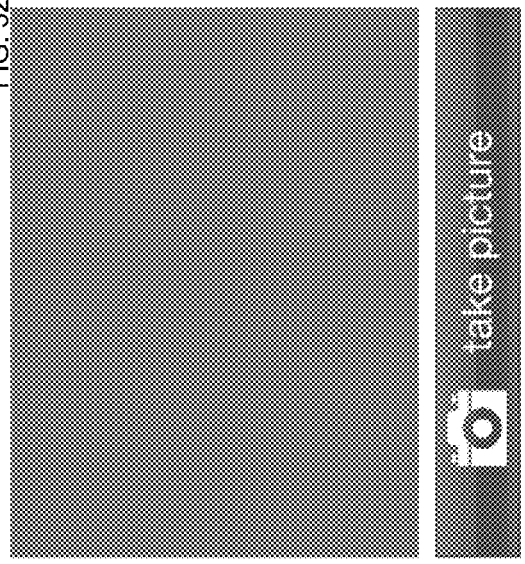
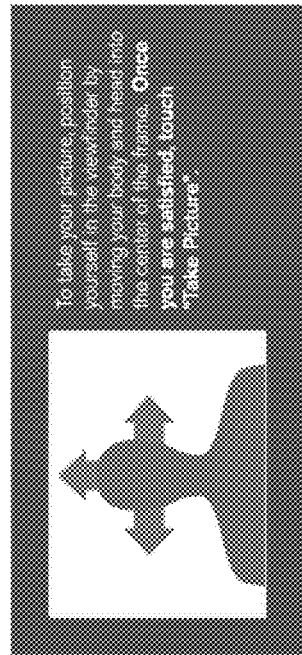
FIG. 32

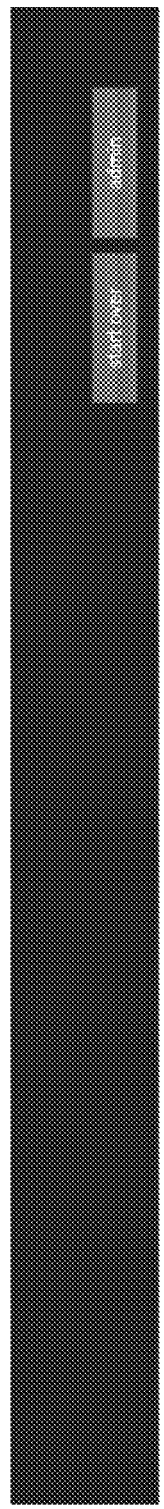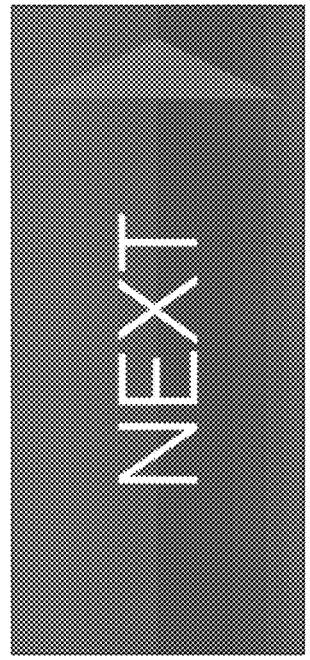
FIG. 33

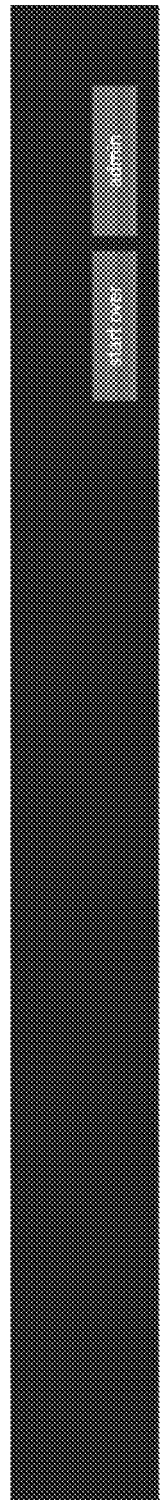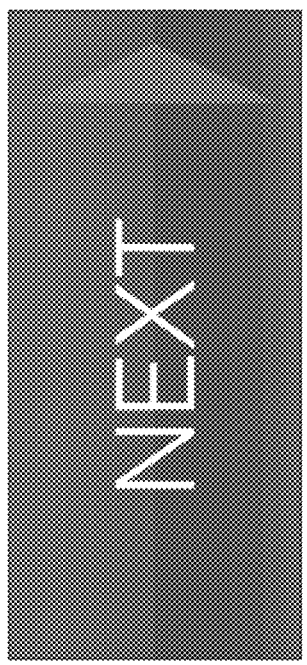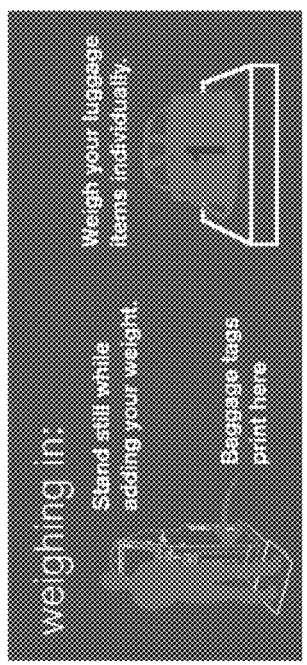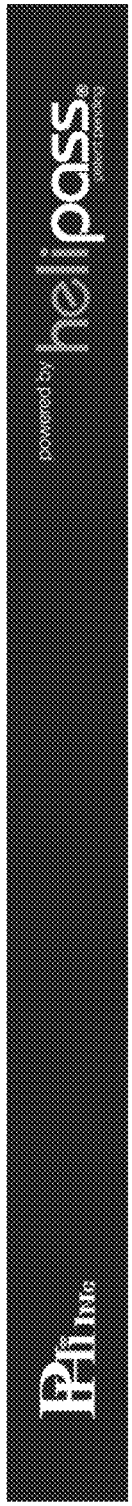
FIG. 34

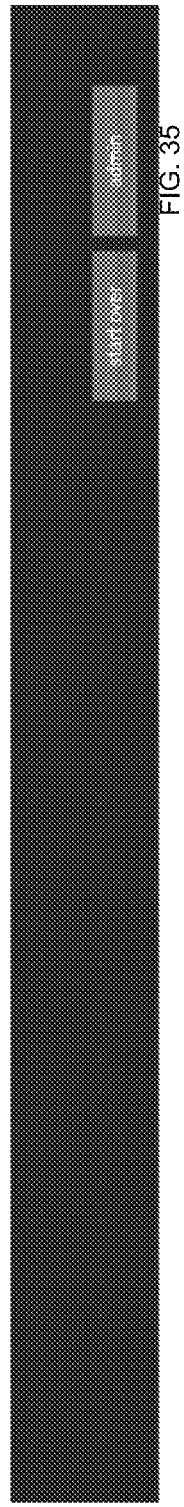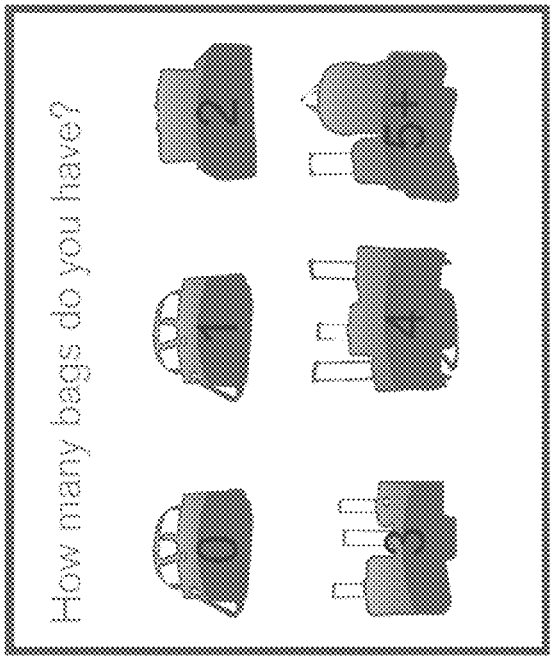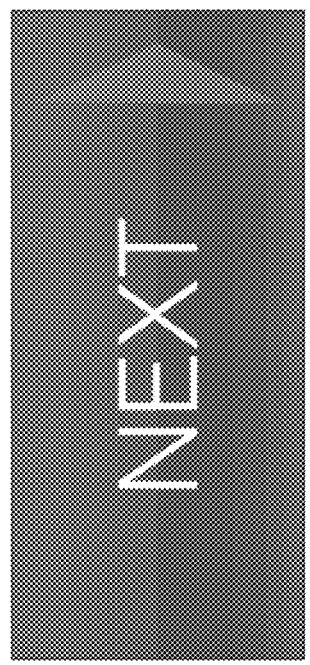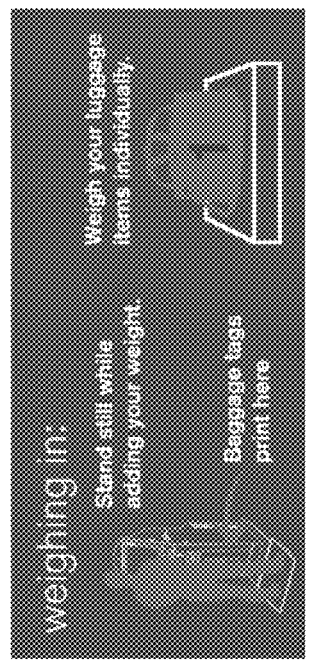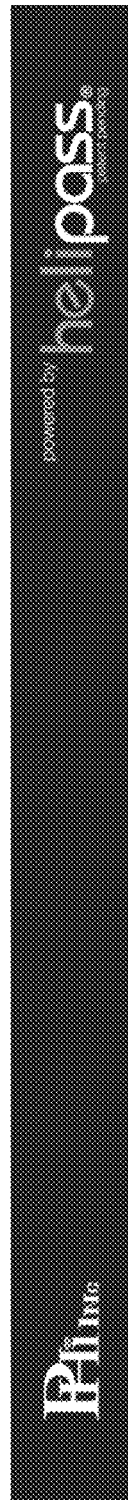
FIG. 35

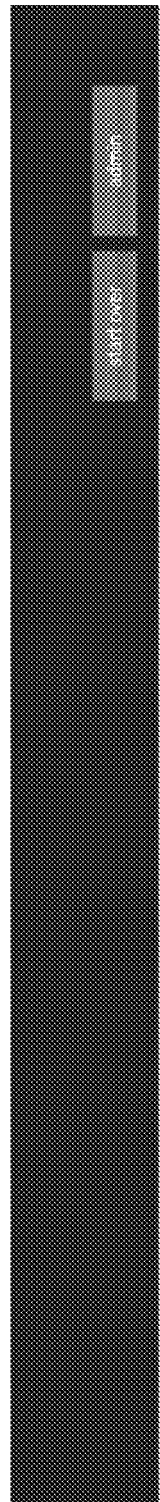
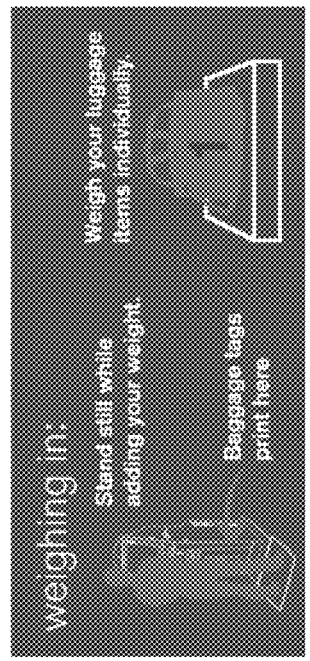
FIG. 36

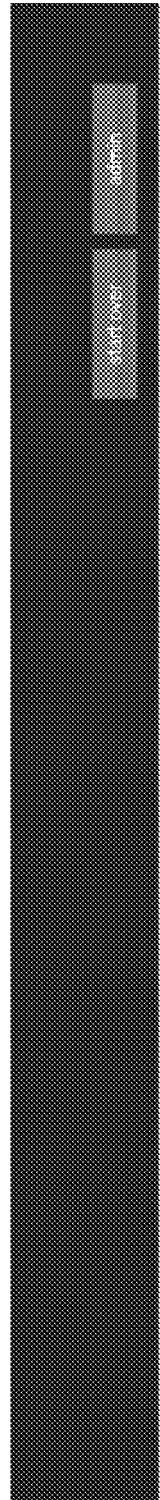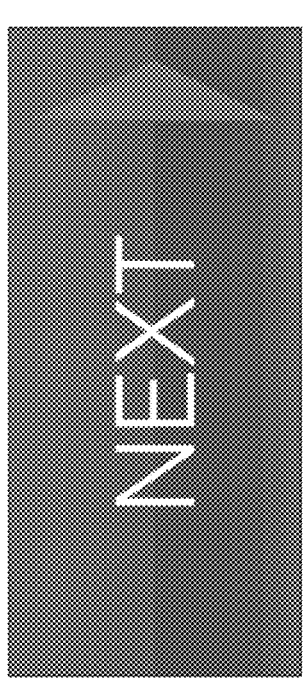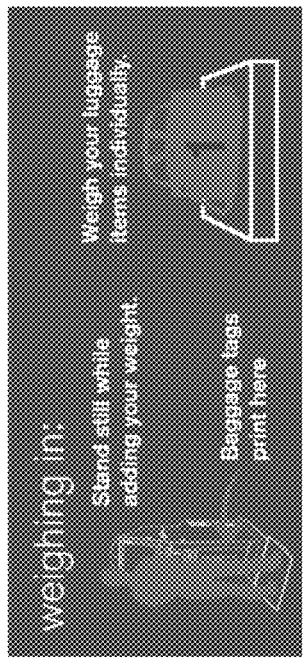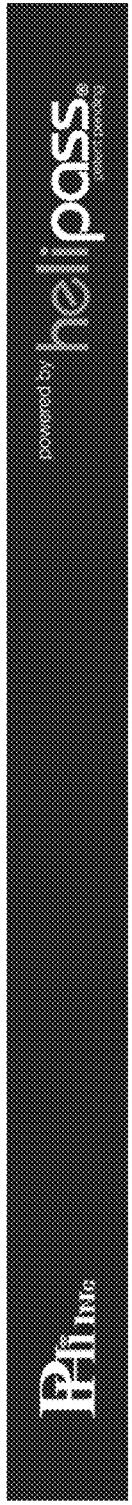
FIG. 37

Thank You for using the registration kiosk, powered by helpass®, the quickest way to check in when travelling offshore.

Your check-in is now complete.

*Touch "Finished" to return the kiosk to the Welcome Screen.*

Finished

FIG. 38

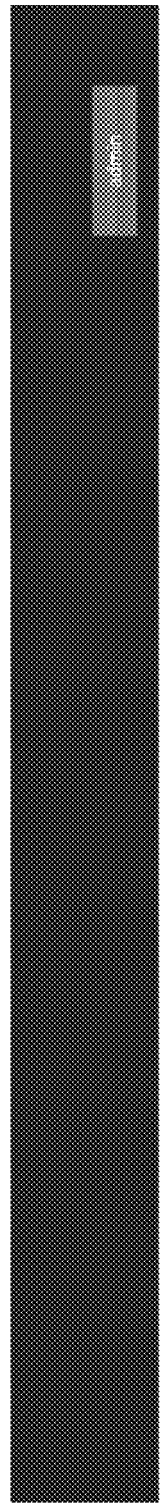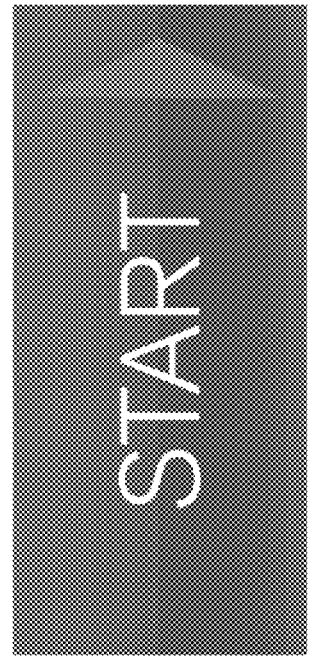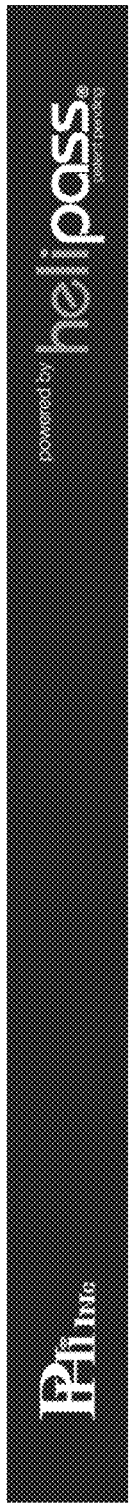
FIG. 39

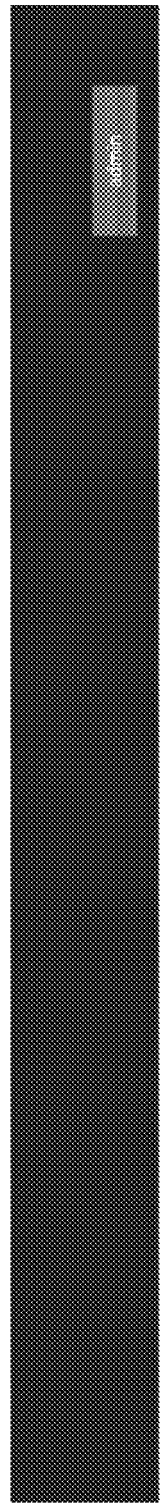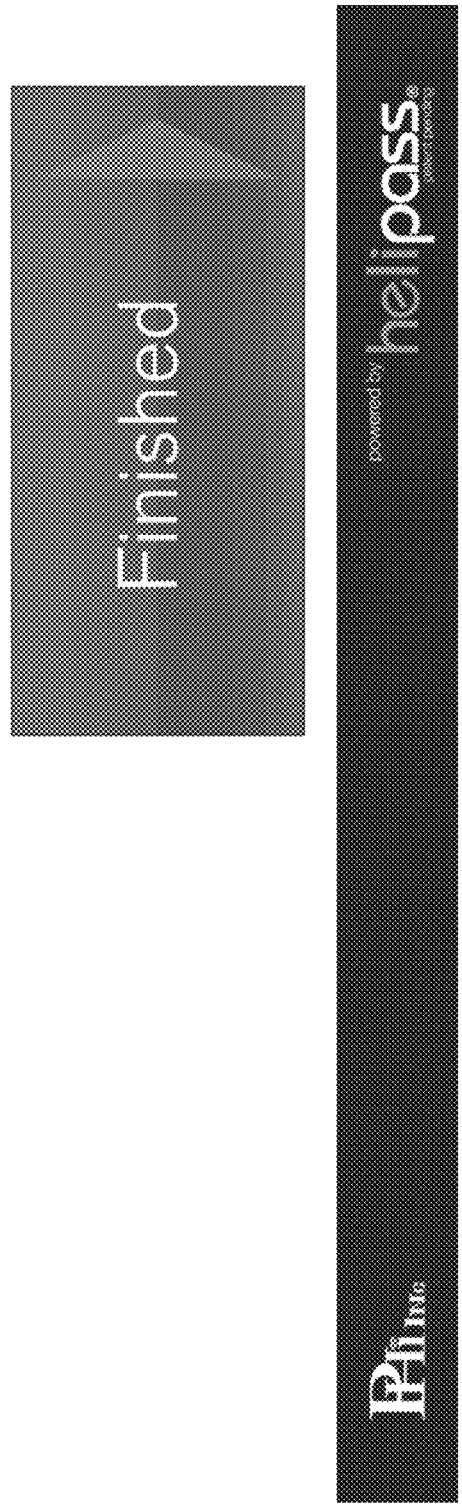
FIG. 41

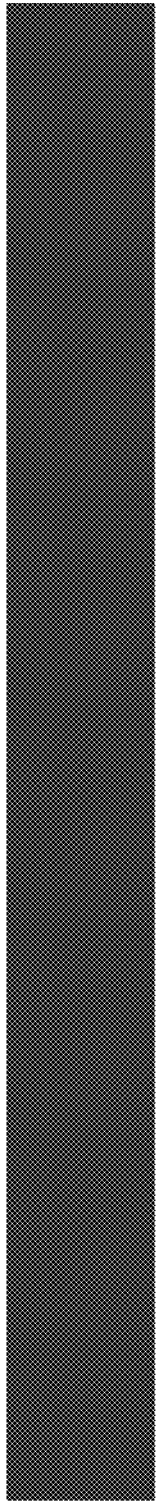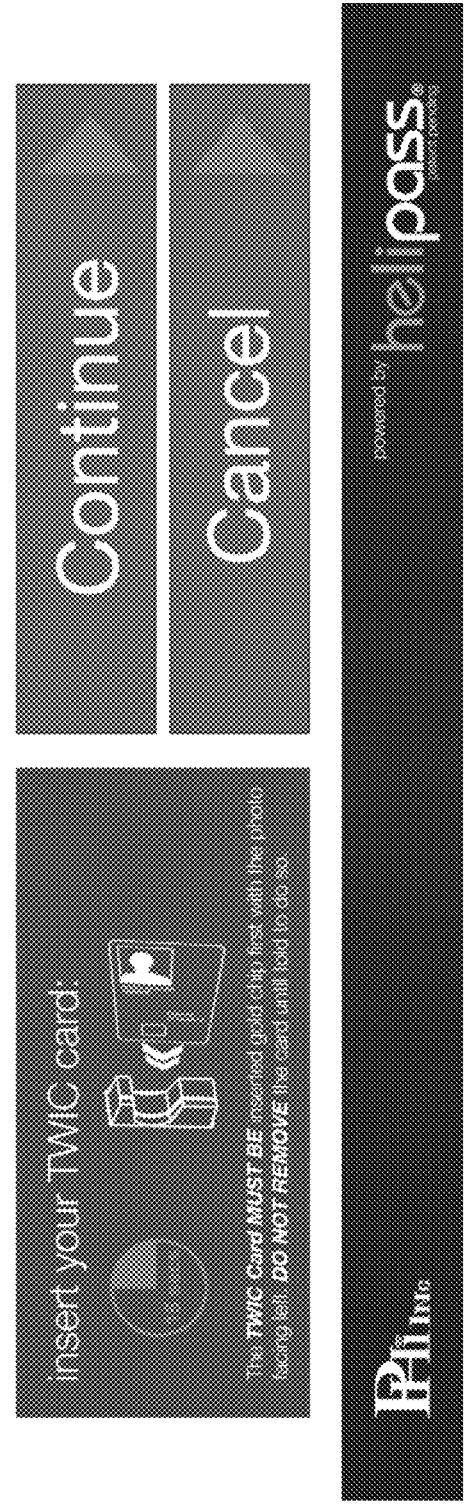
FIG. 44

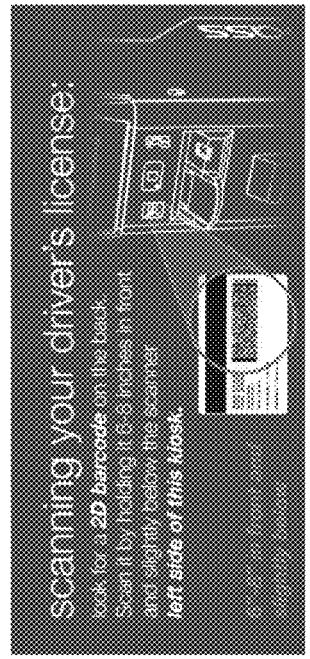

FIG. 46

Confirm or add information to the right.

*This information should match what is on your driver's license. If you need to edit the information, you may rescan your license or find an admin to assist.*

*Once the information matches your driver's license, touch "NEXT" to continue.*

The information below must match your driver's license.

First Name _____ MI _
Last Name _____
DOB __/__/19__
DL State _____
DL Number _____
DL Issued __/__/20__
DL Expires __/__/20__

NEXT

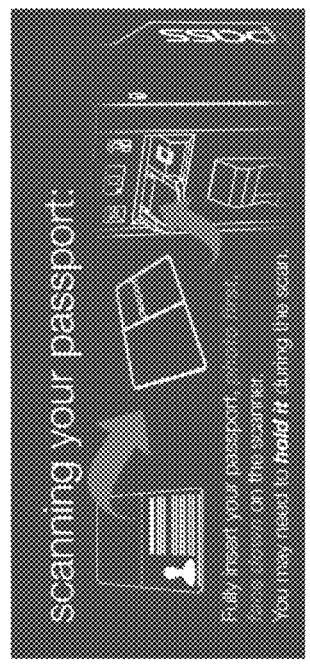
FIG. 48

FIG. 49

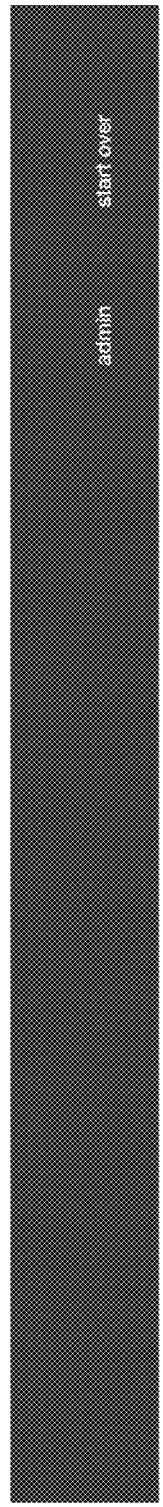
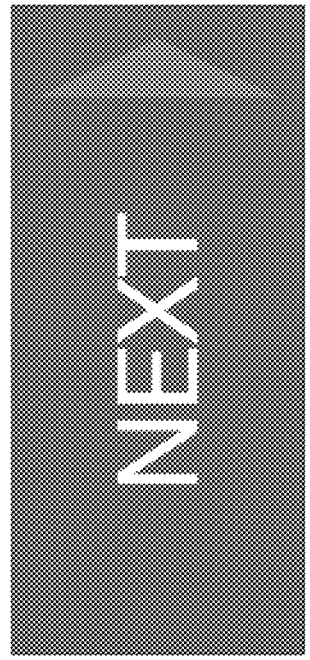
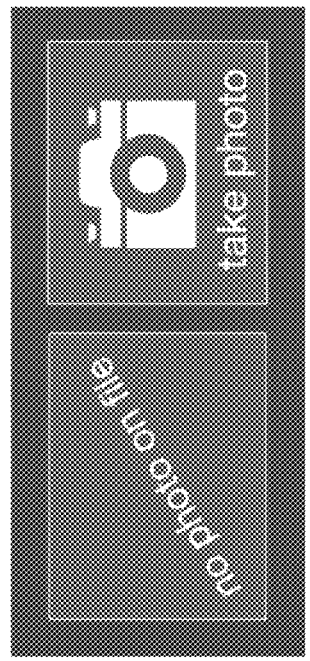
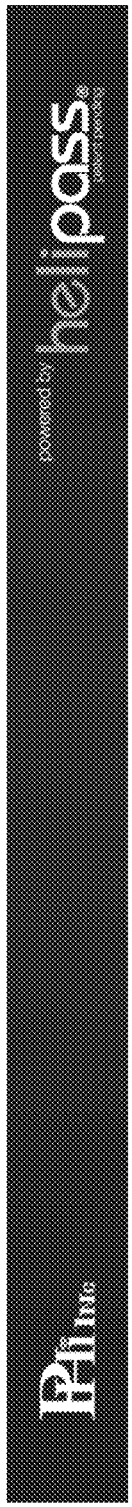

FIG. 50

You are just about done.
Please add an additional address if you have one.

A pop over window will appear for you to select your country, company, and nationality.

An on screen keypad will appear for you to type in your additional information.

If you need to update your photo, touch "take photo" in the box below.

Address
City
State/Prov
Zip
Country
Email
Phone
User Type
Company
Nationality

NEXT take photo no photo on file

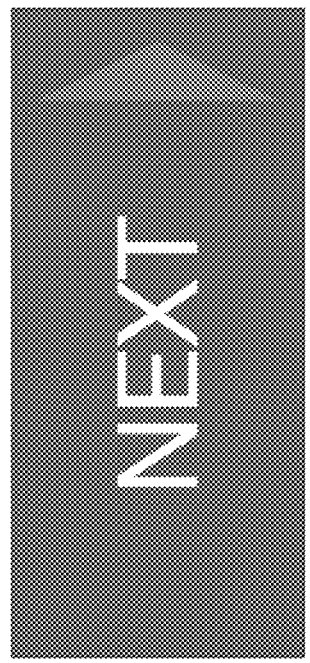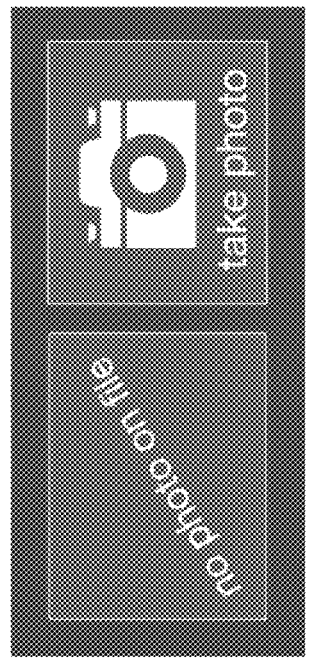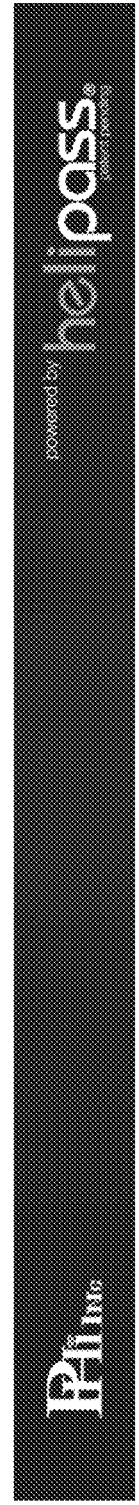

FIG. 52

Thank You for using the transport registration kiosk, *powered by helipass®*, the quickest way to check in when travelling offshore.

Your registration is now complete. You may now sign in using helipass® when travelling offshore for

*Touch "Finished" to return the kiosk to the Welcome Screen.*

Finished

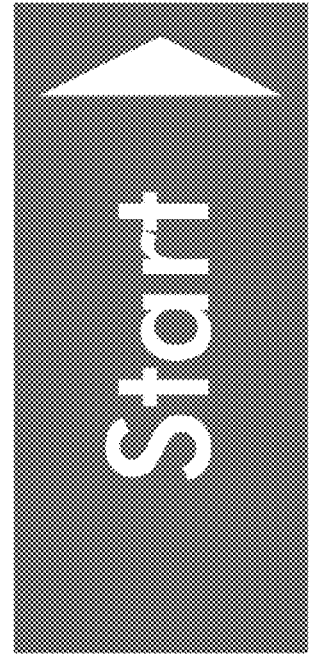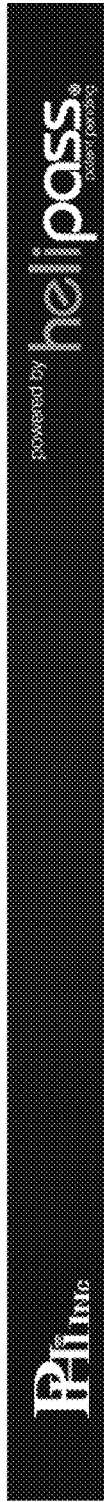

FIG. 53

Welcome to the check-in kiosk.

This kiosk is powered by helipass®, the quickest way to check-in when travelling offshore. This kiosk can be used to check-in for your flight.

To get started, please have all of your ID cards ready to scan. Scanning your ID cards will expedite entry of required information. If you need assistance, please find an admin.

Touch "Start" when ready.

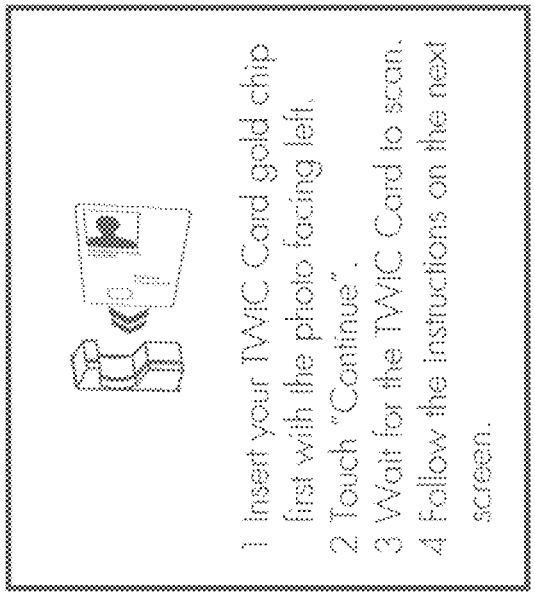

FIG. 55

Insert your TWIC Card into the insert scanner.

Find the insert scanner on the right side of this kiosk. Turn the card so the photo is facing left. Insert the gold chip first.

Follow the steps on the right. You may be prompted with more instructions.

Please wait while your TWIC Card is read. It may take up to 5 seconds.

1. Insert your TWIC Card gold chip first with the photo facing left.
2. Touch "Continue".
3. Wait for the TWIC Card to scan.
4. Follow the instructions on the next screen.

Continue

Cancel

FIG. 57

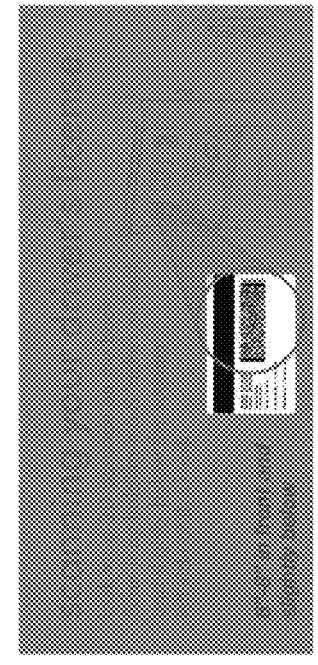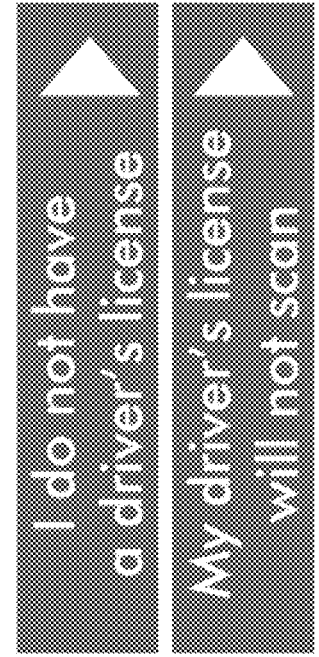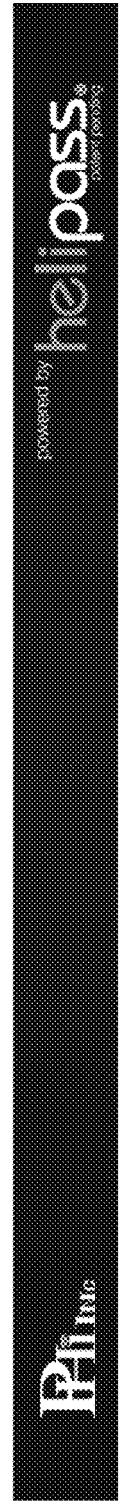
FIG. 58

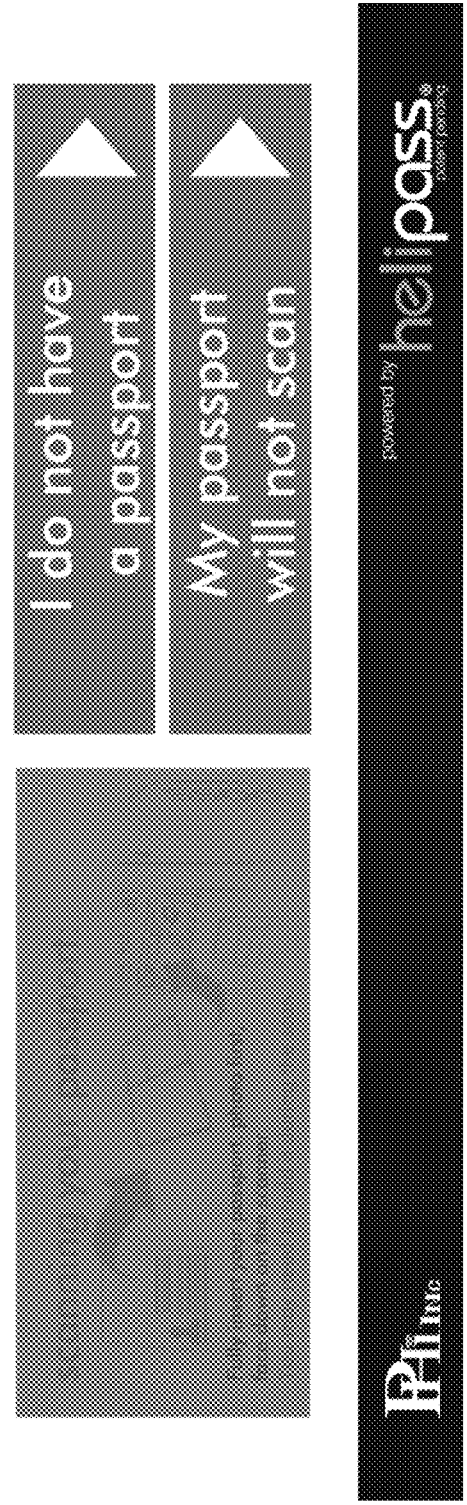
FIG. 60

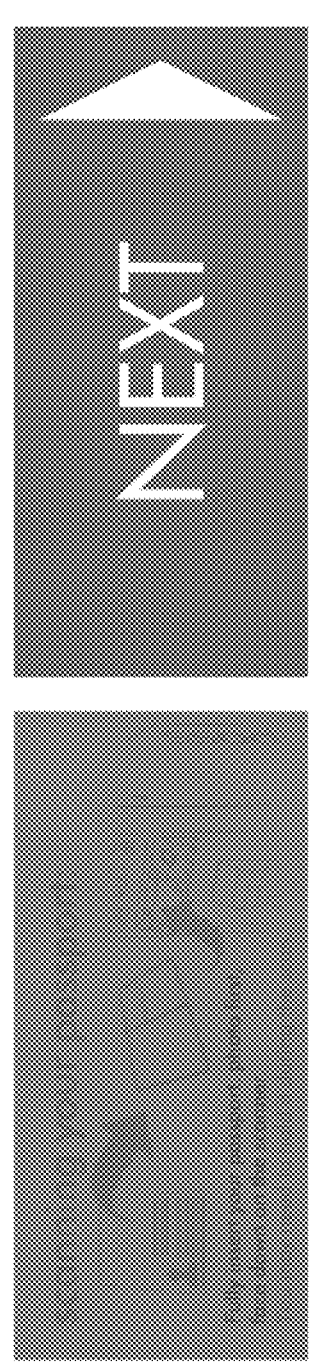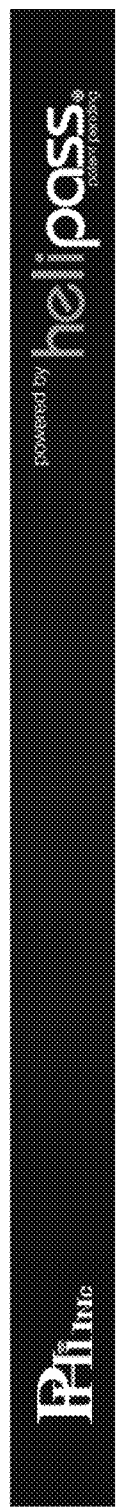
FIG. 61

FIG. 62

Please verify your information below. To edit by scanning an ID, touch "edit" next to the desired ID field. Editing entries without scanning requires assistance from an admin.

First Name | MI
Last Name
Address 1
Address 2
City
State | Zip
Company
Job

DOB __/__/19__
DI Number _____ edit
DI Issue __/__/20__
DI Exp. __/__/20__
TWIC Exp. __/__/20__ edit
Passport _____ edit
PP Exp. __/__/20__

NEXT powered by helpass

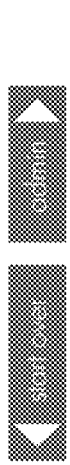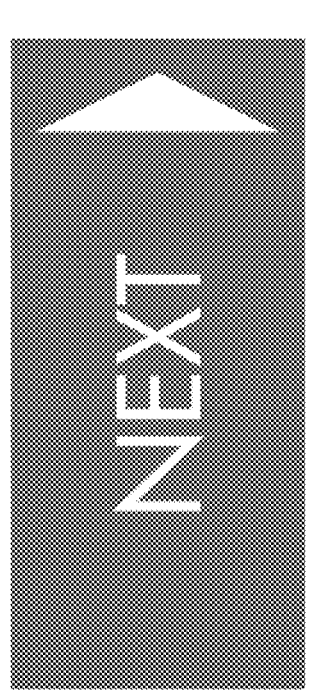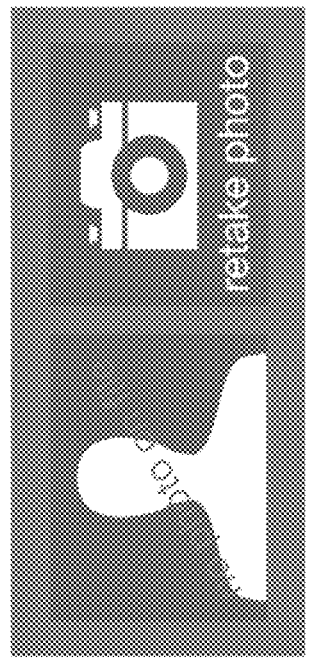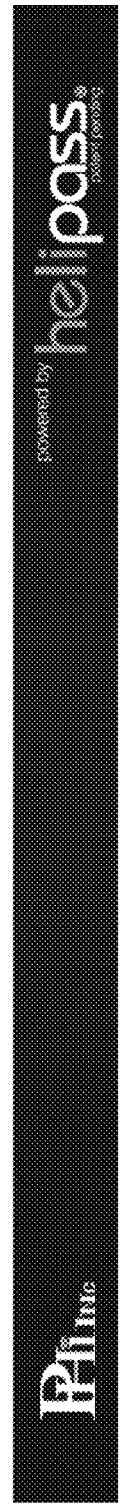

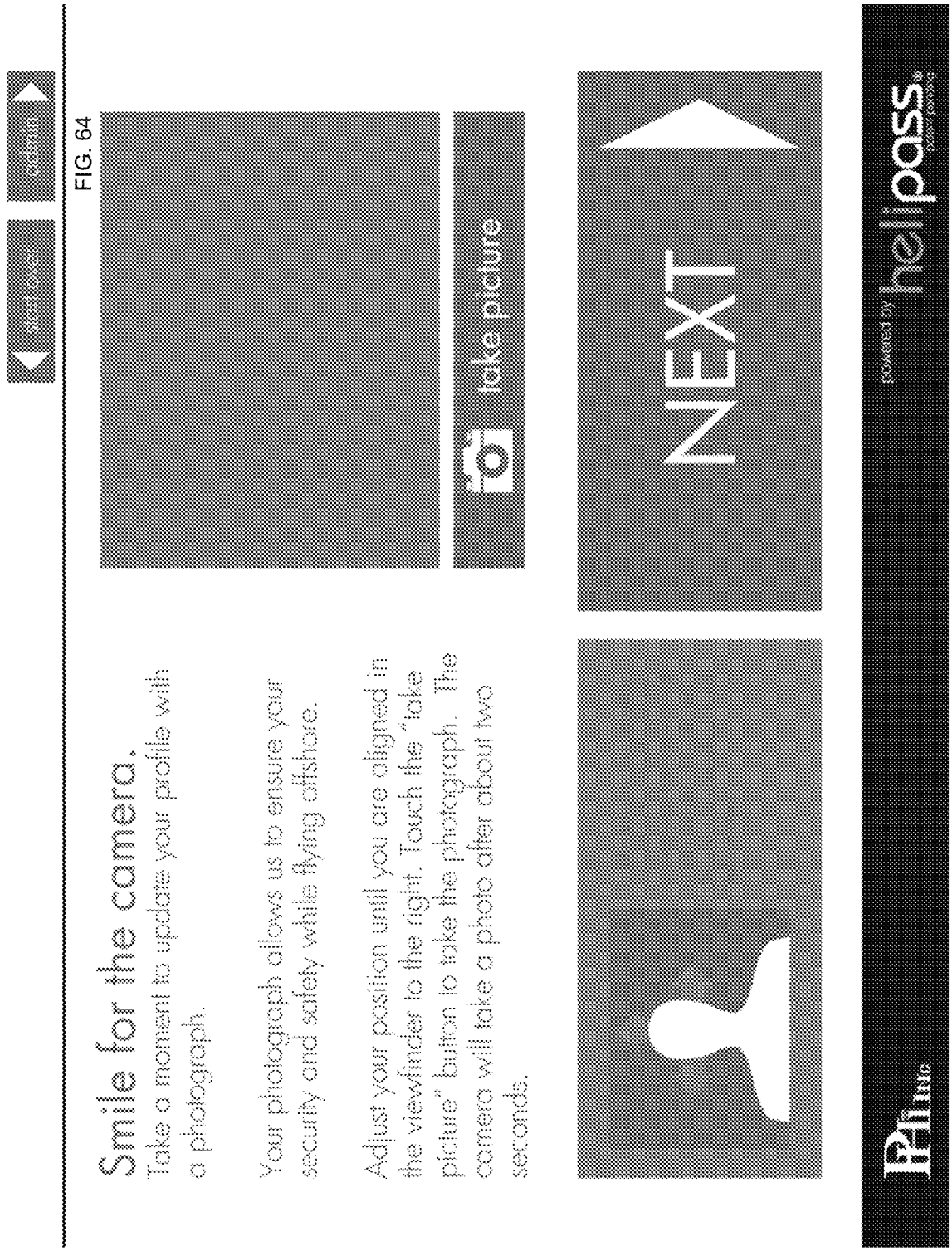

FIG. 66

UA Aviation Operations

The following items are either prohibited from being flown or require special handling. Additional DOT and TSA regulations may apply. If in doubt, declare item at check-in.

Prohibited Items

- Contraband, illegal drugs, drug paraphernalia, otherwise illegal but likely used substances, prescribed or over-the-counter drugs not being used for their intended or authorized purpose, and alcoholic beverages
- Explosives or fireworks
- Weapons, including firearms/Ammunition, tear gas, CS gas, pepper spray, tasers, clubs, martial arts items, cutting or chopping tools including knives with a blade longer than 3" (except legitimate tools, see below)
- Lithium-ion batteries (when not installed in their intended devices)
- Wet cell batteries
- Other items that could be deemed inappropriate for travel offshore

Items that must be declared at check-in - must be processed through dispatcher

- Dangerous goods (hazmat paperwork and packaging required, quantities may be limited by DOT regulations)
  - (flammable gases, liquids, and solids
  - Corrosives and flammable corrosives
  - Poisons and toxic materials
  - Oxidizers and organic peroxides
  - Compressed gas
  - Dry Ice
  - Magnetic materials
  - Radioactive Material
- Cutting and chopping tools, including knives that are tools of the trade (i.e. chef's and divers' knives, box cutter, etc.
- Fragile items and computers
- Other items that could be deemed inappropriate for travel to site

FIG. 69

Let's weigh you in.

You should be standing on the scale in front of this kiosk. We are going to weigh you first, then we'll take care of your luggage.

Follow the prompts on the right in the input panel to capture your weight, baggage count, and baggage weight. Tags will print below as you weigh each bag.

Place your bag one at a time on the baggage scale. Indicate whether the bag is fragile by selecting "Y" or "N" below.

Touch "Print Tag" to print your baggage tag.

Fragile?  NO  YES

Bag #  _____ lbs.

Print Tag

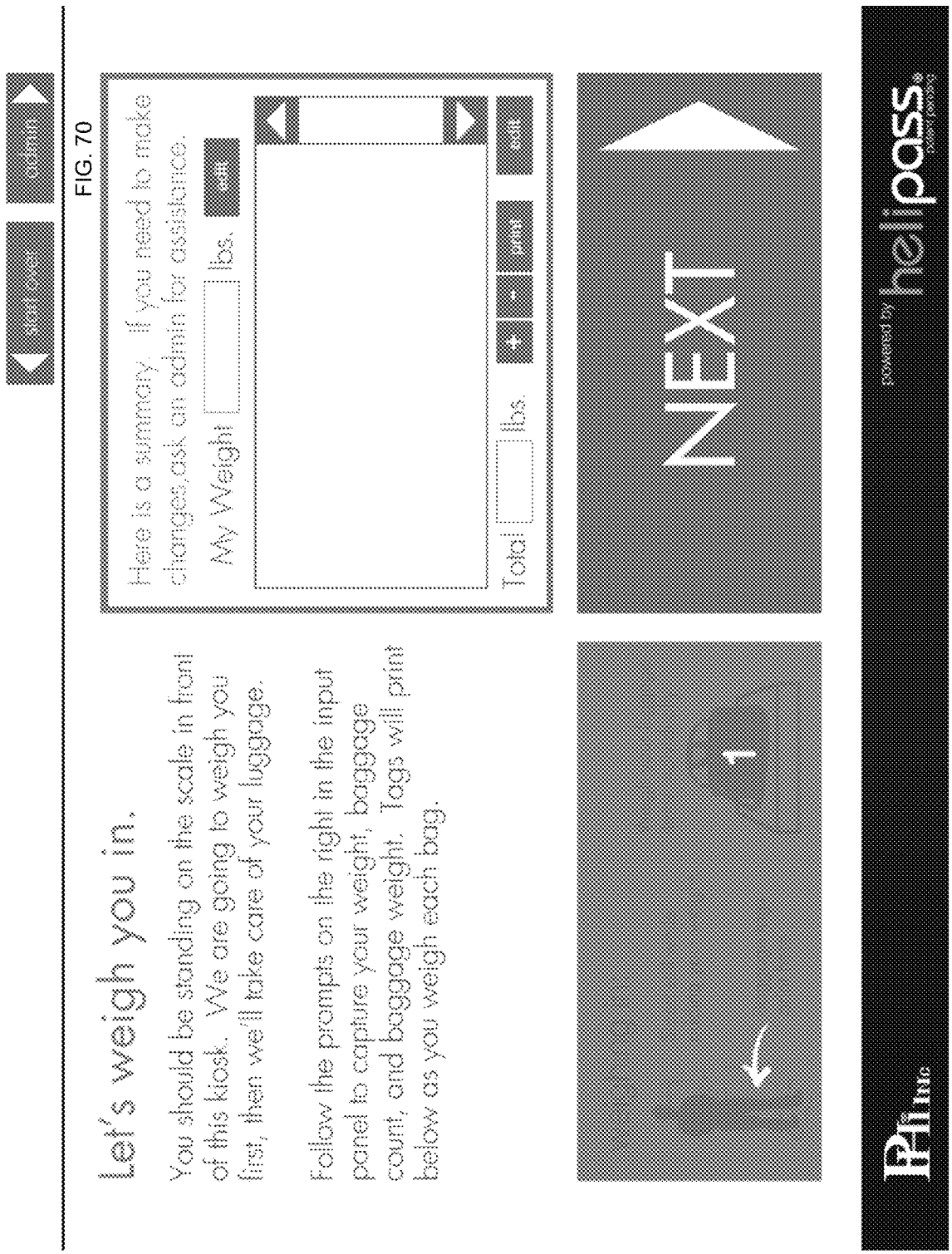

Thank You for using the check-in kiosk powered by helipass®, the quickest way to check in when travelling offshore.

Your check-in is now complete.

Touch "Finished" to return the kiosk to the Welcome Screen.

Thank You for using the Shell registration kiosk powered by helipass®, the quickest way to check in when travelling offshore.

Your registration is now complete.

Touch "Finished" to return the kiosk to the Welcome Screen.

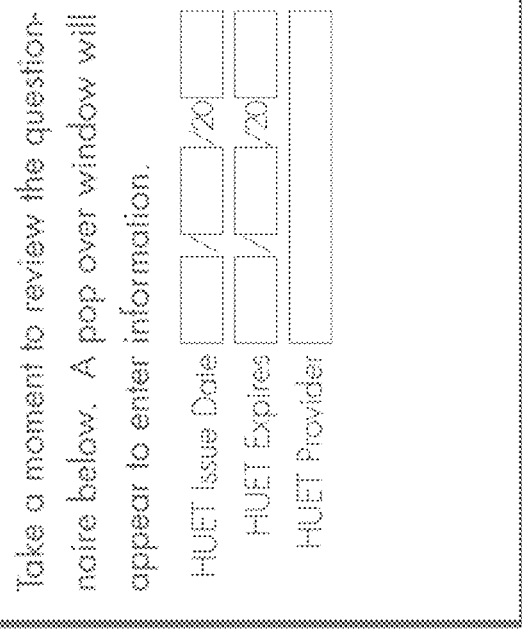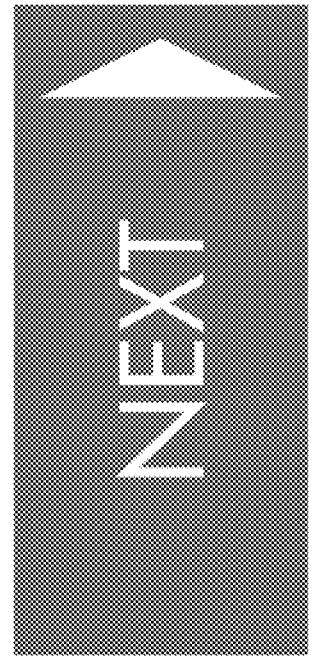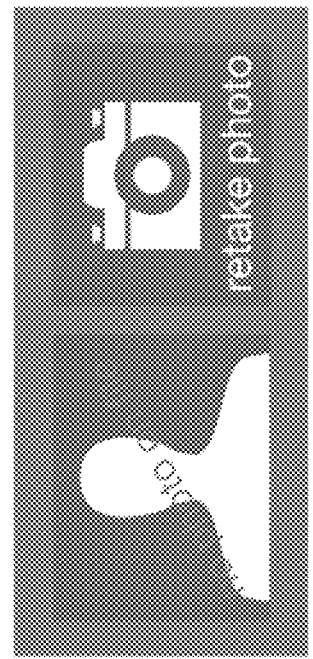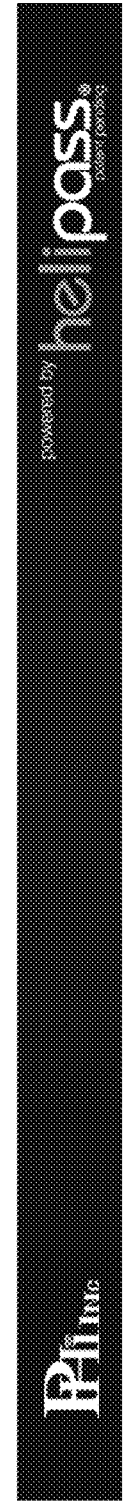
FIG. 73

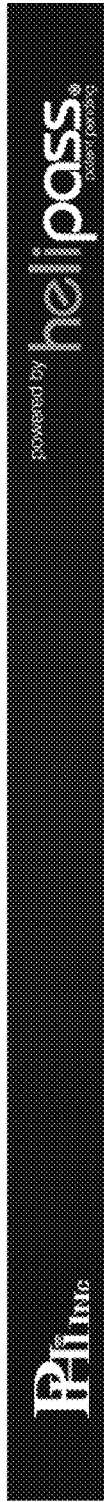
FIG. 74

KIOSK FOR ENERGY INDUSTRY LOGISTICS

CROSS-REFERENCE TO RELATED APPLICATIONS

Priority of our U.S. Provisional Patent Application Ser. No. 61/591,704, filed 27 Jan. 2012, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to kiosks for passenger and cargo processing in the energy sector. More particularly, the present invention relates to kiosks for oilfield helicopter, small airplane, and marine travel.

2. General Background of the Invention

There are self check-in kiosks at many airports. However, to the knowledge of the inventors, passenger and cargo processing kiosks are not being utilized in the heliports, marine ports, and other ports that service the energy sector.

The following patents and publications and websites are incorporated herein by reference: EP2369554; US2005/0258231; US2008/0024271; US2011/0173549; U.S. Pat. No. 6,119,096: System and method for aircraft passenger check-in and boarding using iris recognition; U.S. Pat. No. 7,628,324; U.S. Pat. No. 7,086,591: Airport check-in system and method; U.S. Pat. No. 6,695,203: Boarding pass processing unit, boarding gate reader, person collation unit, boarding system, boarding pass, boarding pass processing method, service kiosk for boarding pass; http://www.fixairlines.com/; http://www.aircanada.com/en/travelinfo/airport/expresscheckin/index.html; http://www.westjet.com/guest/en/travel/basics/check-in/self-bag-tagging.shtml; http://www.amtrak.com/servlet/ContentServer?c=Page&pagename=am%2FLayout&cid=124126 7362173; http://www.dataflyt.com/index.html (weighs a passenger and scans a drivers license).

BRIEF SUMMARY OF THE INVENTION

The present invention includes an automated kiosk and related apparatus for providing self-service check-in and boarding services to energy sector passengers and cargo. The present invention includes software and hardware. Preferably, the kiosk and related apparatus can take and store a picture of the passenger, calculate and/or measure the weight of the passenger and the passenger's luggage and/or cargo, print luggage tags and boarding printouts that contain the passenger's photo, check identification, check third parties' databases (such as a no-fly list (NFL), or other customer specific screening requirements, such as any destination specific training requirement and drug screening requirements) for approval for the passenger's flight and can transmit data to another location (server, third party employer, pilot). The present invention can also be used in freight shipping and other transportation check-in and tracking.

In a preferred embodiment of the present invention, the apparatus includes a transportation sector style self-service kiosk capable of passenger self check-in and boarding pass issuance with added functionality related to the energy sector. The apparatus preferably includes a display screen which faces the passenger and optionally a similar second display screen which is visible to a representative or an employee of the energy transport service company. This second display screen can be in a bank of screens visible to the employee when there are multiple kiosks at a transportation port. The second display screen preferably displays everything which is displayed to the passenger, and may additionally display security warnings and other safety instructions, for example. These can include, for example, (1) Is the passenger listed on a No Fly List? (2) Has the passenger been selected for a random drug screening? (3) Does the passenger meet the training requirement of his/her destination? (4) Are the passenger's ID(s) valid? The display on this second screen is preferably not visible to the passenger. Preferably, the representative or employee can override information input by the passenger.

Preferably, there is a reader for reading a TWIC (Transportation Worker Identification Credential) card either wirelessly through RFID or via a contact smart card reader, a reader for reading a drivers license 1D/2D barcode, a reader for reading a magnetic stripe (such as on a credit card, a drivers license, state IDs, military IDs, or a passport), a reader for reading a passport, a reader for reading a fingerprint biometrically, and a camera for taking a passenger's picture.

The apparatus preferably includes a scale or scales for weighing the passenger and any luggage/packages of the passenger; for example, there can be a pressure pad scale on which the passenger stands while checking in which automatically weighs the passenger, and the passenger can pick up his luggage and packages so that everything, including the passenger, is weighed at one time, or there can be a separate scale for weighing the luggage and packages which is operatively connected to the kiosk. The detected weight readings are preferably displayed on the kiosk screen and the employee screen. When there is a second scale, it is preferably adjacent the kiosk so that the luggage and packages can be easily loaded onto the second scale by the passenger during check-in. The weights can be used to help determine passenger seating and luggage placement to help balance aircraft, for example.

Preferably, the kiosk prints labels to attach to the luggage and packages which includes such information as passenger name, passenger flight number, weight of package or luggage, and date of travel, as well as whether the luggage or package is fragile or overweight. Labels are preferably color and symbol coded by destination to allow for better baggage handling and sorting. Markings can also be used to indicate fragile or overweight items.

The kiosks of the present invention can be similar in appearance and function to those in use at airports by commercial airline passengers (these are free-standing kiosks). These kiosks, as preferably do the kiosks of the present invention, typically include a cabinet, a display screen (preferably touch-screen) accessible to a passenger standing in front of the kiosk, a computer for processing information received from the passenger and for displaying information on the display screen, and a printer for printing boarding passes (and in the case of the present invention, luggage tags). These free standing kiosks are typically about 62 inches (157.5 cm) high, 23 inches (58.4 cm) wide, 27.5 inches (69.9 cm) deep, with the display screen usually being a size of about 19 (48.3 cm) inches diagonally, with the center of the screen usually being about 50 inches (127.0 cm) from the floor, though sizes will vary depending upon the needs of a facility or customer. The present invention preferably also includes countertop kiosks and wall mounted kiosks. Typically, a countertop kiosk would include a display screen as in the free-standing kiosk, but usually would connect to a separate printer; the countertop kiosk would likely be about 20 inches (50.8 cm) tall by about 20 inches (50.8 cm) wide and about 24 inches (61.0 cm) deep, though sizes will vary depending upon the needs of a facility or customer. Typically a wall-mounted kiosk would be about the same height and width as a countertop kiosk, but probably only about 7 or 8 inches (17.8 or 20.3 cm) deep at most, though sizes will vary depending upon the needs of a facility or customer. It would also preferably be connected to a separate printer; exemplary dimensions for a wall-mount kiosk are about 12.5" (31.8 cm) high by 27.5" (69.9 cm) high by 4.5" (11.4 cm) deep.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings (in which for ease of illustration some cabling is omitted), wherein like reference numerals denote like elements and wherein:

FIG. 20 is a screen shot of a TWIC card scan screen for a preferred embodiment of the apparatus of the present invention;

FIG. 22 is a screen shot of a drivers' license scan screen for a preferred embodiment of the apparatus of the present invention;

FIG. 23 is a screen shot of a manual drivers' license entry screen for a preferred embodiment of the apparatus of the present invention;

FIG. 26 is a screen shot of an ISN Card scan screen for a preferred embodiment of the apparatus of the present invention;

FIG. 28 is a screen shot of a fingerprint begin screen for a preferred embodiment of the apparatus of the present invention;

FIG. 29 is a screen shot of a fingerprint enrollment screen for a preferred embodiment of the apparatus of the present invention;

FIG. 30 is a screen shot of a first profile update screen for a preferred embodiment of the apparatus of the present invention;

FIG. 31 is a screen shot of a second profile update screen for a preferred embodiment of the apparatus of the present invention;

FIG. 32 is a screen shot of a photo-taking screen for a preferred embodiment of the apparatus of the present invention;

FIG. 33 is a screen shot of an emergency contact entry screen for a preferred embodiment of the apparatus of the present invention;

FIG. 34 is a screen shot of a weigh-in screen for a preferred embodiment of the apparatus of the present invention;

FIG. 35 is a screen shot of a bag count screen for a preferred embodiment of the apparatus of the present invention;

FIG. 36 is a screen shot of a bag weight screen for a preferred embodiment of the apparatus of the present invention;

FIG. 37 is a screen shot of a weight summary screen for a preferred embodiment of the apparatus of the present invention;

FIG. 38 is a screen shot of a finish screen for a preferred embodiment of the apparatus of the present invention;

FIG. 39 is a screen shot of a registration specific welcome screen for a preferred embodiment of the apparatus of the present invention;

FIG. 41 is a screen shot of a registration specific finish screen for a preferred embodiment of the apparatus of the present invention;

FIG. 44 is a screen shot of manual TWIC Card screen for an alternate embodiment of the apparatus of the present invention;

FIG. 46 is a screen shot of a manual drivers' license screen for an alternate embodiment of the apparatus of the present invention;

FIG. 48 is a screen shot of a manual passport screen for an alternate embodiment of the apparatus of the present invention;

Figure 49:
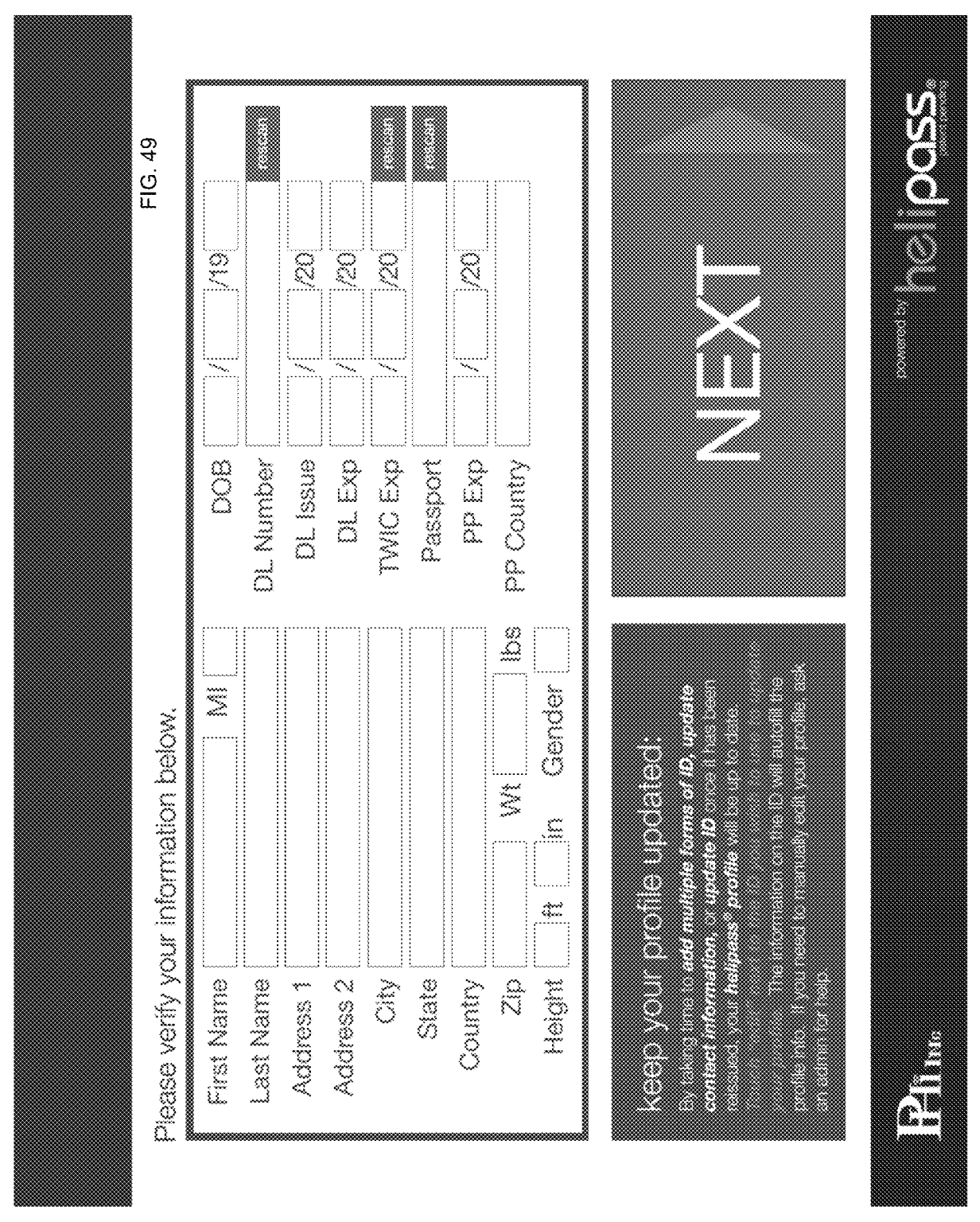

FIG. 49 is a screen shot of a profile verification screen for an alternate embodiment of the apparatus of the present invention;

FIG. 50 is a screen shot of an additional address entry screen for an alternate embodiment of the apparatus of the present invention;

FIG. 51 is a screen shot of an admin training screen for an alternate embodiment of the apparatus of the present invention;

FIG. 52 is a screen shot of a finish screen for an alternate embodiment of the apparatus of the present invention;

FIG. 53 is a screen shot of a welcome screen for an alternate embodiment of the apparatus of the present invention;

FIG. 55 is a screen shot of manual TWIC Card screen for an alternate embodiment of the apparatus of the present invention;

Figure 57:
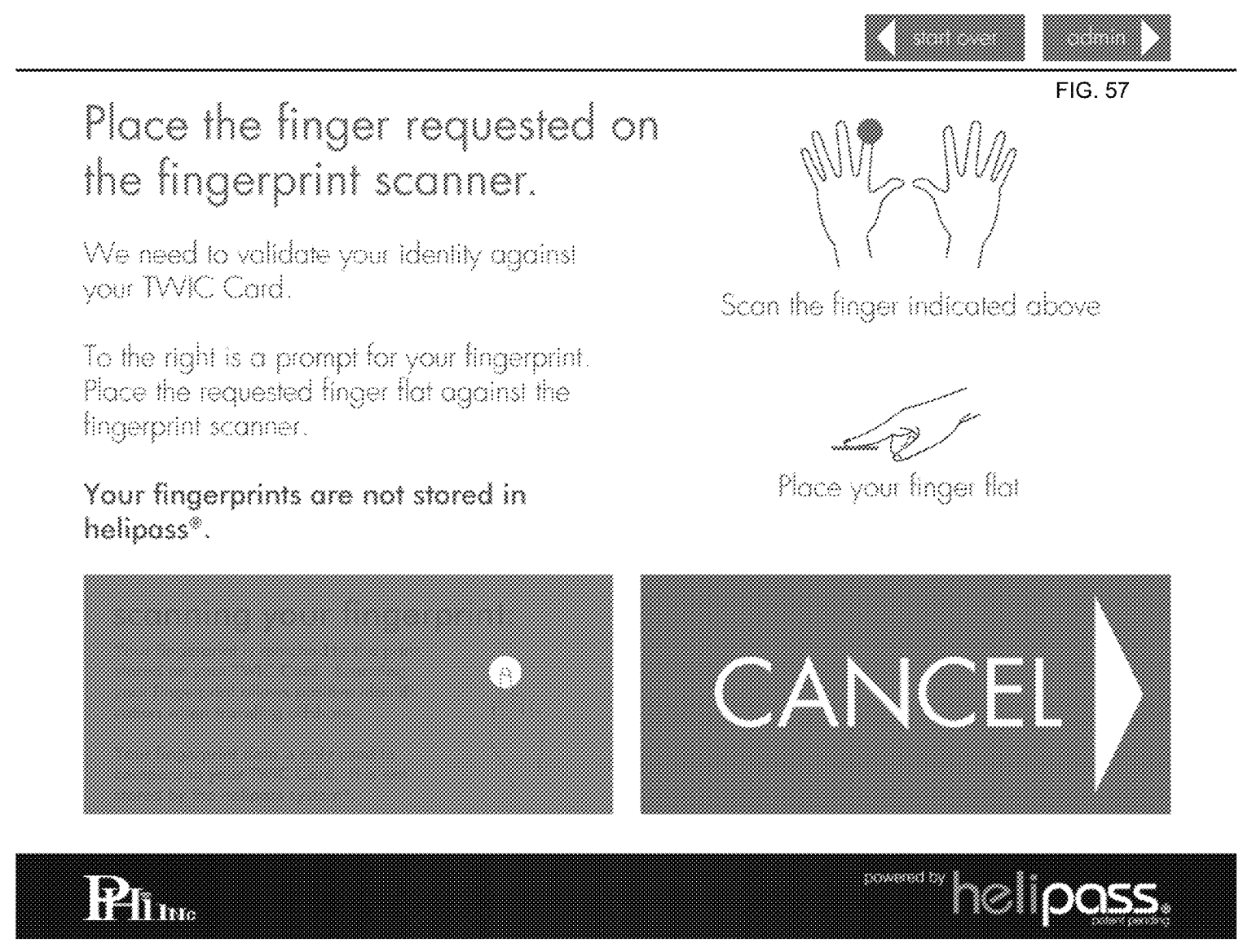

FIG. 57 is a screen shot of a fingerprint scan screen for an alternate embodiment of the apparatus of the present invention;

FIG. 58 is a screen shot of a drivers' license scan screen for an alternate embodiment of the apparatus of the present invention;

FIG. 60 is a screen shot of a passport scan screen for an alternate embodiment of the apparatus of the present invention;

FIG. 61 is a screen shot of a manual passport screen for an alternate embodiment of the apparatus of the present invention;

FIG. 62 is a screen shot of a profile verification screen for an alternate embodiment of the apparatus of the present invention;

FIG. 63 is a screen shot of a HUET destination entry screen for an alternate embodiment of the apparatus of the present invention;

FIG. 64 is a screen shot of a photo-taking screen for an alternate embodiment of the apparatus of the present invention;

FIG. 66 is a screen shot of a UA Aviation prohibited item declaration notice screen for an alternate embodiment of the apparatus of the present invention;

FIG. 69 is a screen shot of a bag weight screen for an alternate embodiment of the apparatus of the present invention;

FIG. 70 is a screen shot of a weight summary screen for an alternate embodiment of the apparatus of the present invention;

FIG. 73 is a screen shot of a registration specific HUET training entry screen for an alternate embodiment of the apparatus of the present invention;

FIG. 74 is a screen shot of a registration specific privacy policy screen for an alternate embodiment of the apparatus of the present invention.

DETAILED DESCRIPTION OF THE INVENTION

Figure 1:
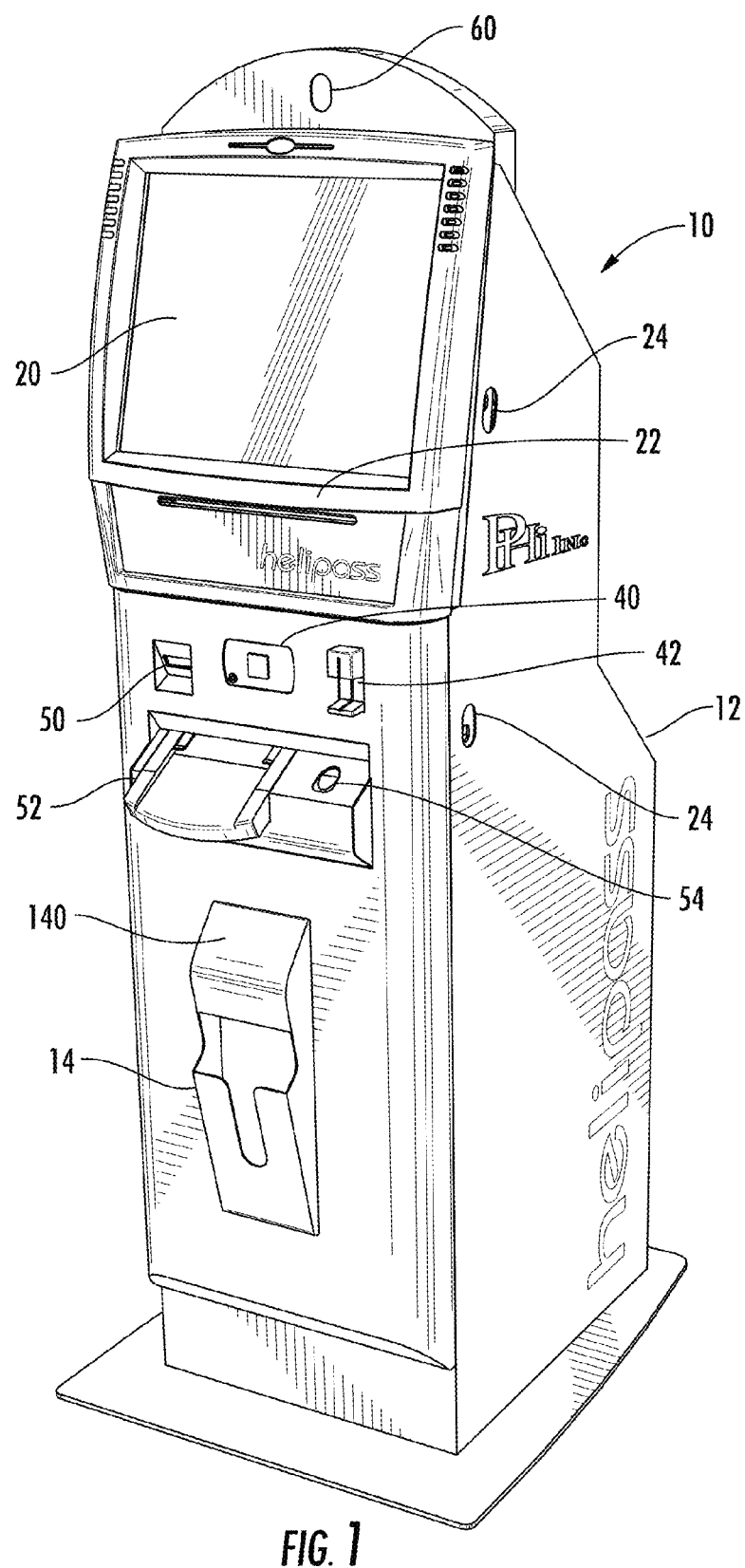
FIG. 1 is a perspective view of a preferred embodiment of the apparatus of the present invention (a stand-alone kiosk)
Figure 2:
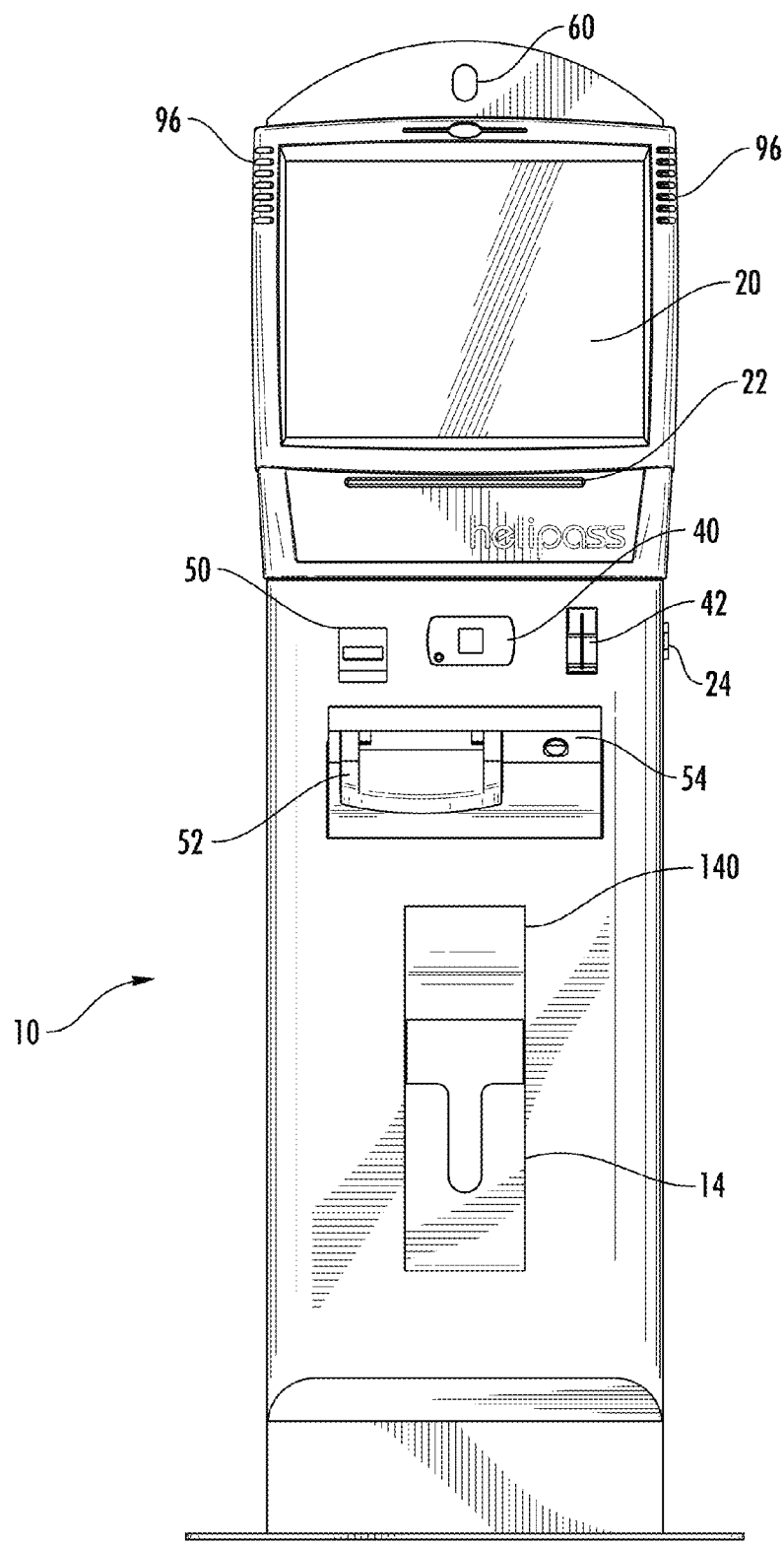
FIG. 2 is a front view of the embodiment of the apparatus of the present invention shown in FIG. 1.
Figure 3:
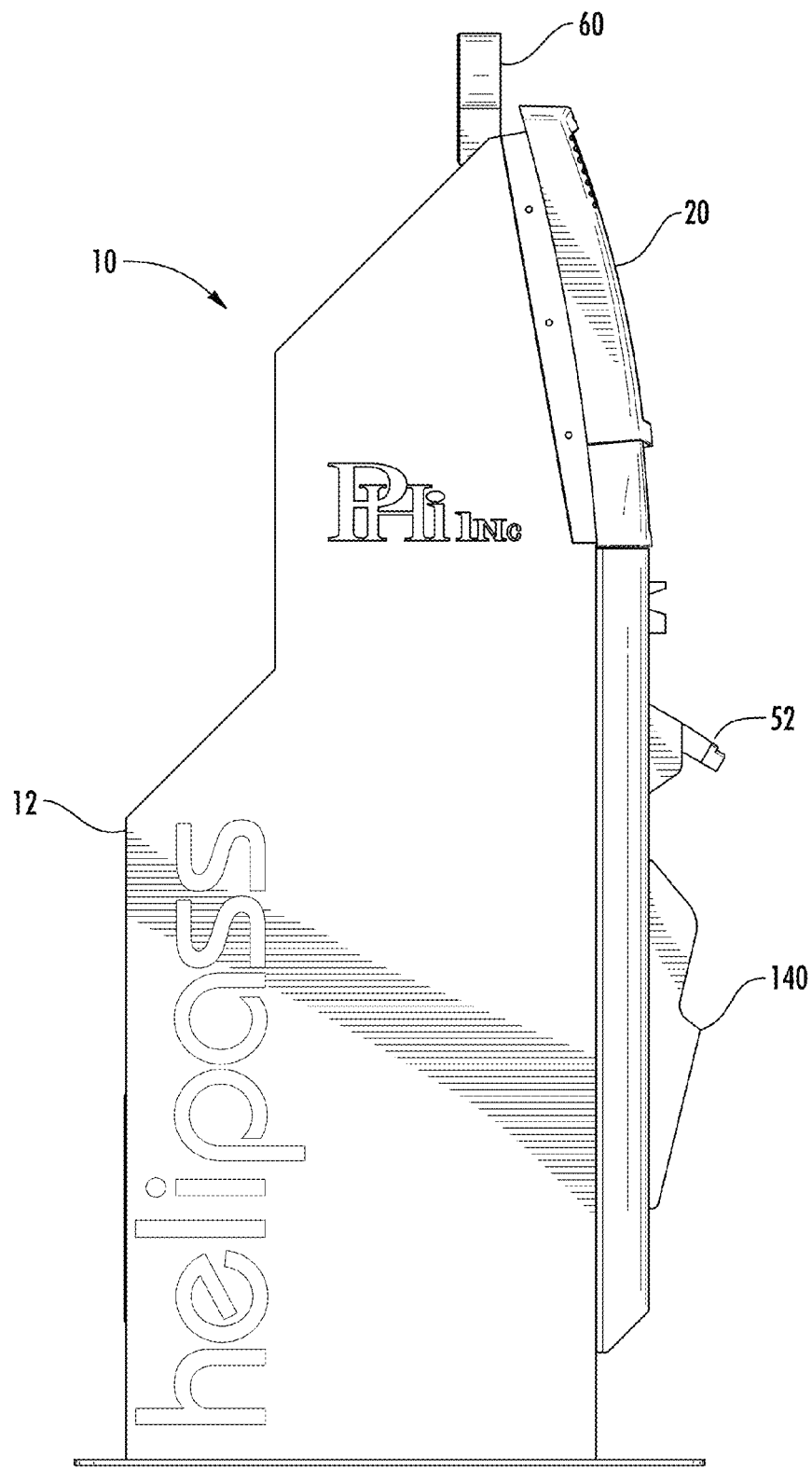
FIG. 3 is a left side view of the embodiment of the apparatus of the present invention shown in FIG. 1.

The present invention includes an automated, self service free-standing kiosk 10 (FIGS. 1-9) an automated, self service wall-mounted kiosk 110 (FIGS. 10-17) and related apparatus for providing check-in and boarding services to for example helicopter passengers and cargo (the kiosks can also be used offshore to automate personnel tracking and personnel on board (POB) requirements). The present invention includes software and hardware (see FIGS. 1-5 and 10-17). Preferably, the kiosk 10, 110 and related apparatus can take and store a picture of the passenger, calculate and/or measure the weight of the passenger and the passenger's luggage, print luggage tags and boarding printouts (which can include a photo of the passenger), integrate with third parties' databases (such as no-fly lists (NFL)) for approval for the passenger's flight and can transmit data to another location (server, third party employer, pilot).

In a preferred embodiment of the present invention, the kiosk is a stand-alone kiosk 10. In an alternative embodiment of the present invention, the kiosk is a wall-mounted kiosk 110. In another alternative embodiment of the present invention, the kiosk is a countertop kiosk (not shown). All embodiments of the kiosk do the following, preferably in the following order:

(1) Scan TWIC/Passport/Driver's License/Fingerprint;
(2) Gather passenger details;
(3) Gather flight details;
(4) Check passenger validity (Valid ID, NFL, Drug Screening Requirements, Training Requirements);
(5) Take photo of passenger;
(6) Gather passenger and baggage weight and count details;
(7) Print baggage tags;
(8) Print boarding pass;
(9) Distribute check-in details (to a 3rd party or 3rd parties).

Preferably, a passenger's picture is taken at the time of check-in and will be printed on the boarding pass. The purpose of the pictured boarding pass is to enhance the security screening that takes place prior to a passenger boarding the helicopter or other aviation or marine vessel. Passengers must currently present their government or state issued ID to a security guard prior to boarding. The pictured boarding pass could replace the photo ID requirement.

Preferably, passengers interact with the kiosk while standing on a scale 70 at the base of the kiosk. By doing so his or her weight is captured during the check-in process. Each baggage piece is preferably weighed individually on a separate scale 80. In addition to bag weight, the system also determines if the bag is overweight and asks the passenger to specify whether it is fragile or overweight or not.

Each piece of luggage is preferably tagged with a label that contains the passenger's name, a color coded destination and symbol, the bag weight, the total number of bags checked by the passenger, the total weight of all the passenger's luggage, and any bag-specific details such as overweight or fragile.

Although the kiosks 10, 110 are usually housed at a field base, passenger data is preferably transmitted over a secure internet connection, either wired or wirelessly, to centralized servers. The servers then work with other third party data sets to gather information such as a passenger's flight reservation details, flight eligibility, and training records.

Figure 19:
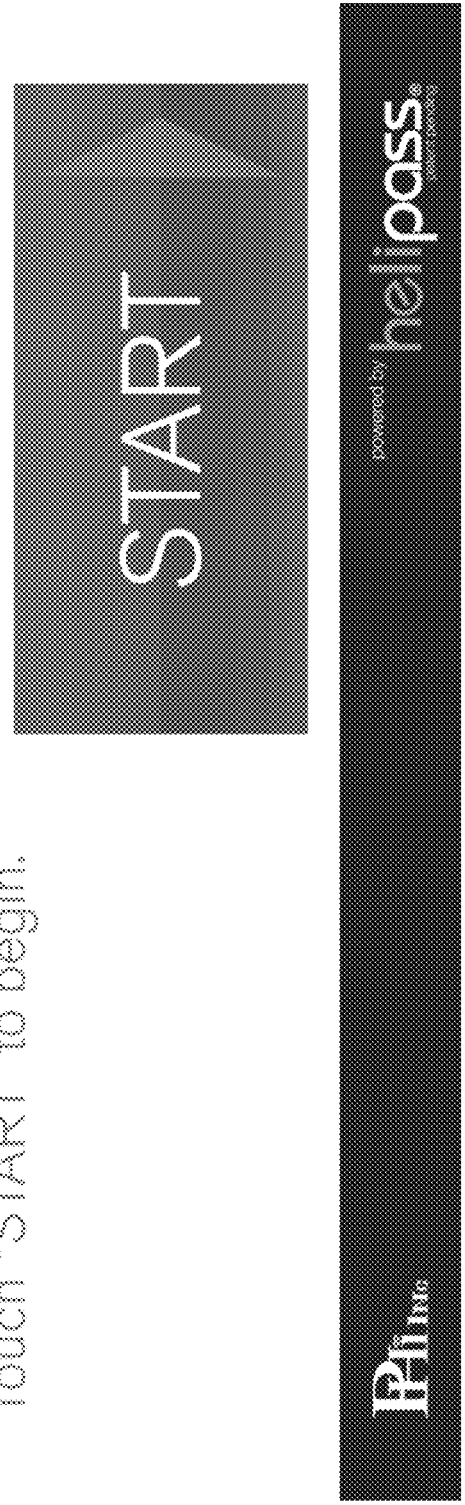
FIG. 19 is a screen shot of a welcome screen for a preferred embodiment of the apparatus of the present invention.
Figure 21:
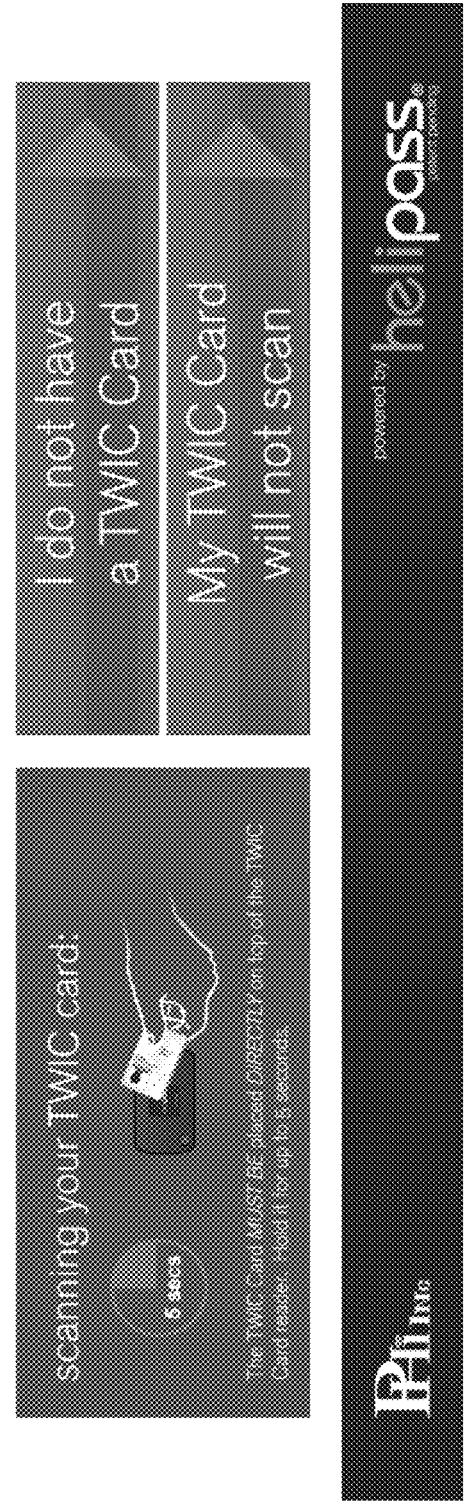
FIG. 21 is a screen shot of an alternate TWIC card scan screen for a preferred embodiment of the apparatus of the present invention.
Figure 24:
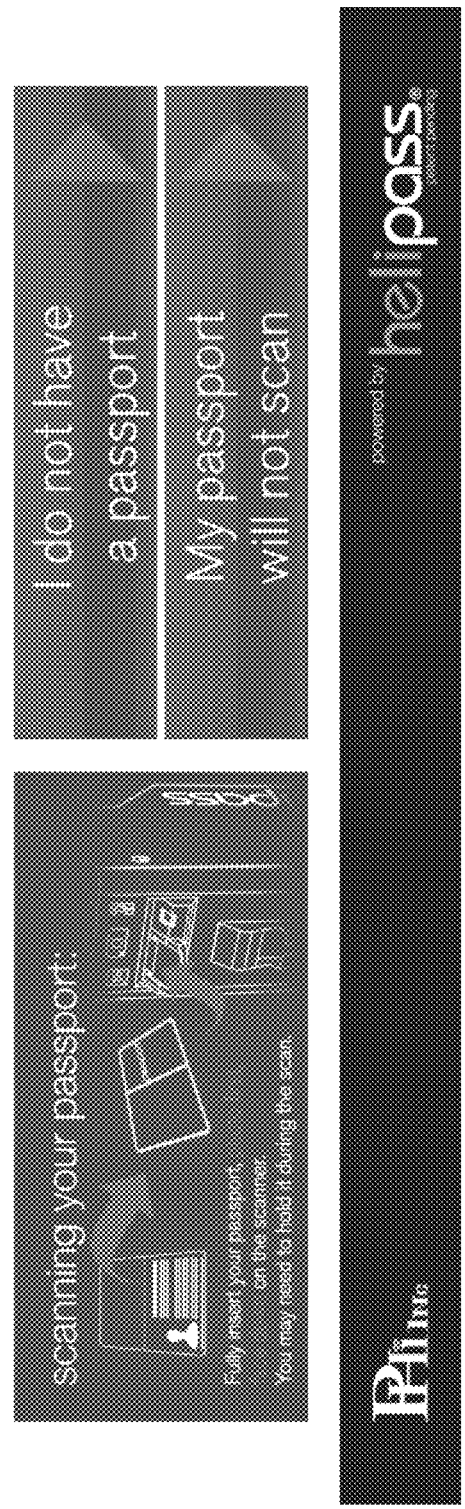
FIG. 24 is a screen shot of a passport scan screen for a preferred embodiment of the apparatus of the present invention.
Figure 25:
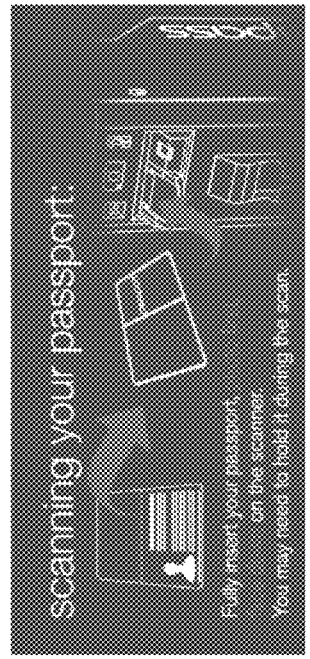
FIG. 25 is a screen shot of a manual passport entry screen for a preferred embodiment of the apparatus of the present invention.
Figure 27:
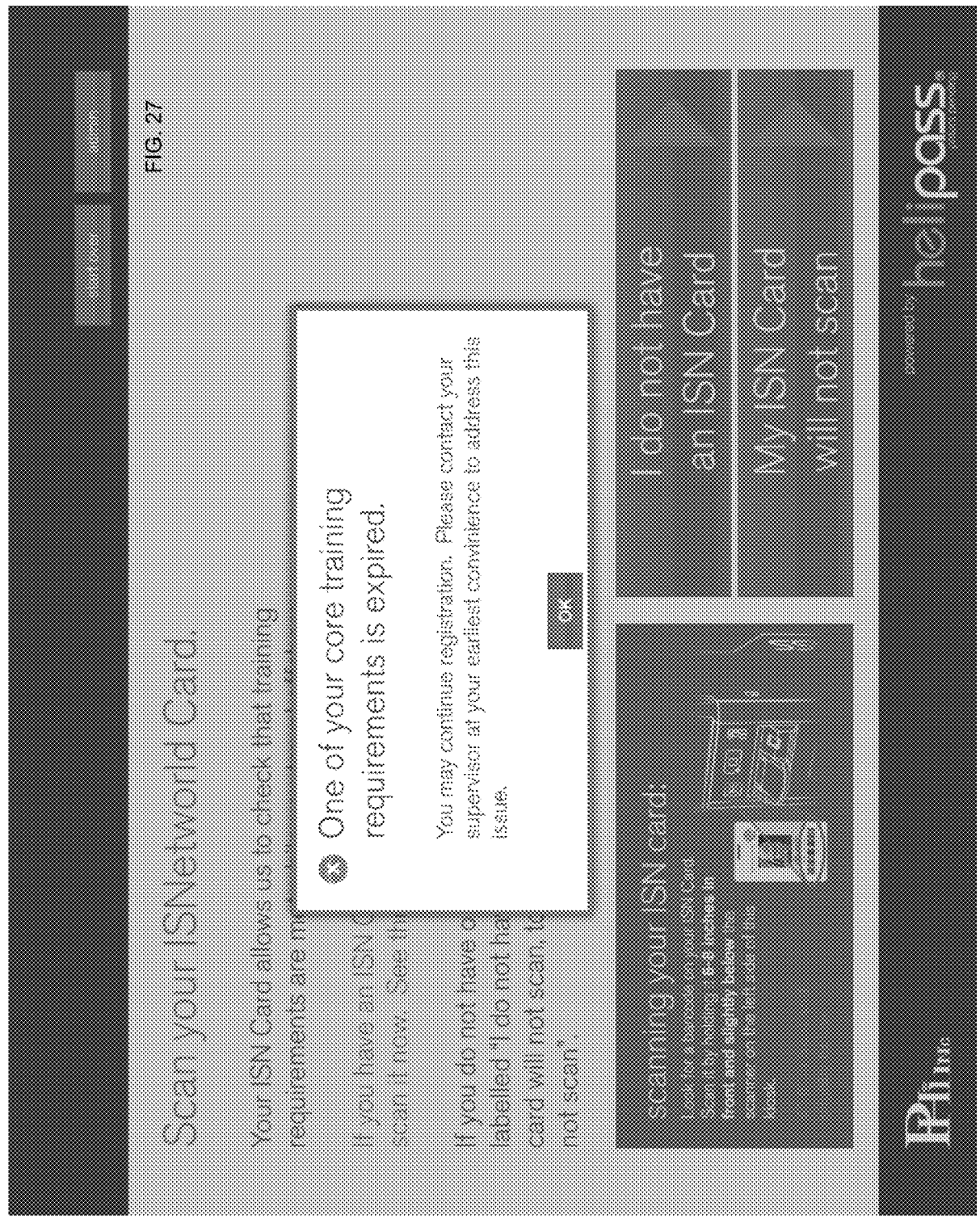
FIG. 27 is a screen shot of an ISN Card Alert screen for a preferred embodiment of the apparatus of the present invention.
Figure 40:
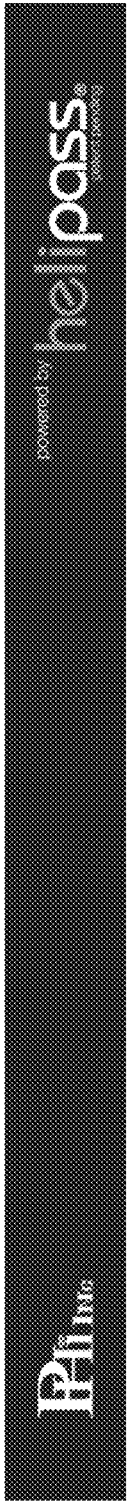
FIG. 40 is a screen shot of a privacy policy screen for a preferred embodiment of the apparatus of the present invention.
Figure 42:
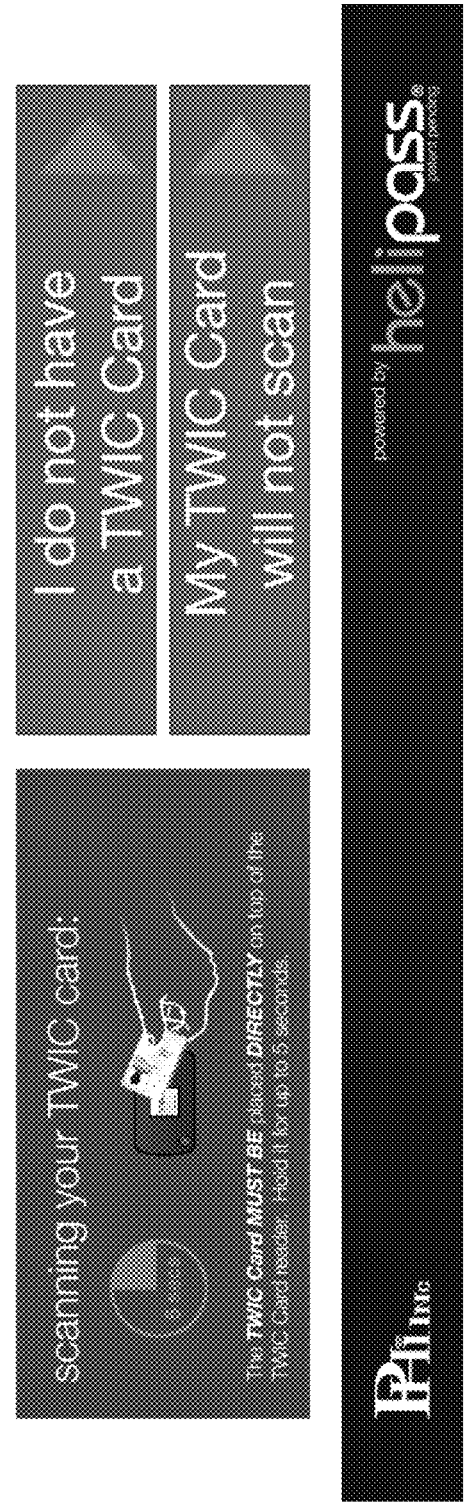
FIG. 42 is a screen shot of a welcome screen for an alternate embodiment of the apparatus of the present invention.
Figure 43:
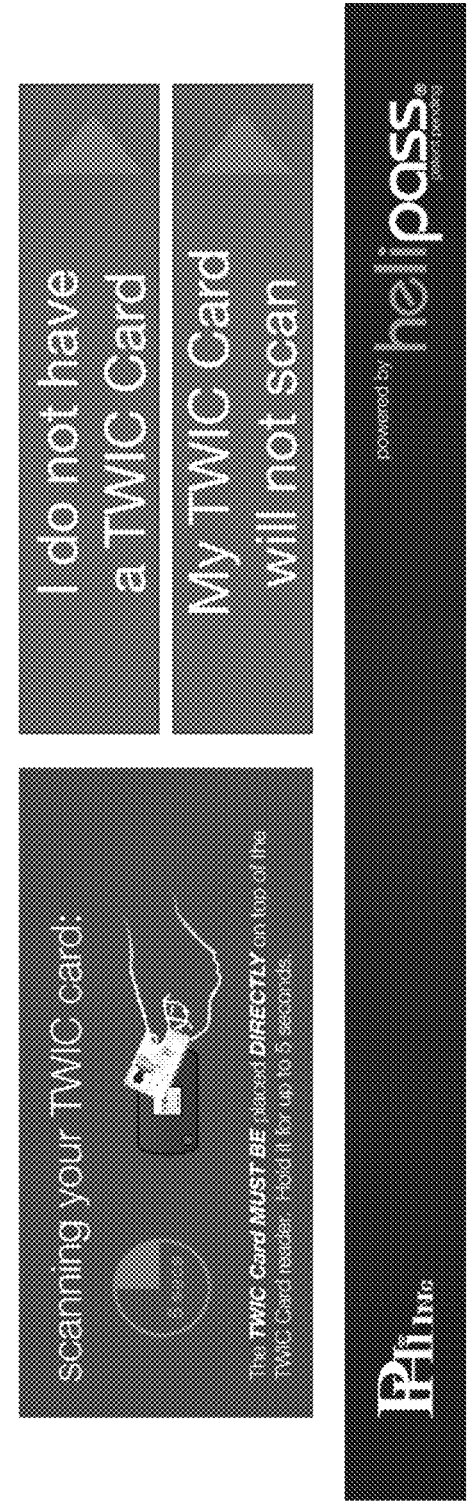
FIG. 43 is a screen shot of a TWIC Card scan screen for an alternate embodiment of the apparatus of the present invention.
Figure 45:
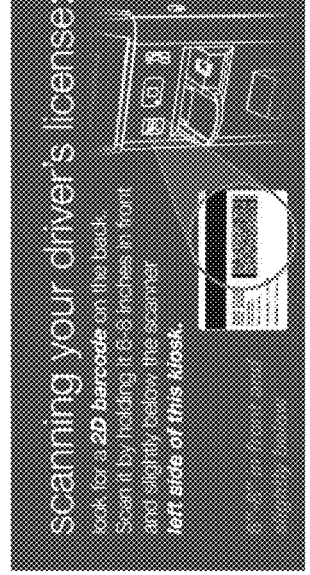
FIG. 45 is a screen shot of a drivers' license scan screen for an alternate embodiment of the apparatus of the present invention.
Figure 47:
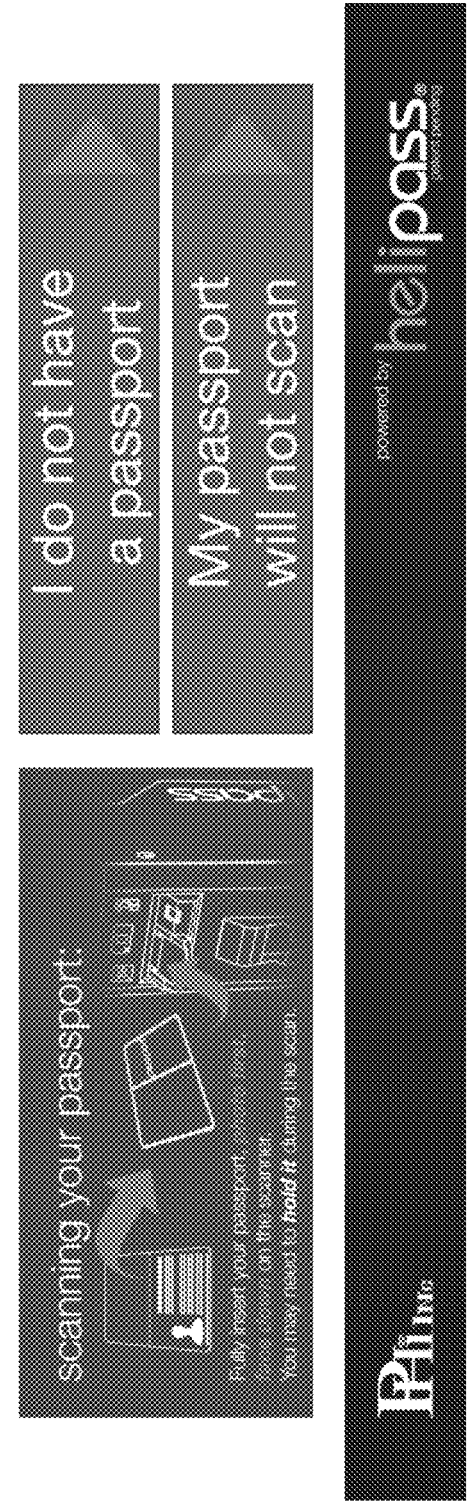
FIG. 47 is a screen shot of a passport scan screen for an alternate embodiment of the apparatus of the present invention.
Figure 54:
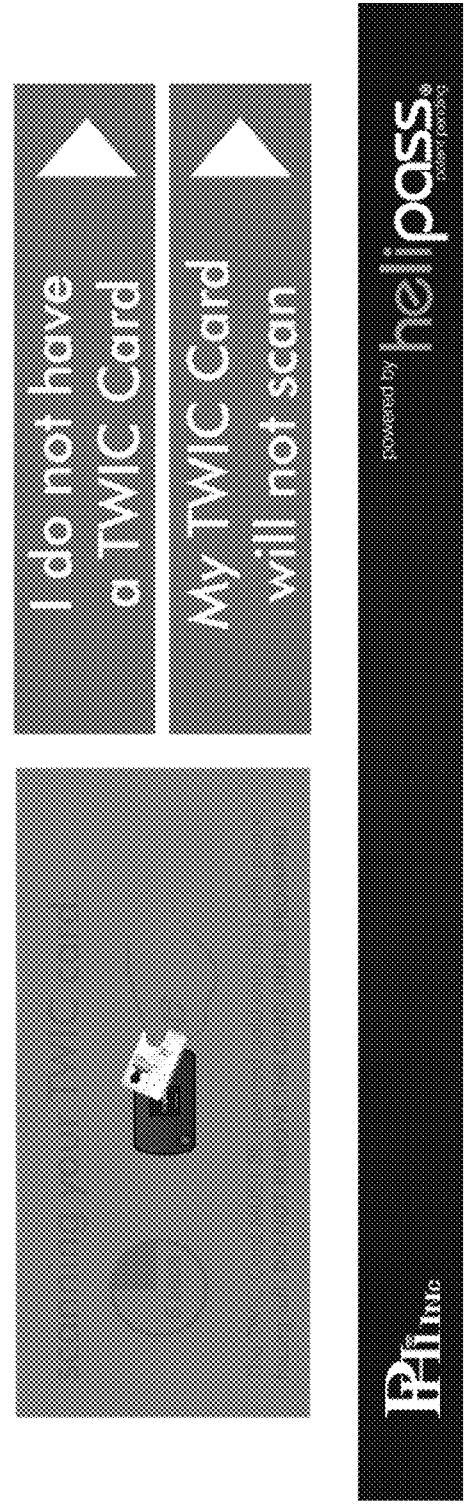
FIG. 54 is a screen shot of a TWIC Card scan screen for an alternate embodiment of the apparatus of the present invention.
Figure 56:
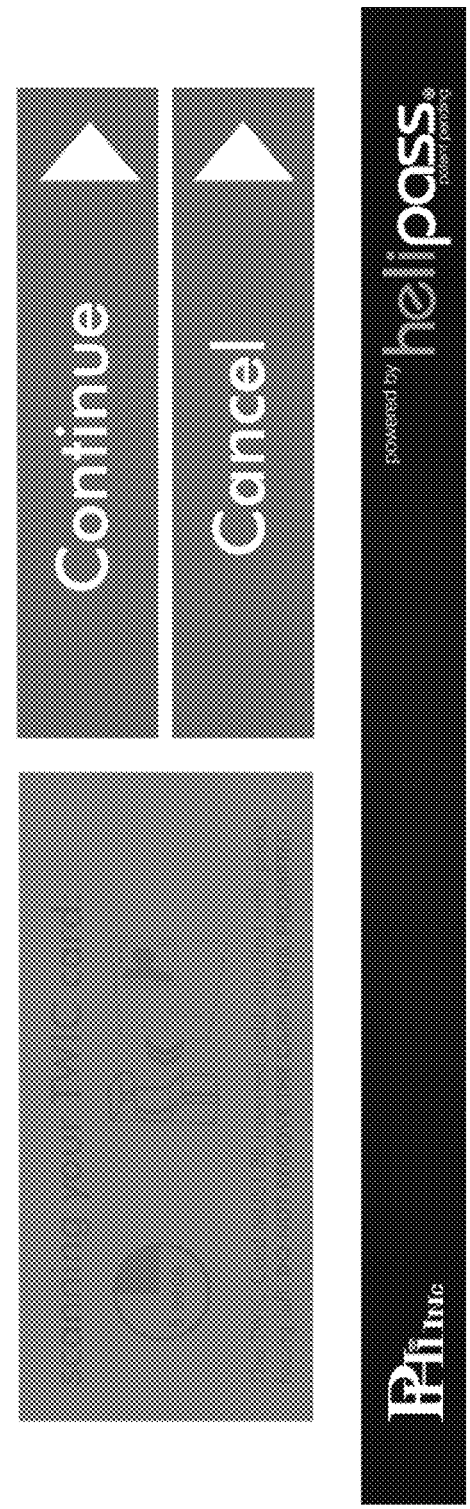
FIG. 56 is a screen shot of a TWIC Card scan screen for an alternate embodiment of the apparatus of the present invention.
Figure 59:
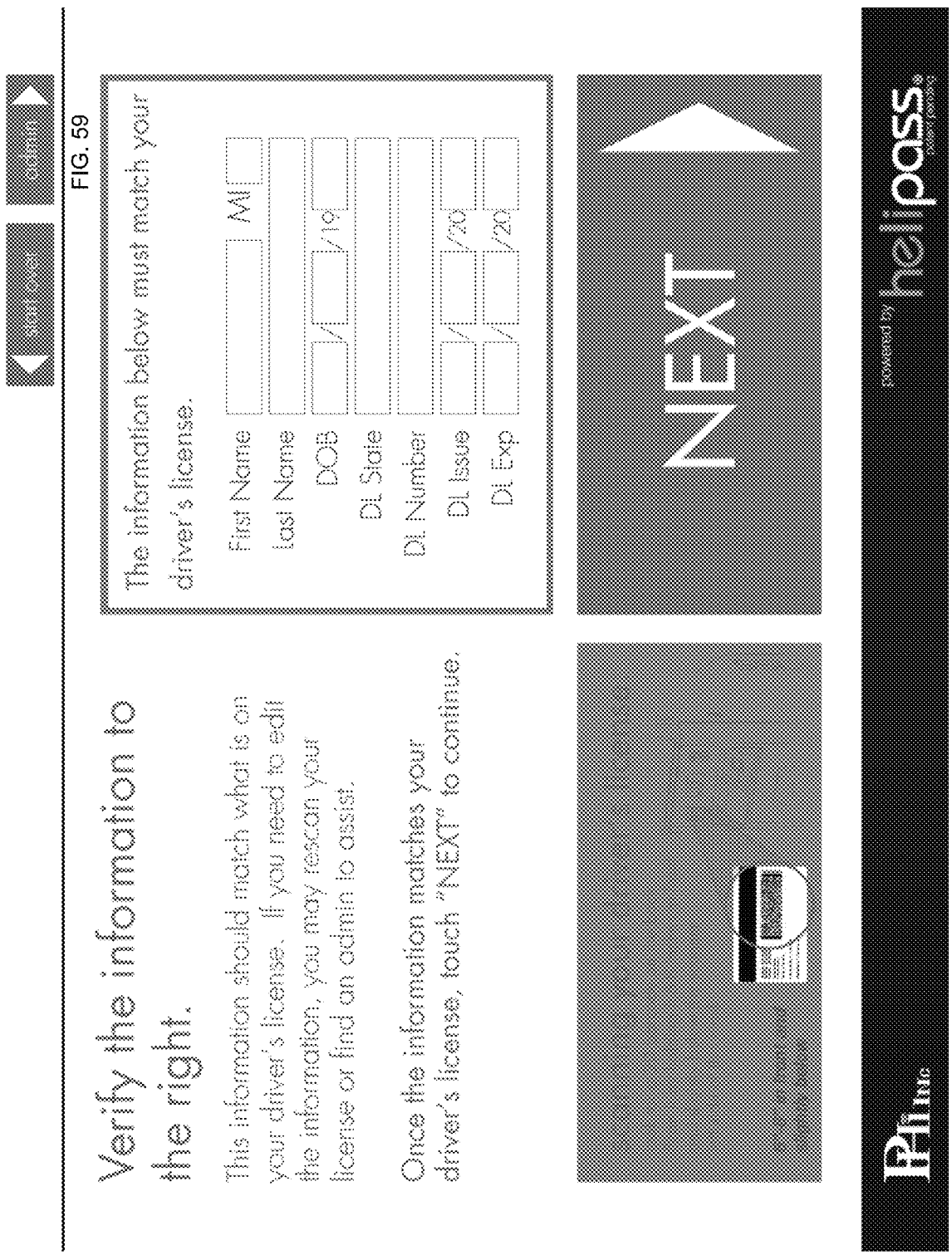
FIG. 59 is a screen shot of a manual drivers' license screen for an alternate embodiment of the apparatus of the present invention.
Figure 65:
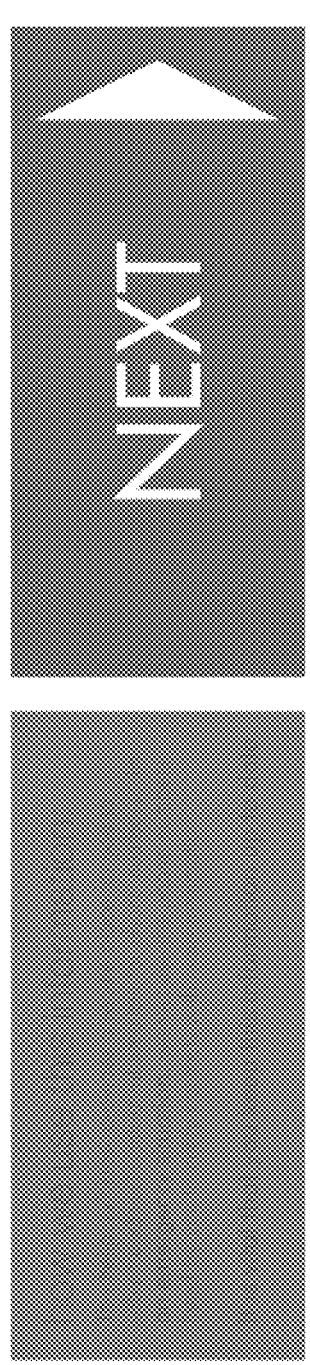
FIG. 65 is a screen shot of an emergency contact entry screen for an alternate embodiment of the apparatus of the present invention.
Figure 67:
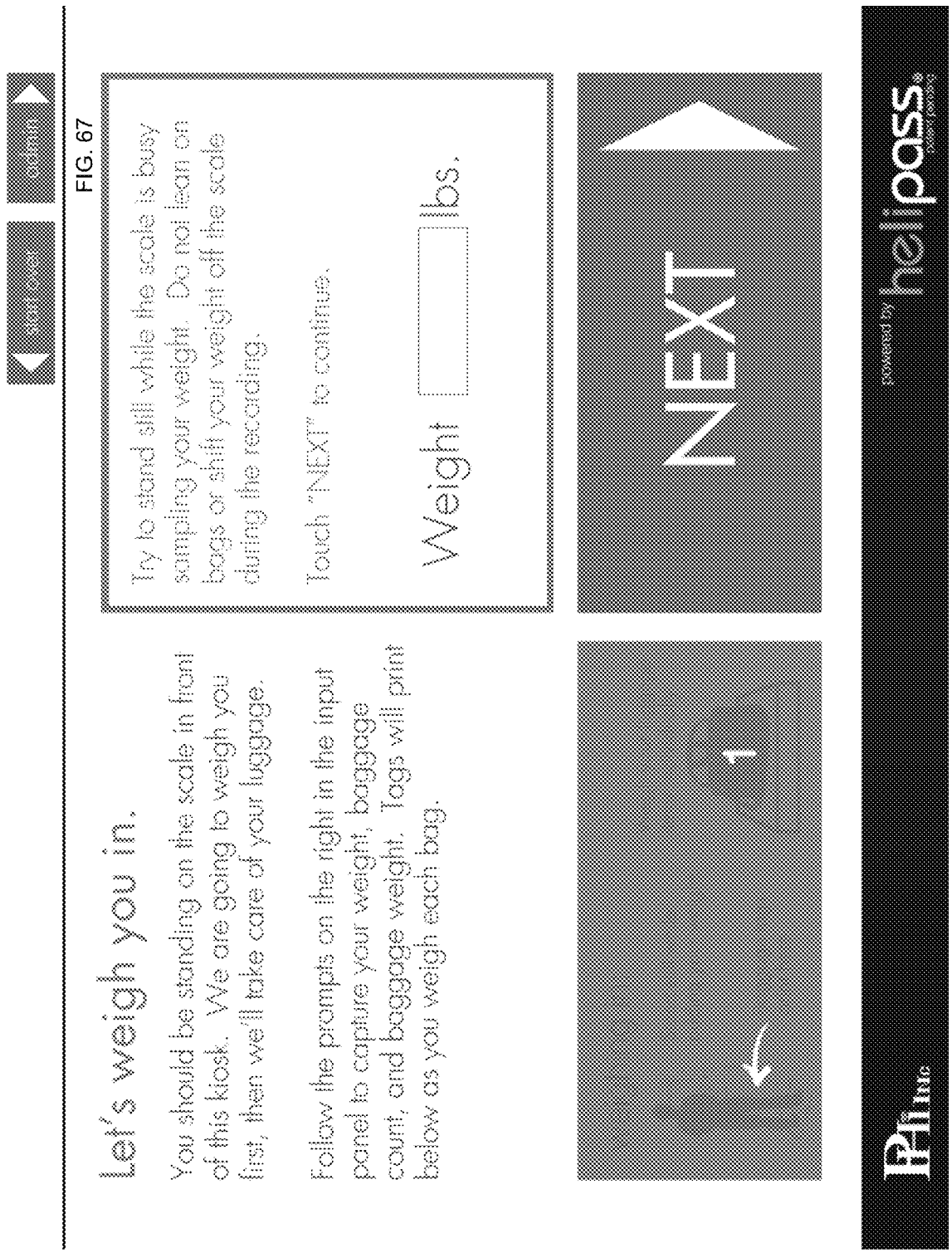
FIG. 67 is a screen shot of a weigh-in screen for an alternate embodiment of the apparatus of the present invention.
Figure 68:
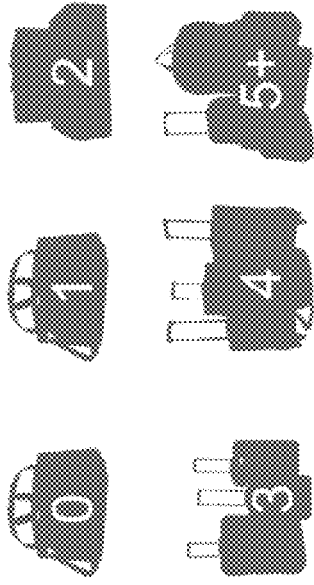
FIG. 68 is a screen shot of a bag count screen for an alternate embodiment of the apparatus of the present invention.
Figure 71:
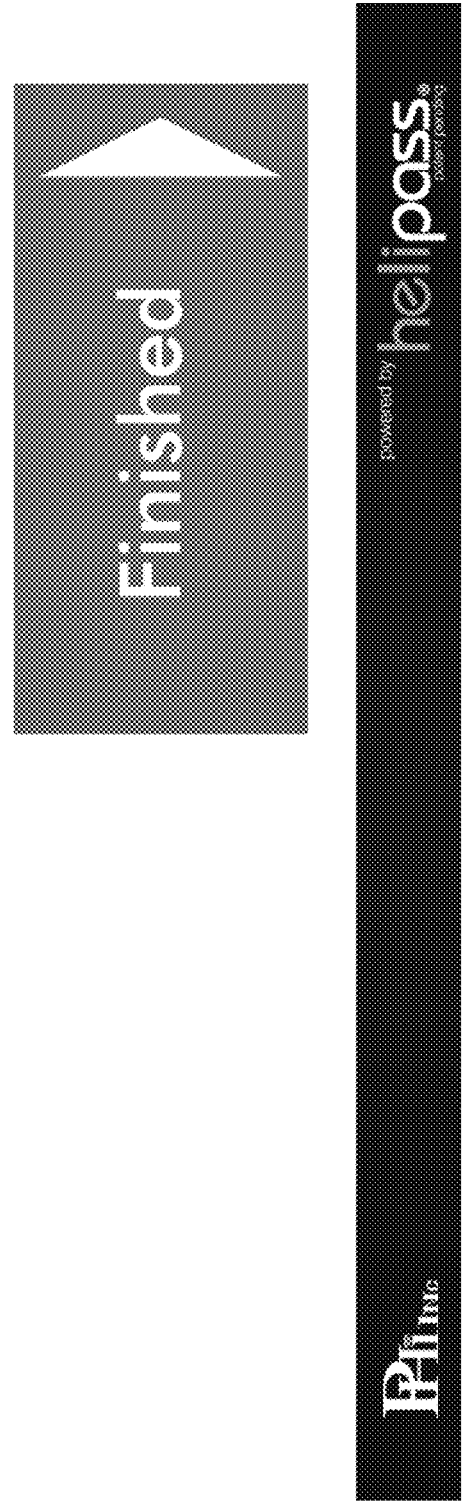
FIG. 71 is a screen shot of a finish screen for an alternate embodiment of the apparatus of the present invention.
Figure 72:
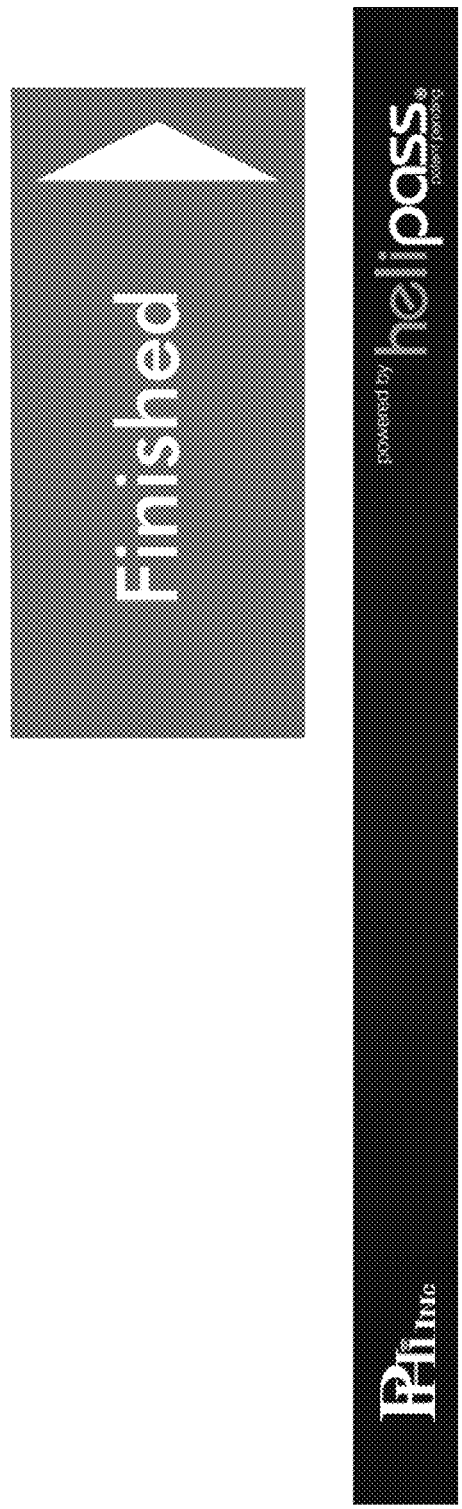
FIG. 72 is a screen shot of a registration specific finish screen for an alternate embodiment of the apparatus of the present invention.
Figure 75:
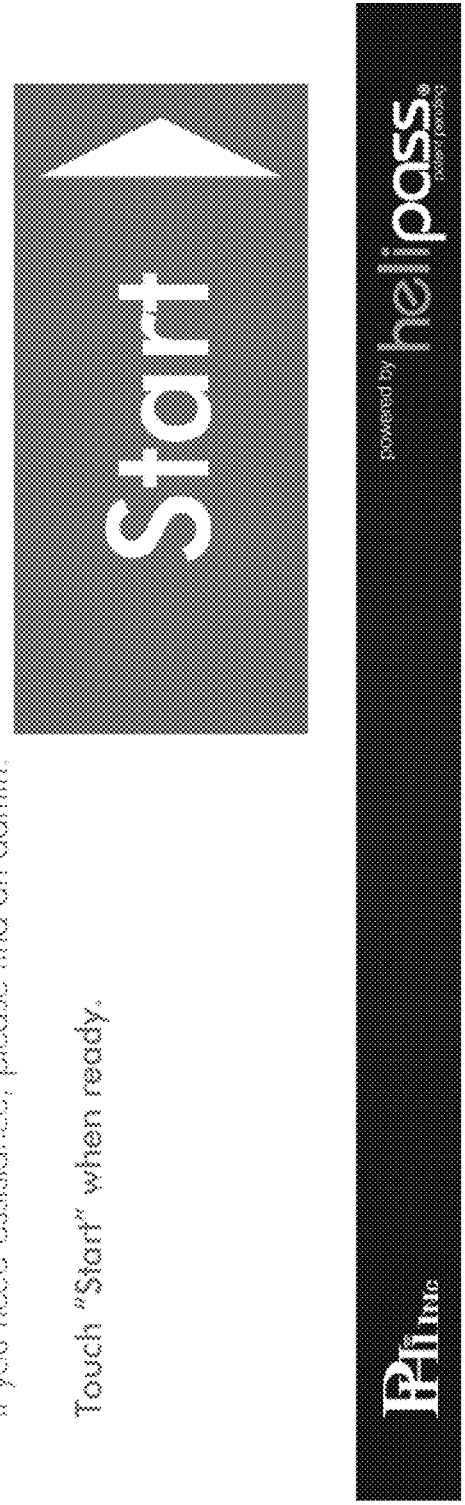
FIG. 75 is a screen shot of registration specific welcome screen for an alternate embodiment of the apparatus of the present invention.

In a preferred embodiment of the present invention, the apparatus includes a kiosk 10 similar to one which one sees at an airport for passenger self check-in and boarding pass issue, but includes energy sector specific features like TWIC card integration, automatic verification of safety and training credentials, and biometric capabilities, that make it unique. The apparatus preferably includes a touch screen 20 which faces the passenger and a similar second screen 30 (see FIG. 9; second screen not shown in FIG. 5) which is visible to an attendant or employee (not shown) of the transport service company. This second screen can be in a bank of screens visible to the attendant or employee when there are multiple kiosks at a transportation port. The second screen preferably displays everything which is displayed to the passenger, and may additionally display passenger-specific security alerts such as no-fly-list warnings, expired documentation warnings, drug screening requirements, etc. The display on this second screen 30 is preferably not visible to the passenger (see FIG. 9). The screen shots shown in FIGS. 19-75 are examples of those typically shown on screens 20 and 30.

Preferably, there is a reader 40 for reading a TWIC (Transportation Worker Identification Credential) card, a 1D or 2D bar code reader 50 for reading a drivers license or other similar cards, such as an ISN card, a reader 42 for reading a credit card (as by reading a magnetic strip thereon) or a smart card (as by making physical contact with the smart card) a reader 52 for reading a passport, a reader 54 for reading a passenger's fingerprint, and a camera 60 for taking a photograph of the passenger during check-in. The TWIC card can be read in two distinct ways:

(1) each TWIC card contains a passive RFID chip that contains information about the TWIC card and passenger. The kiosk 10, 100 is preferably equipped with an RFID reader 40 to pull the data.
(2) The kiosk 10, 100 preferably also contains a contact-based smart card reader which, like the RFID based chip, contains information about the TWIC card and passenger.

The finger print scanner 54 can be used in conjunction with the passenger's TWIC card. Each TWIC card contains an image of the passenger's fingerprint which will be matched against his or her finger print scanned during check-in.

Preferably, the kiosk has a barcode reader 50 that reads the 2D barcode on the back of a drivers license.

Figure 9:
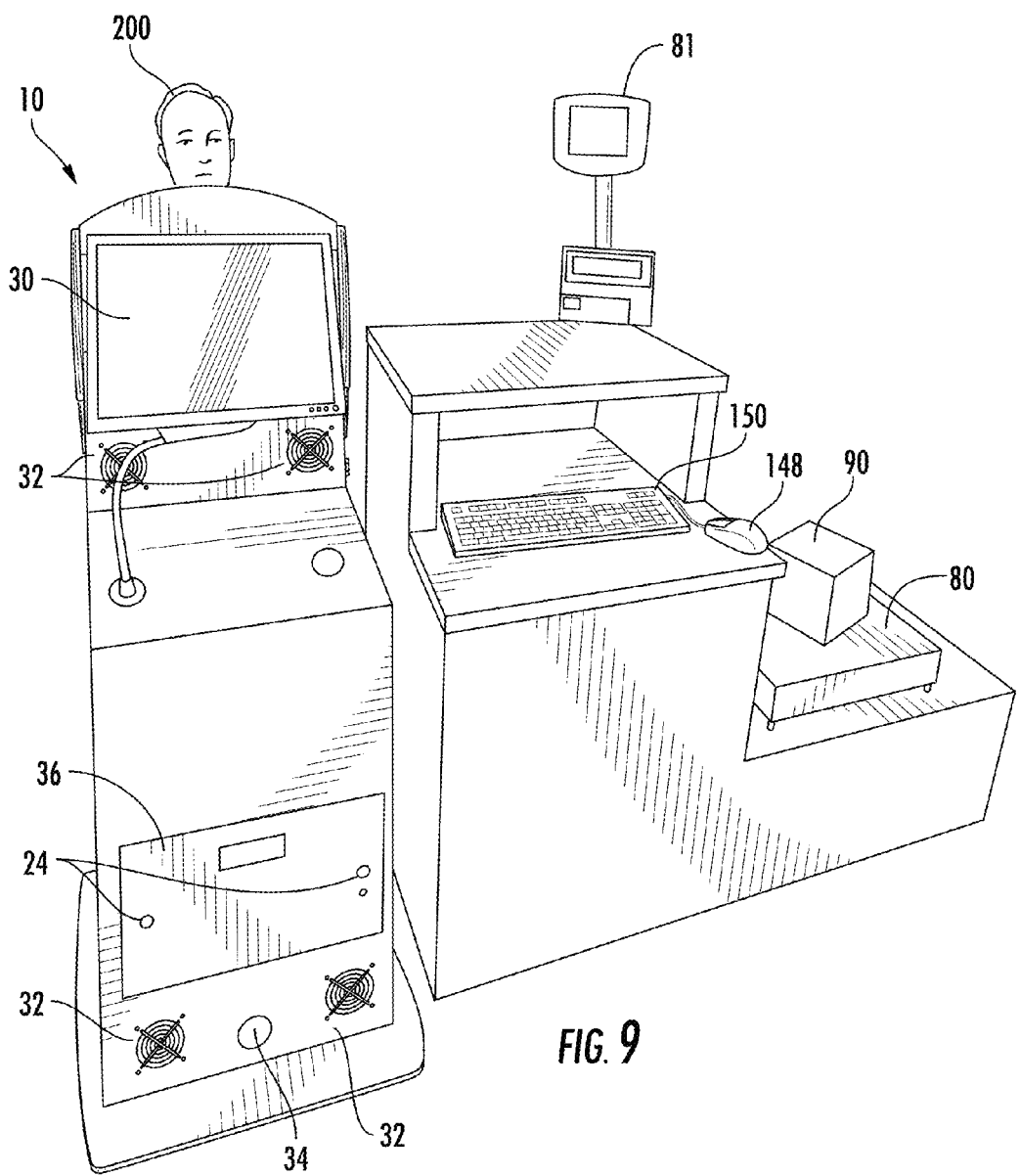
FIG. 9 is a rear view of an embodiment of the apparatus of the present invention including the kiosk shown in FIG. 1 and a scale (for luggage) and a screen facing an attendant.
Figure 10:
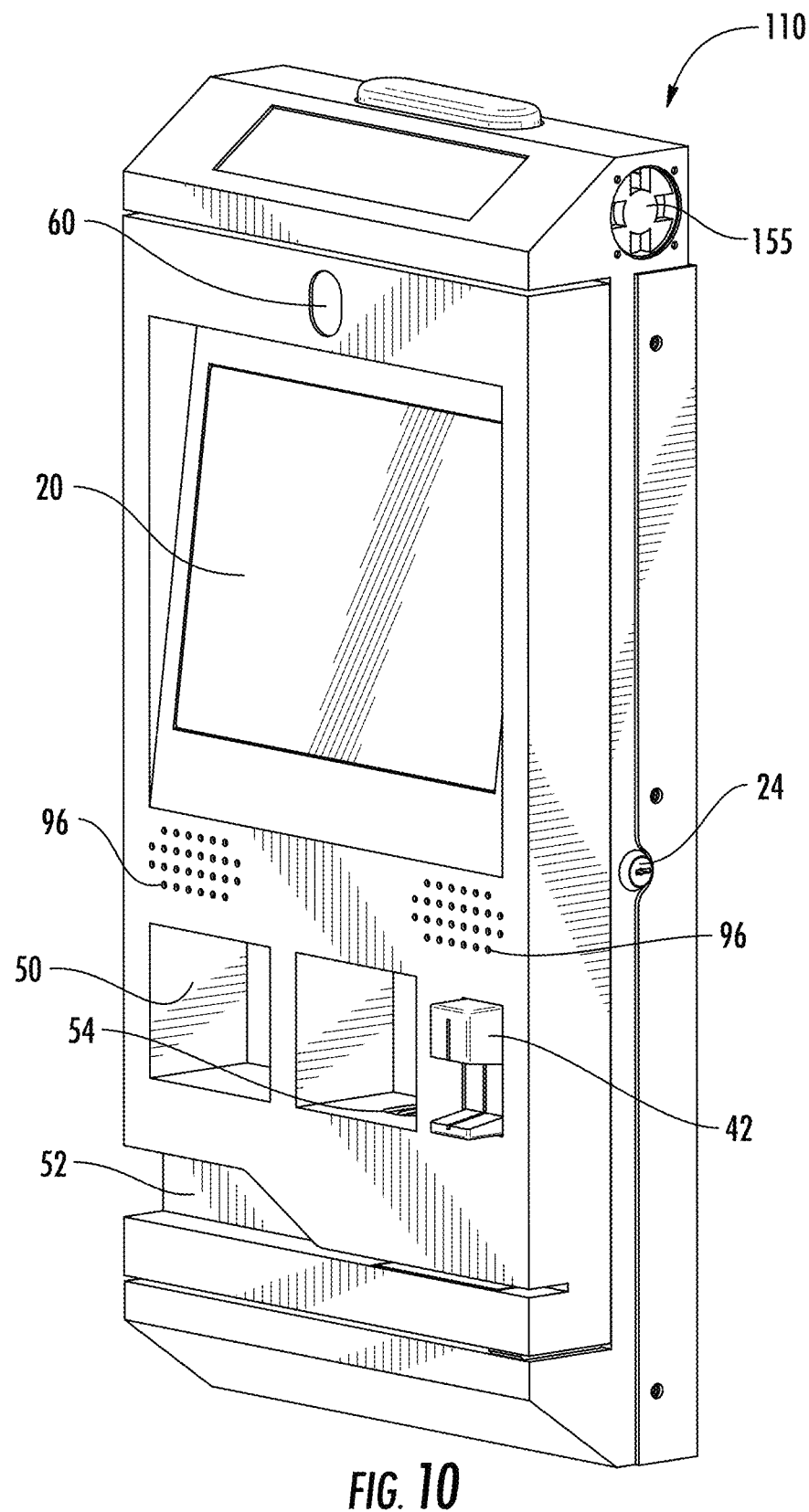
FIG. 10 is a perspective view of another preferred embodiment of the apparatus of the present invention (a wall-mounted kiosk)
Figure 11:
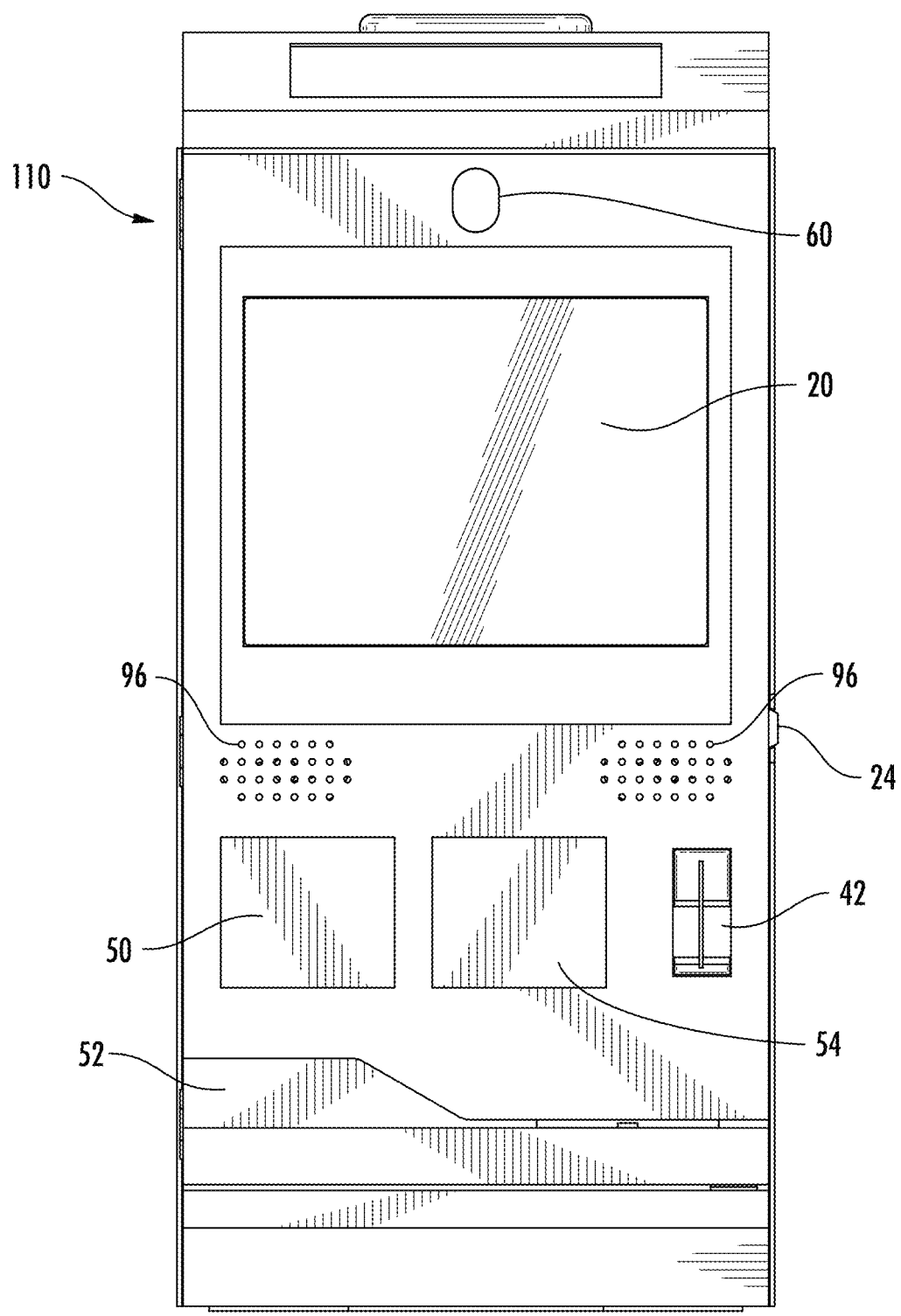
FIG. 11 is a front view of the embodiment of the apparatus of the present invention shown in FIG. 10.
Figure 12:
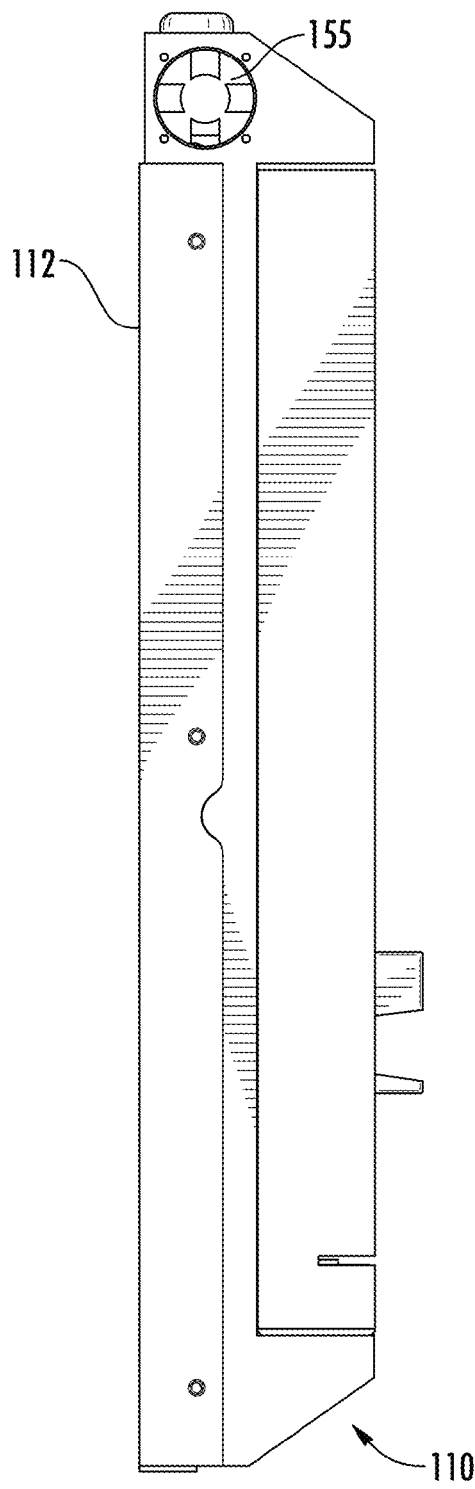
FIG. 12 is a left side view of the embodiment of the apparatus of the present invention shown in FIG. 10.
Figure 13:
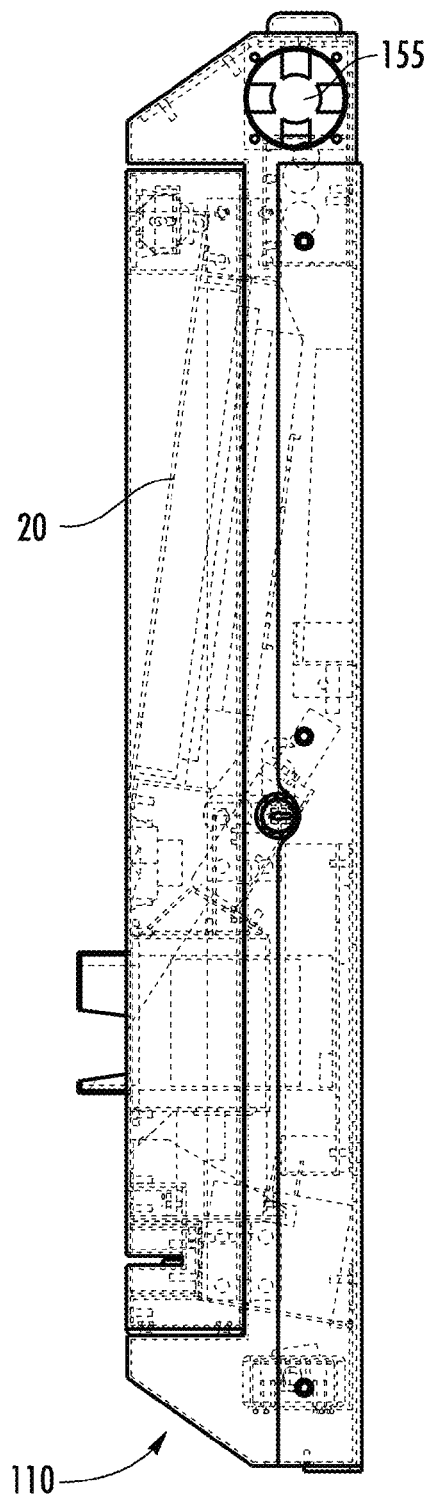
FIG. 13 is a right side view of the embodiment of the apparatus of the present invention shown in FIG. 10 showing internal components in dotted lines.
Figure 14:
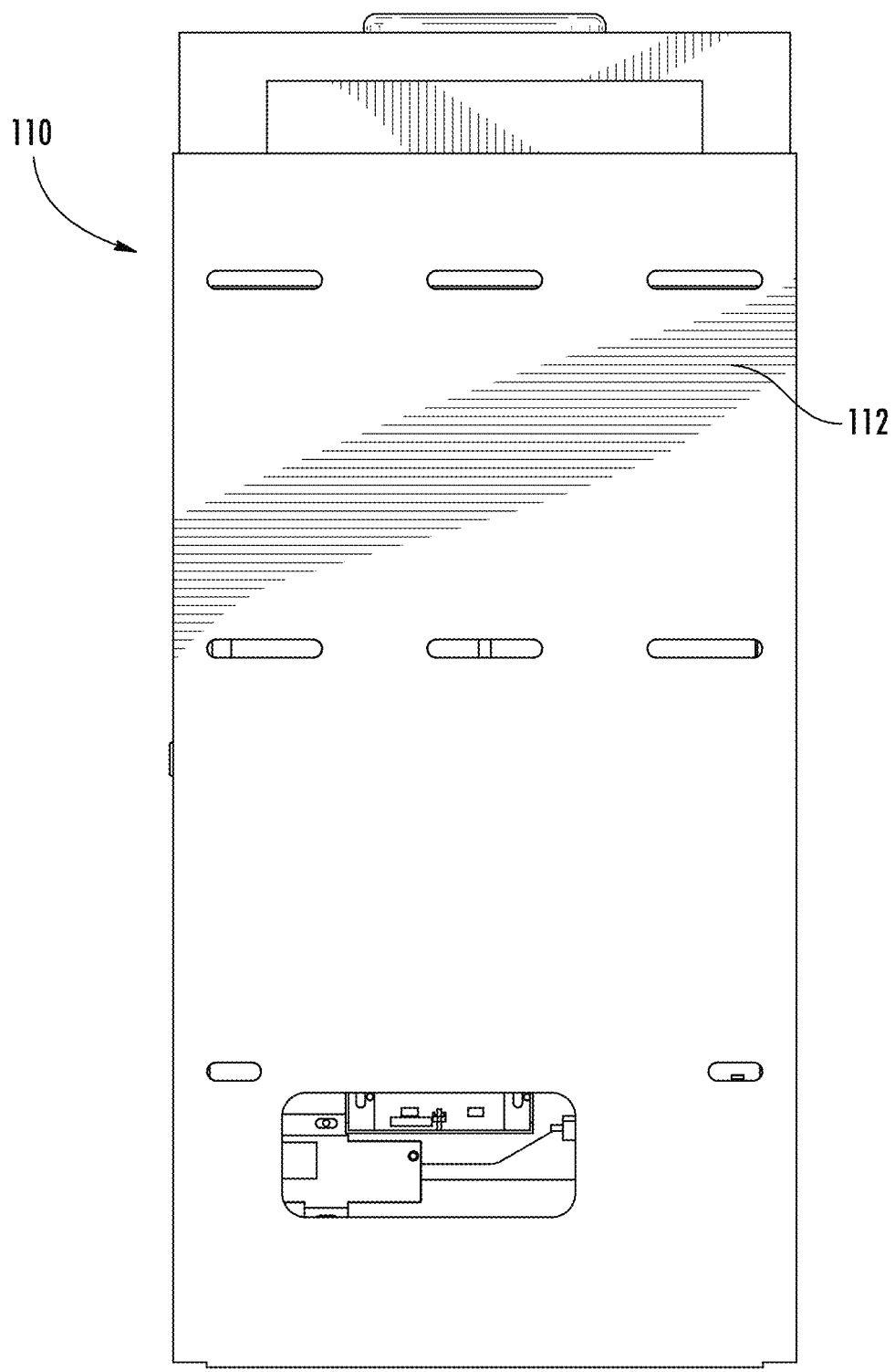
FIG. 14 is a rear view of the embodiment of the apparatus of the present invention shown in FIG. 10 showing the mounting bracket.
Figure 15:
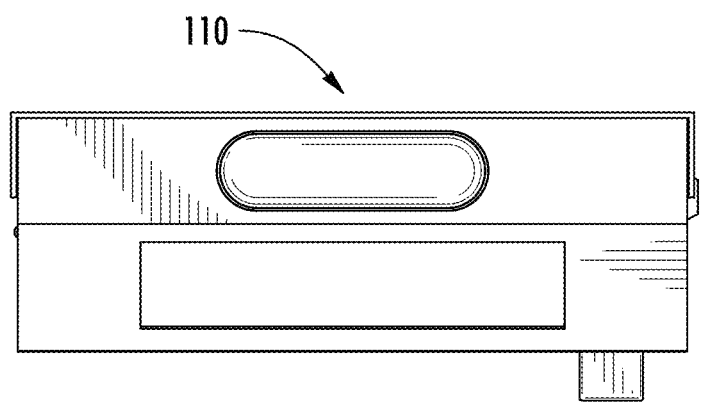
FIG. 15 is a top view of the embodiment of the apparatus of the present invention shown in FIG. 10.
Figure 16:
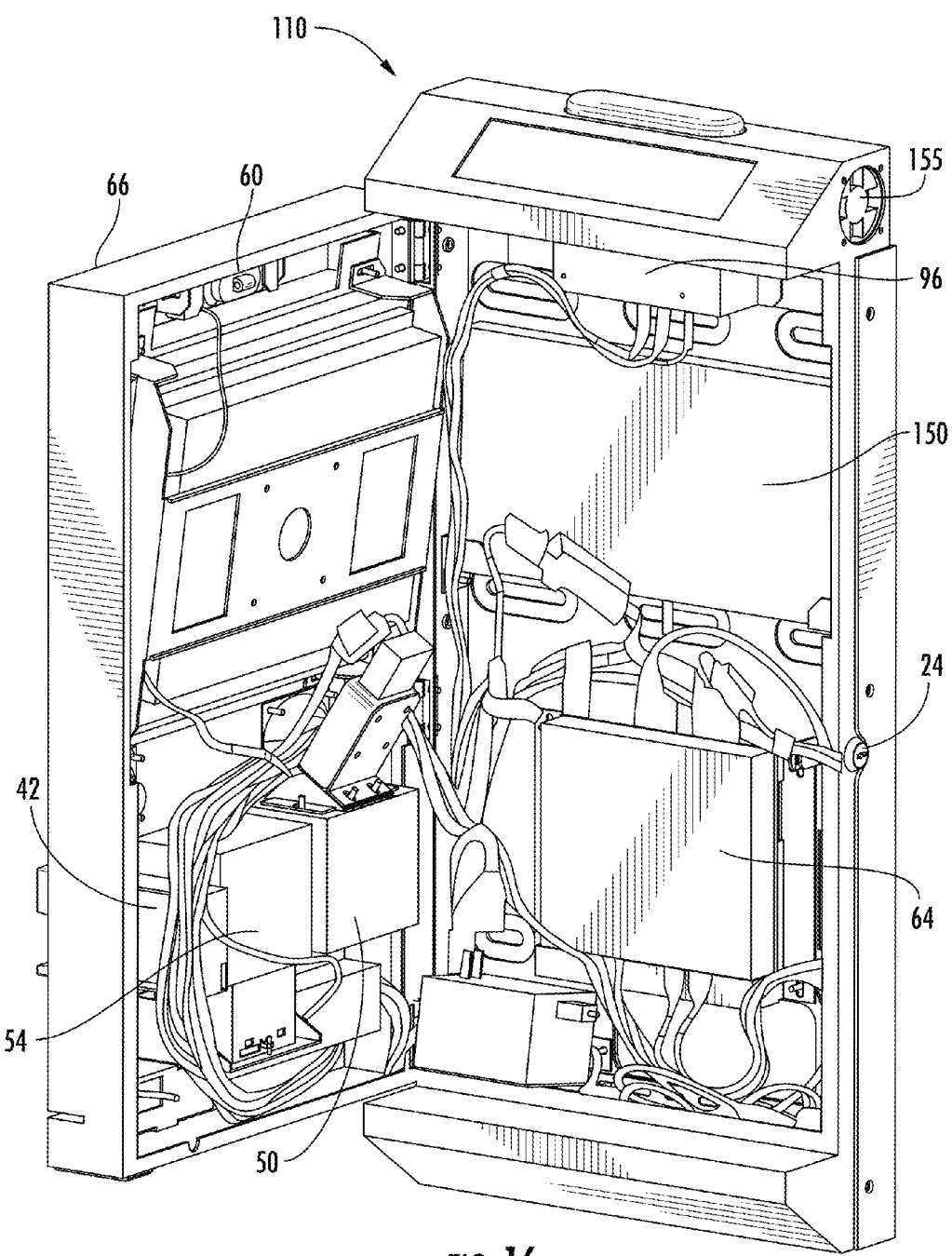
FIG. 16 is a front perspective view of the embodiment of the apparatus of the present invention shown in FIG. 10, with the kiosk open.
Figure 17:
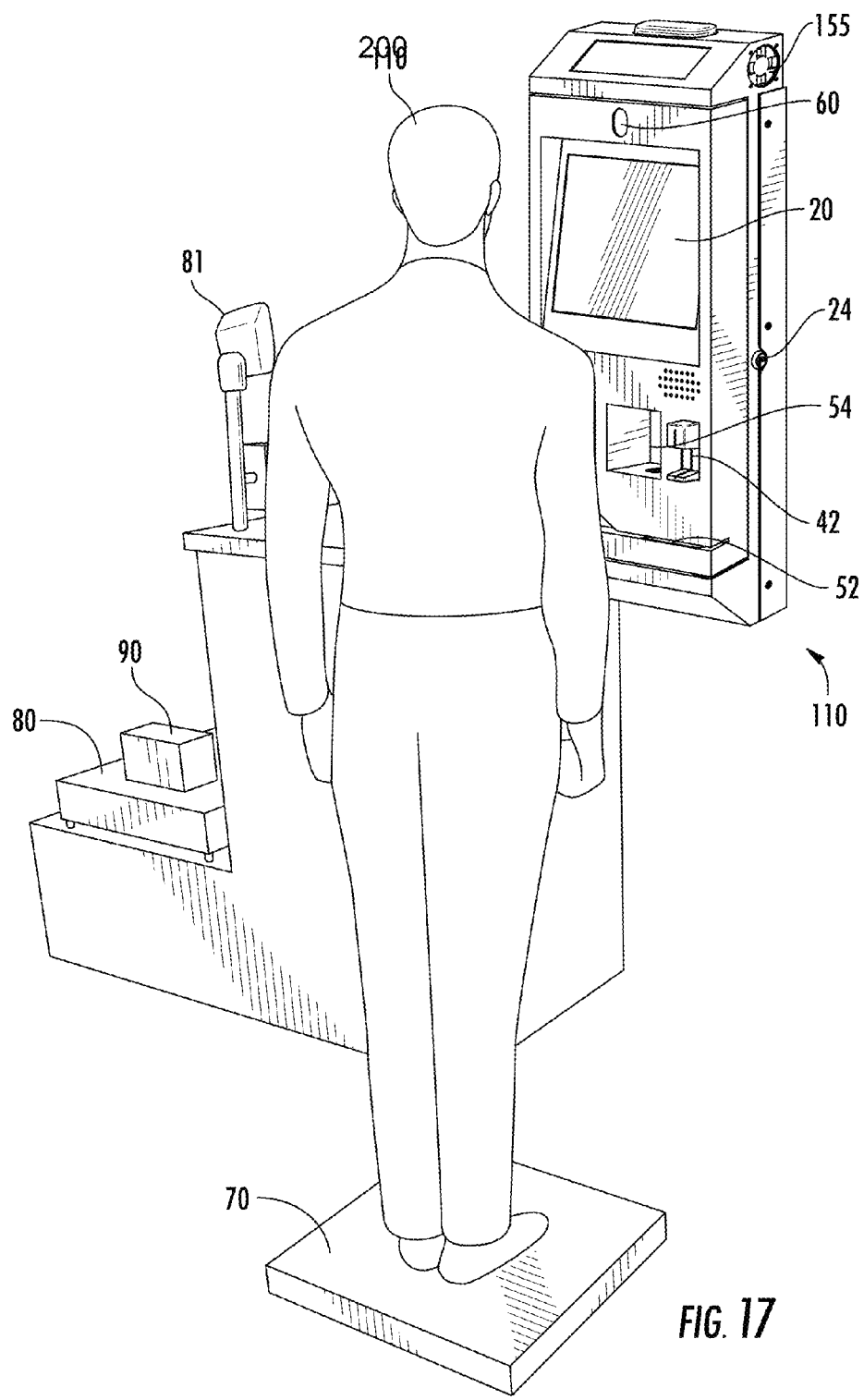
FIG. 17 is a front view of an embodiment of the apparatus of the present invention including the kiosk shown in FIG. 10 and two scales.
Figure 18:
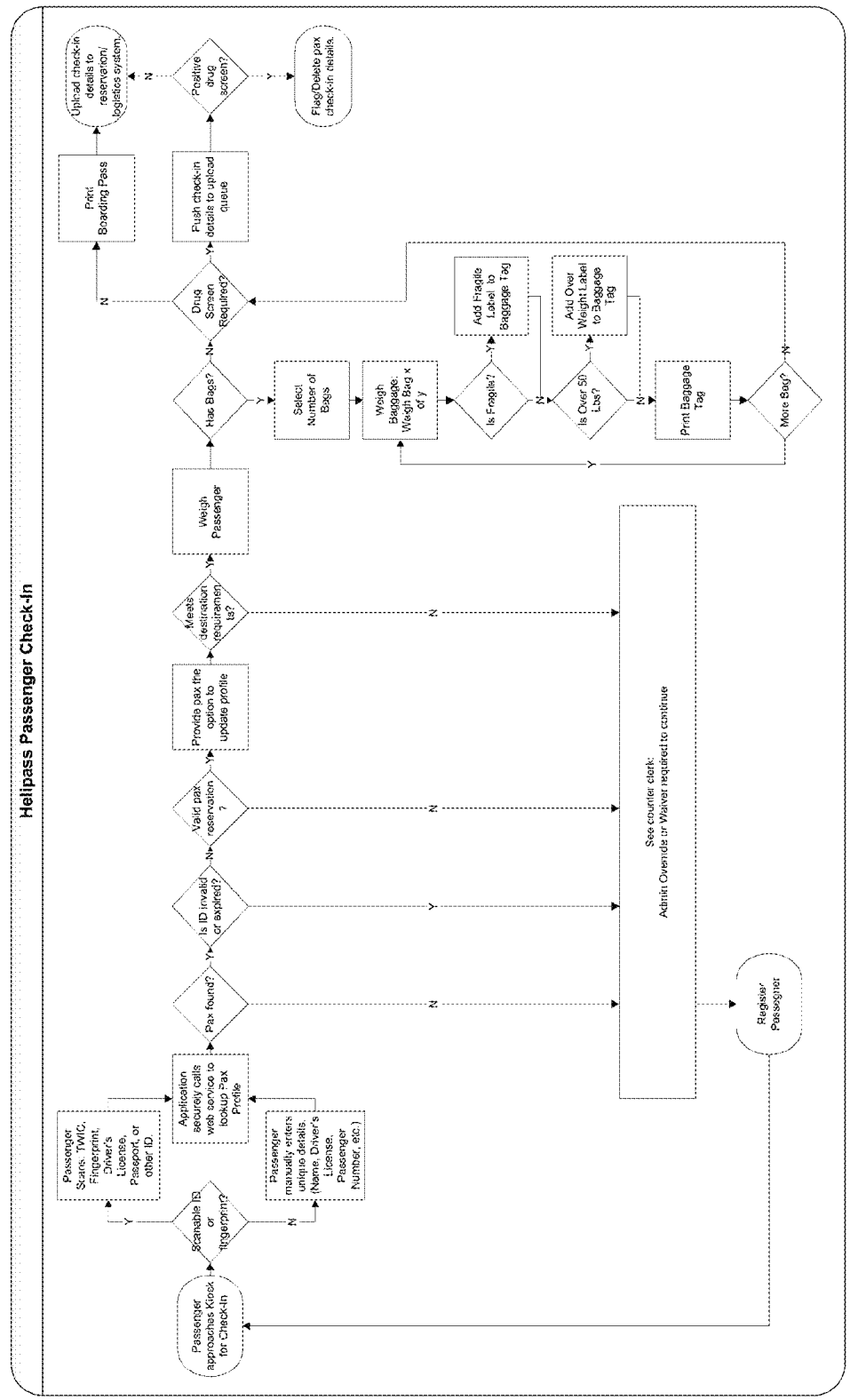
FIG. 18 is a flow chart of a system of the present invention.

The apparatus 10, 110 preferably includes a scale 70 or scales 70 and 80 for weighing the passenger and any luggage/packages 90 of the passenger; for example, there can be a pressure pad scale 70 on which the passenger 200 stands while checking in which automatically weighs the passenger, and the passenger can pick up his luggage and packages so that everything, including the passenger, is weighed at one time, or there can be a separate scale 80 for weighing the luggage and packages 90 which is operatively connected to the kiosk. The detected weight readings are preferably displayed on the kiosk screen 20 and the employee screen 30 (FIG. 9). When there is a second scale 80, it is preferably adjacent the kiosk 10, 110 so that the luggage and packages 90 can be easily loaded onto the second scale 80 by the passenger 200 during check-in (see FIG. 8).

The scale or scales preferably communicate directly and continuously with the kiosk software. This integration allows for real time measurements while the passenger interacts with the kiosk and can also be used to flag both passengers and baggage for special handing requirements. For instance, in the case of baggage, each baggage piece that weights over 50 lbs is preferably marked as overweight on the baggage tag with verbiage, colors, and symbols. In the case of large frame passengers, special seating may be assigned to match body type with emergency exits. Emergency exit to body frame matching allows for larger framed passengers to escape from larger exits in the event of a crash.

Figure 4:
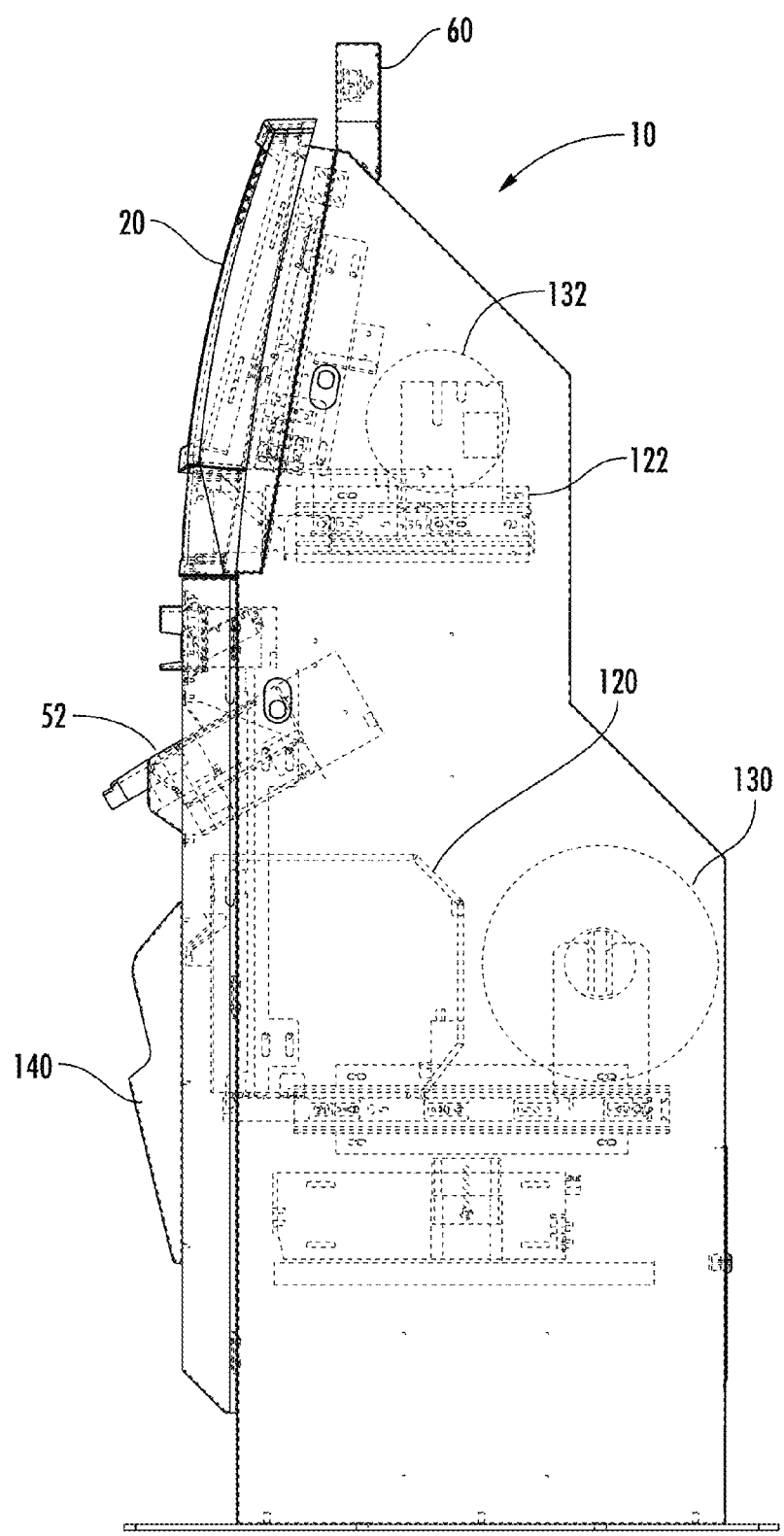
FIG. 4 is a right side view of the embodiment of the apparatus of the present invention shown in FIG. 1 with internal components shown in dotted lines.
Figure 5:
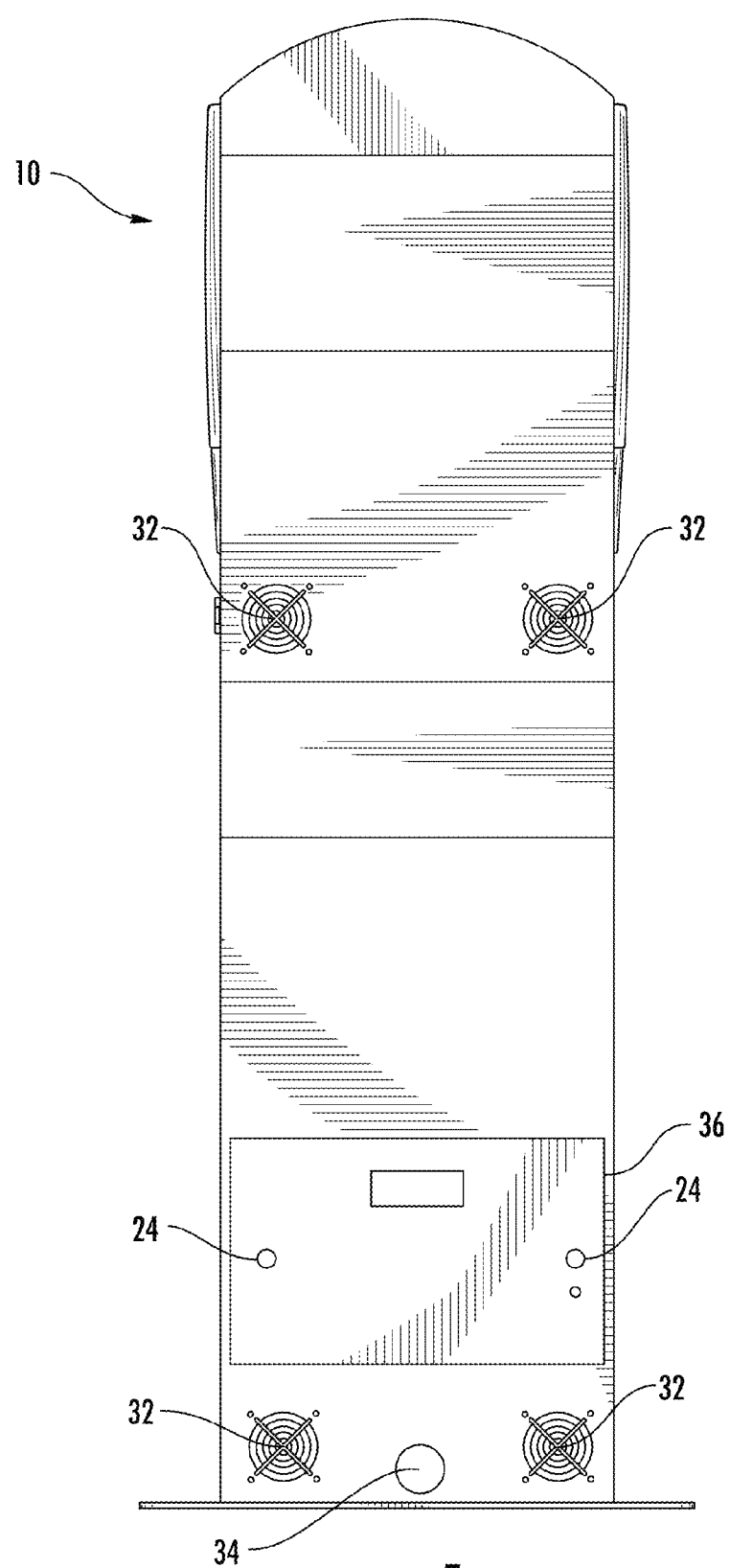
FIG. 5 is a rear view of the embodiment of the apparatus of the present invention shown in FIG. 1.
Figure 6:
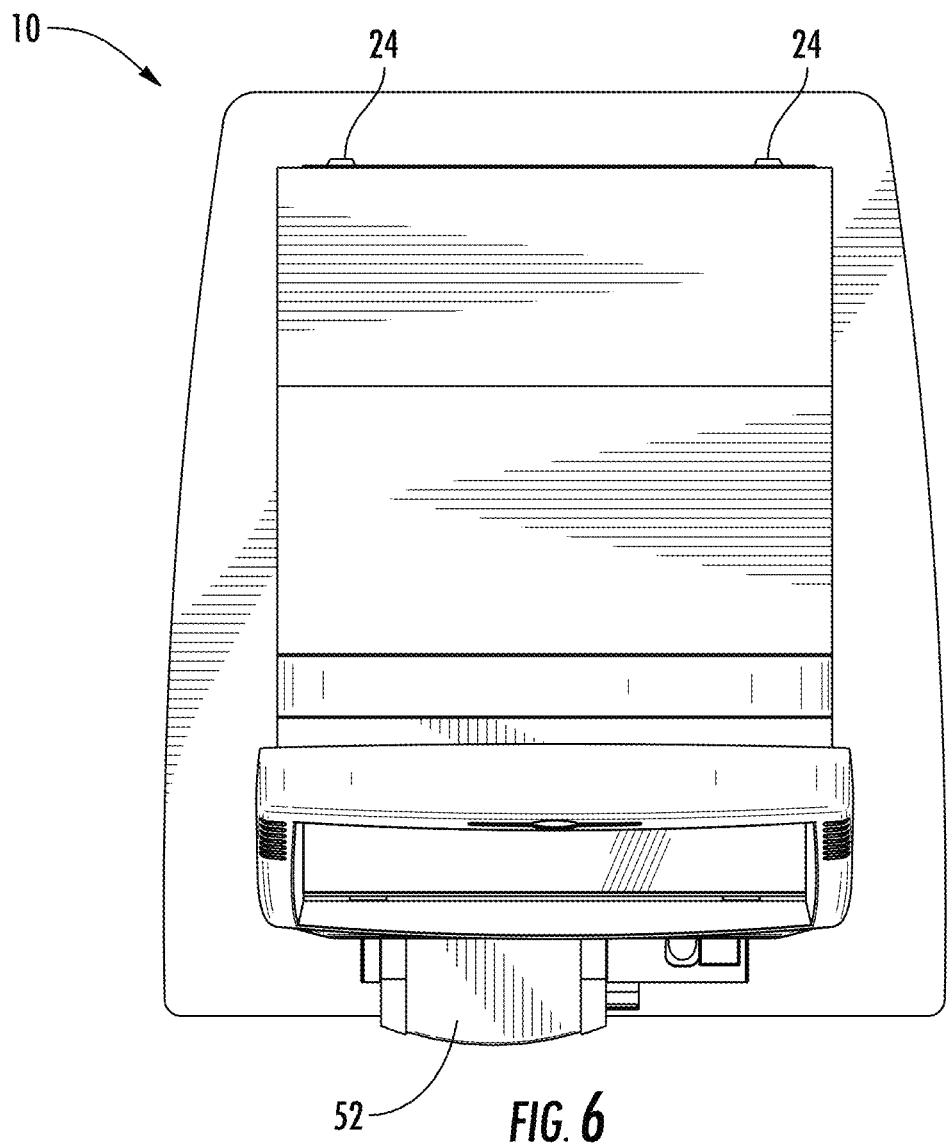
FIG. 6 is a top view of the embodiment of the apparatus of the present invention shown in FIG. 1.
Figure 7:
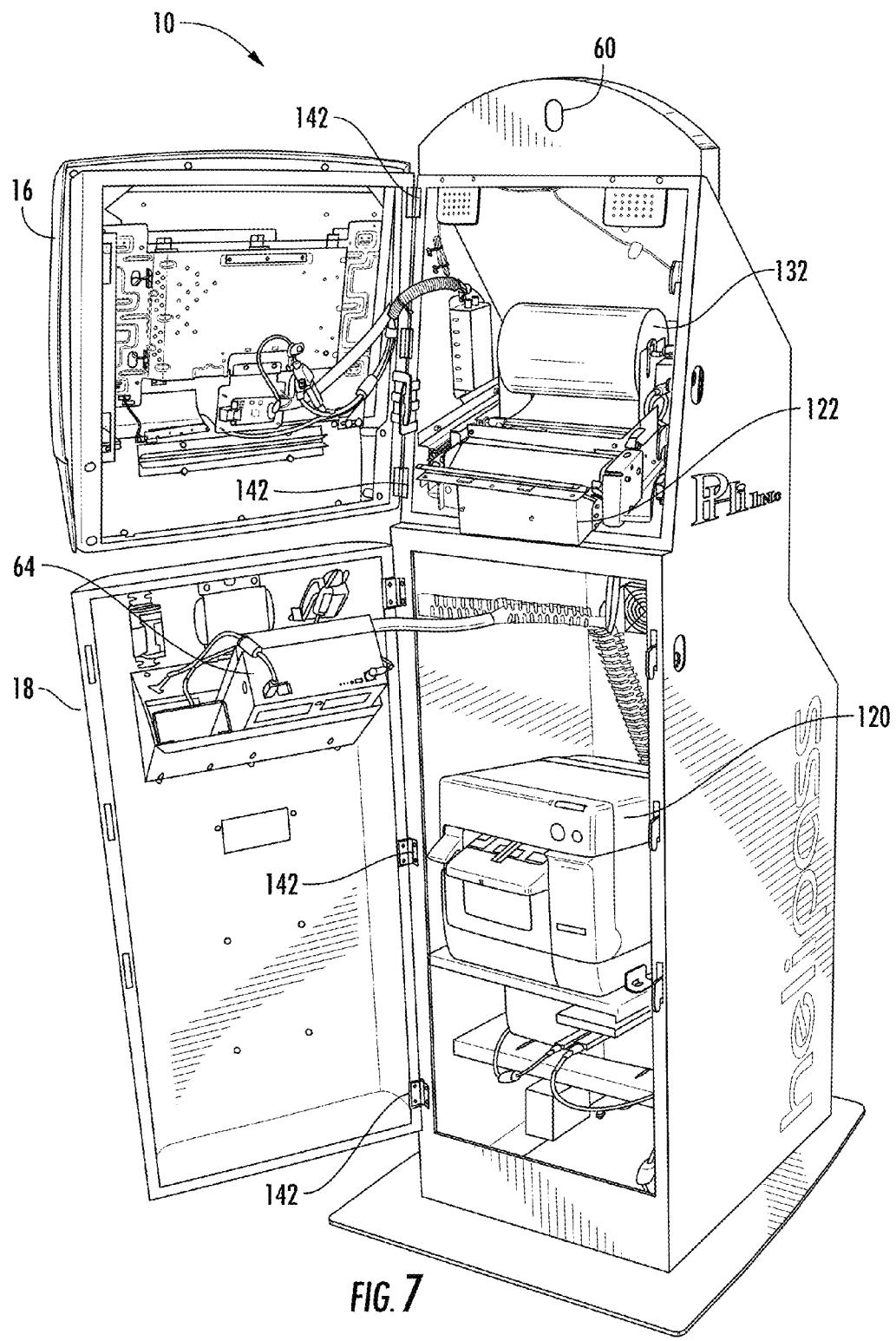
FIG. 7 is a front perspective view of the embodiment of the apparatus of the present invention shown in FIG. 1, with the kiosk open.
Figure 8:
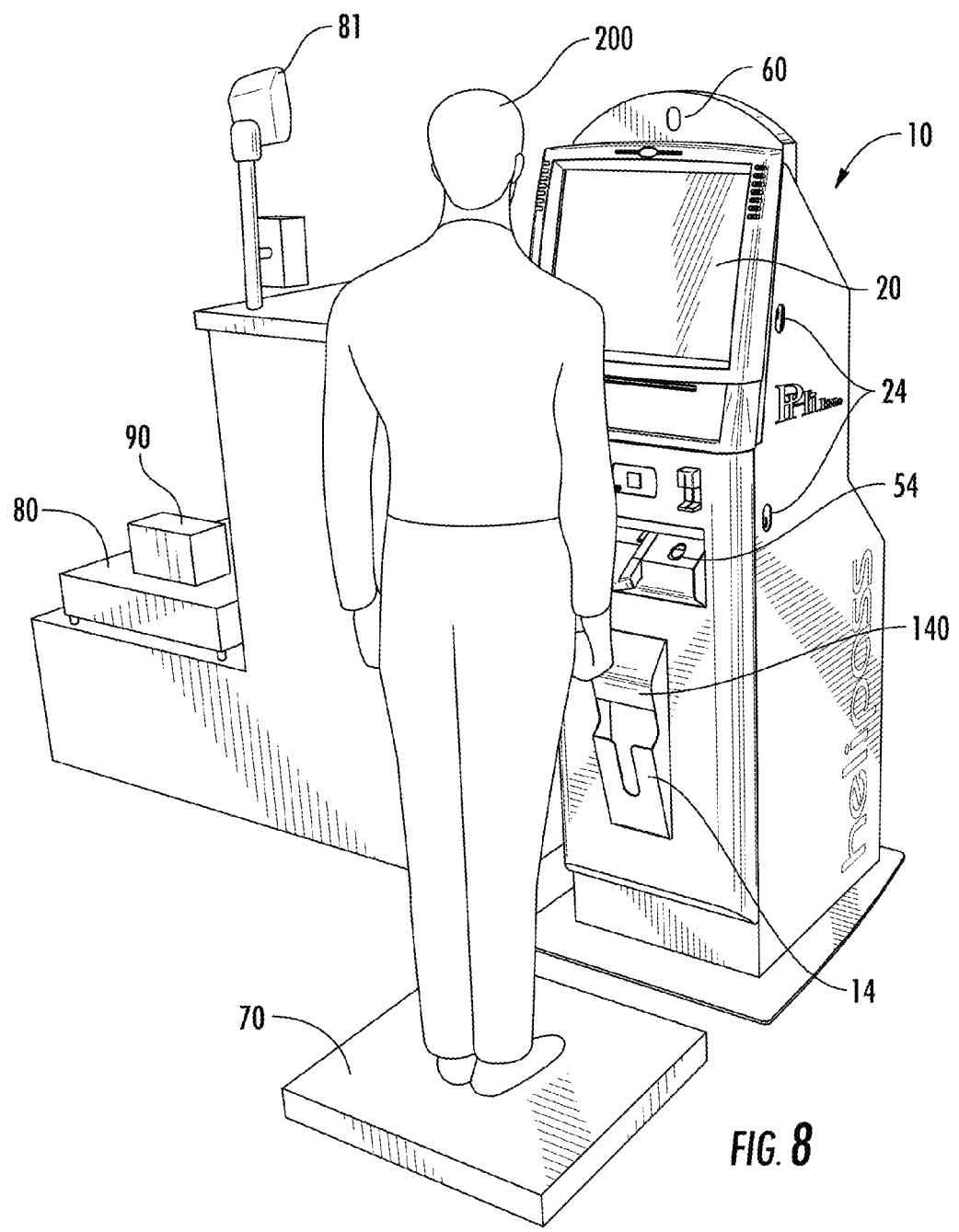
FIG. 8 is a front perspective view of an embodiment of the apparatus of the present invention including the kiosk shown in FIG. 1 and two scales.

Preferably, the stand-alone kiosk 10 (and the printer connected to wall-mounted kiosk 110) prints labels to attach to the luggage and packages which includes such information as passenger name, passenger flight number, weight of package or luggage, and date of travel, as well as whether the luggage or package is fragile or overweight. For example, one might see the following information on a label:

Last Name
First Name
Middle Name
Destination Lease Area
Destination Block No.
Destination Structure Name
Destination Nick Name
Other Destination Details
Baggage Weight
Baggage Number
Total Bags
Fragile Passenger Weight
Total Weight (bags)
Over 50 Lbs
Destination Color
Barcode of baggage ID The printer 120 (shown in FIGS. 4 and 7) can print from a roll of paper or roll of adhesive labels 130 (see FIG. 4). Printer 120 is preferably positioned in the kiosk 10 such that anything printed (boarding passes, luggage tags) cannot be touched until printing is complete (to prevent passengers from tearing the passes or tags before they are finished printing). This is preferably accomplished by, in the case of the baggage tag printer, an external metal guide used to cover the printer's output tray and guide the baggage tag into a sleeve where the passenger can retrieve his or her tag. Protecting the boarding pass from premature removal is preferably handled internally by the boarding pass printer 120. Once the boarding pass is fully printed and cut, the printer preferably then releases the boarding pass for passenger retrieval. After boarding passes and luggage tags are printed and cut, they are dropped into dispenser 140, from which they are retrieved by a passenger 200.

A boarding pass will preferably be printed for each passenger and will preferably include information such as:
Last Name
First Name
Middle Name
Destination Lease Area
Destination Block No.
Destination Structure Name
Destination Nick Name
Number of Bags
Passenger Weight
Bag Weight
Total Weight (passenger and bags)
Date Printed
Barcode of passenger ID.

Additionally, the boarding pass will preferably include at least a grayscale picture of the passenger. The pictured boarding pass can be used in the pre-board passenger screening process as a more efficient way to process passengers. The inventors are also considering displaying a full color photo of the passenger on a monitor when the boarding pass is scanned by the security guard.

A wall-mounted kiosk 110 may be connected to a separate printer either via wires or wirelessly.

Kiosk 10, 110 may include a computer 64 and computer keyboard 150. Data and files can be added to the computer via wires or wirelessly or through data input the computer keyboard, for example.

Instead of inputting information via a touch screen, information can be input by a passenger via a keyboard and mouse, for example, or by a representative of the energy sector or logistics company via a keyboard a keyboard and mouse, for example (see, for example FIG. 9).

Registration, Check-In

Registration into the Helipass® system allows for profiles to be created that can be updated each time a passenger goes through the system. This singular process is one that separates Helipass® from other offerings. Most systems require focal points or administrators to administer these update procedures. By allowing the user to scan information in a controlled format, the profile and associated data are kept up to date.

Ease of check-in

One important feature of the Helipass® system revolves around the lookup of a profile once a user has been registered. At any point during the check-in process, if a card is scanned that validates to a profile, any other data collected during that session is used to update the profile at that point. This allows for streamlined updating of profile information, even if the user may be carrying different or additional IDs during the use of the system. This is a feature that separates Helipass® from other offerings currently in the market.

The present invention can also be used on an offshore platform. Particularly well suited for offshore use is the wall mount unit. The kiosks of the present invention (and particularly the wall mount unit) can be used offshore to automate the tracking of personnel movements and personnel on board (POB) requirements. When used in conjunction with the shore based kiosks and the logistics management solution of the present invention, passengers will be able to check-in and out of offshore locations by scanning their fingerprint, TWIC, drivers license, etc. Each kiosk can be tied to a particular offshore platform or field of platforms and will preferably keep track of current personnel on board and planned inter-field and intra-field transports. Authenticated users can access the Helipass® web portal to query a person's whereabouts. The Helipass® web portal can also be used to view passenger registrants and check-ins.

Optionally, the kiosk 10, 110 of the present invention queries whether a passenger is current in specified qualifications, such as HUET. If for example a passenger is not HUET current, kiosk 10, 110 can query whether the passenger can swim.

FIGS. 19-75 are examples of screen shots which a user of kiosk 10, 110 will see when using the kiosks.

PARTS LIST

The following is a list of parts and materials suitable for use in the present invention:

| Parts Number | Description |
|---|---|
| 10 | kiosk of a preferred embodiment of the present invention |
| 12 | Optional extended rear housing for extended paper rolls |
| 14 | Catch tray for bag tags |
| 16 | access door |
| 18 | access door |
| 20 | touch display screen (such as model no. 1939L produced by eloTouch or 19" (48.3 cm) monitor with eloTouch TS0017 overlay) |
| 22 | boarding pass printer output slot |
| 24 | lock |
| 30 | rear touch display screen (such as model no. 1715L produced by EloTouch Systems, or 1247L 12" (30.5 cm) Open Frame (acoustic touch) produced by EloTouch Systems http://www.elotouch.com/Products/LCDs/1247L/default.asp) |
| 32 | vent grill |
| 34 | cable access hole |

| Parts Number | Description |
| --- | --- |
| 36 | access panel |
| 40 | Wireless RFID TWIC card reader (such as model no. RDR-7P71AKU produced by RFIDeas) |
| 42 | Contact TWIC (Smart Card) and Magnetic Stripe card reader such as model no. SPT3-855-33-1NN0N-0C produced by IDTech, or SPECTRUM III W HYBIRD INSERT (insert smart card scanner) - configured for PCSC http://www.idtechproducts.com/products/insert-readers/69.html or, RFID FIPS201 RFIDEAS pcProx contactless scanner) |
| 50 | barcode scanner with driver's license reader (such as model no. MS4980 produced by Honeywell or VuQuest 3310, (such as Honeywell 3310g barcode scanner (2d and 3d barcode) -includes easyDL http://www.honeywellaidc.com/en-US/Pages/product.aspx?category= Area%20Imager%203&cat=HSM&pid=Vuquest3310g) |
| 52 | passport scanner (such as 3M-Rochford Thompson, RTE6700 http://solutions.3m.com/wps/portal/3M/en_US/Security/Security_Systems/Products_Services/Document_Authorization/Document_Readers/Codeline/) |
| 54 | fingerprint scanner (such as Lumidigm Venus OEM Module V300 http://www.lumidigm.com/venus-series-oem-module/) |
| 60 | camera |
| 64 | miniature computer (such as FitPC3 Basic 4 GB Win7 Home Premium (includes 4 port usb FACE Module) http://www.fit-pc.com/web/fit-pc/fit-pc3-info/) |
| 66 | access door70 passenger scale (such as model no. GP400204 produced by Cardinal/Detecto) |
| 80 | baggage scale (such as Model Number: Champ II CH150R, Manufacturer: Ohaus) |
| 81 | digital scale indicator (such as model no. 204 produced by Cardinal, model CD-11 by Ohaus, T32ME by Ohaus, or Mettler Toledo Panther+) |
| 90 | package |
| 92 | additional operator monitor (such as 19' DELL LCD LCDDELL198FP; the monitor may be one of several manufacturers sold through and rebranded as Dell, Dell OptiPlex 790, SFF Win7Pro 32 bit) |
| 96 | Speakers (such as those produced by Kiosk Information Systems) |
| 110 | kiosk of a preferred embodiment of the present invention |
| 112 | wall mount (such as a quick detach wall mount)120 baggage tag printer (such as an Epson Secure Color TM-C3400 printer with paper cutter) |
| 122 | boarding pass printer (such as ITK38 Series Wide Format Kiosk Printer manufactured by Practical Automation), or EPSON TM-C3400-11 USB PRINTER http://pos.epson.com/colorworks/C3400.aspx, or PRACTICAL AUTOMATION PRINTER ITK-38 http://www.practicalautomation.com/kiosk-printers.html) |
| 130 | roll of bag tag printer paper (the EPSON baggage tag printer can use 2" × 800' matte synthetic labels manufactured by RACO Industries or custom printed helipass ® label printer paper; |
| 132 | roll of boarding pass printer paper (the Practical Automation can use any roll of paper with a width between 6.5" (16.5 cm) and 8.5" (21.6 cm)). |
| 140 | luggage tag and package label dispenser |
| 142 | hinge |
| 148 | computer mouse |
| 150 | computer keyboard |
| 155 | cooling fan |

In addition to the items listed above the inventors also contemplate using the following:

Passport Scanner: Model Number—Kiosk PV35-02-17-00-01, Manufacturer—3M;

Fingerprint Scanner: Model Number—Verifier 300, Manufacturer—CrossMatch;

Camera: Model Number CF910, Manufacturer: Logitech.

List of Acronyms:
1D/2D—one-dimensional/two-dimensional
HUET—Helicopter Underwater Egress Training
ID—Identification
ISN—I.S. Networld
MRZ—machine readable zone
OCR—optical character recognition
RFID—radio frequency identification
TWIC—Transportation Worker Identification Credential All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An apparatus for assisting a passenger preparing to embark on transportation within the energy industry, comprising:
    a display for displaying information; and
    a reader for reading at least one of TWIC (Transportation Worker Identification Credential) cards, credit cards, drivers licenses, passports, barcodes, and fingerprints,
    wherein the apparatus queries whether a passenger meets an energy company's screening requirements, and
    wherein the kiosk queries whether a passenger is current in specified qualifications, such as HUET (Helicopter Underwater Egress Training).

2. A kiosk apparatus for assisting a passenger preparing to embark on transportation within the energy industry, comprising:
    an input device for allowing input of passenger information;
    a display screen for displaying information; and
    a reader for reading at least one of TWIC (Transportation Worker Identification Credential) cards, credit cards, drivers licenses, passports, barcodes, and fingerprints,
    wherein the kiosk apparatus queries whether a passenger meets an energy company's screening requirements, and wherein the kiosk queries whether a passenger is current in specified qualifications, such as HUET (Helicopter Underwater Egress Training).

3. The apparatus of claim 2, wherein the kiosk apparatus queries whether a passenger's bag is fragile.

4. The apparatus of claim 2, wherein the kiosk apparatus queries whether a passenger's bag is overweight.

5. The apparatus of claim 2, wherein the kiosk apparatus prints boarding passes with the passenger's photo thereon.

6. The apparatus of claim 2, wherein the kiosk apparatus checks third parties' NFL (no-fly list) database for approval for the passenger's flight.

7. The apparatus of claim 2, wherein the kiosk apparatus transmits data to another location including a server, a third party employer, or a pilot.

8. The apparatus of claim 2, wherein the TWIC card reader for reading the passenger's TWIC card includes a contact reader.

9. The apparatus of claim 2, wherein the TWIC card reader for reading the passenger's TWIC card includes a contactless reader.

10. The apparatus of claim 2, wherein the reader for reading the passenger's drivers license reads a 2D barcode on the back of the drivers license.

11. The apparatus of claim 2, wherein the reader for reading the passenger's drivers license reads the drivers license optically to create an image then performs OCR (optical character recognition) on the image.

12. The apparatus of claim 2, further comprising a magnetic stripe reader for reading magnetic strips on credit cards, drivers licenses, and passports.

13. The apparatus of claim 2, further comprising a passport scanner that has an ability to read passports through scanning the passports' machine readable zone and optically with OCR technology.

14. The apparatus of claim 2, further comprising a scale operatively connected to the kiosk for weighing luggage.

15. The apparatus of claim 2, further comprising a printer which prints the passenger's photo on the boarding pass.

16. The apparatus of claim 2, further comprising a printer or printers which prints color coded luggage tags.

17. The apparatus of claim 2, further comprising a passport scanner.

18. The apparatus of claim 2, further comprising a fingerprint scanner.

19. The apparatus of claim 2, further comprising a camera for photographing the passenger.

20. The apparatus of claim 2, wherein the kiosk stands alone.

21. The apparatus of claim 2, wherein the kiosk is mounted to a wall.

22. The apparatus of claim 2, wherein the kiosk sits on a countertop.

23. The apparatus of claim 2, wherein the kiosk queries whether a passenger is on a no fly list.

24. The apparatus of claim 16, wherein the printer or printers prints symbol coded luggage tags.

25. The apparatus of claim 2, wherein the printer or printers prints symbol coded luggage tags.

26. The apparatus of claim 2, wherein a representative can override information input by the passenger.

27. A method of using the apparatus of claim 2 to check in a passenger for energy industry transportation, comprising: providing the apparatus of claim 2; and allowing the passenger to input information.

28. The apparatus of claim 2, further comprising a scale or scales operatively connected to the kiosk for weighing at least one of the passenger and the passenger's luggage.

29. A kiosk apparatus for assisting a passenger preparing to embark on transportation within the energy industry, comprising:
    a touch display screen for allowing input of passenger information; and
    a reader for reading at least one of TWIC (Transportation Worker Identification Credential) cards, credit cards, drivers licenses, passports, barcodes, and fingerprints, wherein the kiosk queries whether a passenger meets an energy company's screening requirements, and wherein the kiosk queries whether a passenger is current in specified qualifications, such as HUET (Helicopter Underwater Egress Training).

30. The apparatus of claim 29, wherein a representative can override information input by the passenger.

31. The apparatus of claim 29, wherein the kiosk queries whether a passenger is on a no fly list.

32. A method of using the apparatus of claim 29 to check in a passenger for a helicopter flight, comprising: providing the apparatus of claim 29; and allowing the passenger to input information.

33. A kiosk apparatus for assisting a passenger preparing to embark on transportation within the energy industry, comprising:
    a display screen for allowing input of passenger information; and
    a reader for reading at least one of TWIC cards, credit cards, drivers licenses, passports, bar codes, and fingerprints, wherein the kiosk apparatus queries whether a passenger meets an energy company's screening requirements, and wherein the kiosk apparatus queries whether a passenger is on a no fly list, and wherein the kiosk queries whether a passenger is current in specified qualifications, such as HUET (Helicopter Underwater Egress Training).

34. The apparatus of claim 33, wherein the kiosk apparatus transmits data to another location including a server, a third party employer, or a pilot.

35. The apparatus of claim 33, wherein the kiosk apparatus queries whether a passenger's bag is fragile.

36. The apparatus of claim 33, further comprising a scale operatively connected to the kiosk apparatus for weighing luggage.

37. The apparatus of claim 36, wherein the kiosk apparatus queries whether a passenger's bag is overweight.

38. The apparatus of claim 33, wherein the kiosk apparatus prints boarding passes with the passenger's photo thereon.

39. The apparatus of claim 33, wherein the kiosk apparatus checks third parties' NFL (no-fly list) database for approval for the passenger's flight.

40. The apparatus of claim 33, wherein the TWIC card reader for reading the passenger's TWIC card includes a contact reader.

41. The apparatus of claim 33, wherein the TWIC card reader for reading the passenger's TWIC card includes a contactless reader.

42. The apparatus of claim 33, wherein the reader for reading the passenger's drivers license reads a 2D barcode on the back of the drivers license.

43. The apparatus of claim 33, wherein the reader for reading the passenger's drivers license reads the drivers license optically to create an image then performs OCR (optical character recognition) on the image.

44. The apparatus of claim 33, further comprising a magnetic stripe reader for reading magnetic strips on credit cards, drivers licenses, and passports.

45. The apparatus of claim 33, further comprising a passport scanner that has an ability to read passports through scanning the passports' machine readable zone and optically with OCR technology.

46. The apparatus of claim 33, wherein the printer or printers prints the passenger's photo on the boarding pass.

47. The apparatus of claim 33, wherein the printer or printers prints color coded luggage tags.

48. The apparatus of claim 33, further comprising a passport scanner.

49. The apparatus of claim 33, further comprising a fingerprint scanner.

50. The apparatus of claim 33, further comprising a camera for photographing the passenger.

51. The apparatus of claim 33, wherein the kiosk apparatus stands alone.

52. The apparatus of claim 33, wherein the kiosk apparatus is mounted to a wall.

53. The apparatus of claim 33, wherein the kiosk apparatus sits on a countertop.

54. The apparatus of claim 47, wherein the printer or printers prints symbol coded luggage tags.

55. The apparatus of claim 33, wherein the printer or printers prints symbol coded luggage tags.

56. The apparatus of claim 33, further comprising a scale or scales operatively connected to the kiosk for weighing at least one of the passenger and the passenger's luggage.

57. The apparatus of claim 33, further comprising a second display screen for allowing a representative of a helicopter flight company to observe what is displayed to the passenger on the touch display screen for allowing input of passenger information, wherein the representative can override information input by the passenger.

58. A method of using the apparatus of claim 33 to check in a passenger for a helicopter flight, comprising: providing the apparatus of claim 33; and allowing the passenger to input information.

* * * * *